US009330062B2

(12) United States Patent
Thurow et al.

(10) Patent No.: US 9,330,062 B2
(45) Date of Patent: May 3, 2016

(54) VEHICLE CONTROL AND GATEWAY MODULE

(71) Applicants: Bradley R. Thurow, Fargo, ND (US); Johan A. Wiig, Paris (FR); Joshua N. Gelinske, Fargo, ND (US); Adam A. Reich, Fargo, ND (US); Barry D. Batcheller, West Fargo, ND (US)

(72) Inventors: Bradley R. Thurow, Fargo, ND (US); Johan A. Wiig, Paris (FR); Joshua N. Gelinske, Fargo, ND (US); Adam A. Reich, Fargo, ND (US); Barry D. Batcheller, West Fargo, ND (US)

(73) Assignee: Intelligent Agricultural Solutions, LLC, Fargo, ND (US)

( * ) Notice: Subject to any disclaimer, the term of this patent is extended or adjusted under 35 U.S.C. 154(b) by 273 days.

(21) Appl. No.: 13/843,029

(22) Filed: Mar. 15, 2013

(65) Prior Publication Data

US 2013/0211628 A1  Aug. 15, 2013

Related U.S. Application Data

(63) Continuation-in-part of application No. 13/046,549, filed on Mar. 11, 2011, now Pat. No. 8,950,260.

(51) Int. Cl.
*A01C 7/08* (2006.01)
*G07C 5/08* (2006.01)
(Continued)

(52) U.S. Cl.
CPC ............... *G06F 17/00* (2013.01); *A01C 7/081* (2013.01); *A01C 7/105* (2013.01); *G01F 1/666* (2013.01); *G08C 2201/93* (2013.01)

(58) Field of Classification Search
CPC ........ A01C 7/102; A01C 7/107; A01C 7/105; A01C 7/081; A01C 7/082; A01C 7/084; G01F 1/666; G05D 1/0016; G05D 1/0022; G08C 2201/93; G07C 5/008; H04M 1/72533
USPC .............................................................. 701/2
See application file for complete search history.

(56) References Cited

U.S. PATENT DOCUMENTS 3,610,252 A  10/1971  De Coene et al.
3,639,755 A   2/1972  Wrege
(Continued)

FOREIGN PATENT DOCUMENTS

DE  102007005889   7/2008
DE  102008052442   6/2009
(Continued)

OTHER PUBLICATIONS

Translation of P.C.T. application PCT/EP2008/051411 (original DE language application published Sep. 18, 2008).*
(Continued)

*Primary Examiner* — Behrang Badii
*Assistant Examiner* — David Testardi
(74) *Attorney, Agent, or Firm* — Law Office of Mark Brown, LLC; Mark E. Brown

(57) ABSTRACT

A vehicle control and gateway module comprising an electronic control module controlling one or more vehicle systems, a vehicle communications bus, a wireless communications module, an electronic gateway module acting as a translator of information between the vehicle communications bus and the wireless communications module, and a software program, whereby an operator using a remote mobile device can send and receive wireless commands to and from the vehicle with the electronic gateway module translating messages from one data protocol to the other as required.

24 Claims, 38 Drawing Sheets

(51) Int. Cl.
*B60R 16/02* (2006.01)
*G06F 17/00* (2006.01)
*A01C 7/10* (2006.01)
*G01F 1/66* (2006.01)

(56) References Cited

U.S. PATENT DOCUMENTS

| | | | |
|---|---|---|---|
| 3,935,866 | A | 2/1976 | Northup et al. |
| 4,057,709 | A | 11/1977 | Lyngsgaard et al. |
| 4,275,546 | A | 6/1981 | Bohman et al. |
| 4,296,409 | A | 10/1981 | Whitaker |
| 4,348,855 | A | 9/1982 | DePauw et al. |
| 4,360,998 | A | 11/1982 | Somes |
| 4,441,513 | A | 4/1984 | Herwig |
| 4,517,792 | A | 5/1985 | Denning et al. |
| 4,651,331 | A | 3/1987 | Harrsen et al. |
| 4,697,173 | A | 9/1987 | Stokes |
| 4,900,881 | A | 2/1990 | Fischer |
| 4,902,264 | A | 2/1990 | Diekhans et al. |
| 4,922,467 | A | 5/1990 | Caulfield |
| 4,961,304 | A | 10/1990 | Ovsborn et al. |
| 5,015,997 | A | 5/1991 | Strubbe |
| 5,312,299 | A | 5/1994 | Behnke et al. |
| 5,802,489 | A | 9/1998 | Orbach et al. |
| 5,828,626 | A | 10/1998 | Castile et al. |
| 5,831,539 | A * | 11/1998 | Thomas et al. ............... 340/674 |
| 5,831,542 | A | 11/1998 | Thomas et al. |
| 5,837,906 | A | 11/1998 | Palmer |
| 5,924,371 | A * | 7/1999 | Flamme et al. ............... 111/177 |
| 6,070,538 | A * | 6/2000 | Flamme et al. ............... 111/170 |
| 6,093,926 | A | 7/2000 | Mertins et al. |
| 6,146,268 | A | 11/2000 | Behnke et al. |
| 6,275,231 | B1 | 8/2001 | Obradovich |
| 6,296,425 | B1 | 10/2001 | Memory et al. |
| 6,386,128 | B1 * | 5/2002 | Svoboda et al. ............... 111/200 |
| 6,524,183 | B1 | 2/2003 | Van Quekelberghe |
| 6,801,942 | B1 * | 10/2004 | Dietrich et al. ............... 709/225 |
| 6,863,604 | B2 | 3/2005 | Behnke |
| 6,925,357 | B2 | 8/2005 | Wang et al. |
| 7,001,267 | B2 | 2/2006 | Behnke |
| 7,131,614 | B2 | 11/2006 | Kisak et al. |
| 7,162,962 | B2 | 1/2007 | Fuessel et al. |
| 7,415,365 | B2 | 8/2008 | Jeppe et al. |
| 7,654,141 | B2 | 2/2010 | Behnke et al. |
| 7,751,946 | B2 | 7/2010 | Taki et al. |
| 8,095,278 | B2 | 1/2012 | Schaaf et al. |
| 8,154,227 | B1 | 4/2012 | Young et al. |
| 8,239,087 | B2 | 8/2012 | Dybalski et al. |
| 8,295,992 | B2 | 10/2012 | Ecton et al. |
| 8,332,093 | B2 | 12/2012 | Yamasaki et al. |
| 8,656,081 | B2 | 2/2014 | Irizarry |
| 8,667,206 | B2 | 3/2014 | Irizarry |
| 2002/0046322 | A1 | 4/2002 | Butterworth et al. |
| 2002/0140548 | A1 * | 10/2002 | Lutter et al. ............... 340/425.5 |
| 2004/0186597 | A1 | 9/2004 | Wippersteg et al. |
| 2004/0203370 | A1 * | 10/2004 | Luo et al. ............... 455/41.2 |
| 2005/0091593 | A1 | 4/2005 | Peltz |
| 2005/0143153 | A1 | 6/2005 | Behnke |
| 2005/0280524 | A1 | 12/2005 | Boone et al. |
| 2006/0155429 | A1 | 7/2006 | Boone et al. |
| 2007/0143482 | A1 | 6/2007 | Zancho |
| 2007/0238491 | A1 | 10/2007 | He |
| 2008/0208395 | A1 | 8/2008 | Self et al. |
| 2008/0318648 | A1 | 12/2008 | Baumgarten et al. |
| 2009/0251366 | A1 | 10/2009 | McClure et al. |
| 2009/0323578 | A1 * | 12/2009 | Hogenmueller et al. ..... 370/315 |
| 2010/0097239 | A1 | 4/2010 | Campbell et al. |
| 2010/0293303 | A1 * | 11/2010 | Choi ............... 710/16 |
| 2011/0086668 | A1 * | 4/2011 | Patel ............... 455/556.1 |
| 2011/0106333 | A1 * | 5/2011 | Scheider et al. ............... 701/1 |
| 2011/0224843 | A1 * | 9/2011 | Kalhous et al. ............... 701/2 |
| 2012/0036914 | A1 | 2/2012 | Landphair et al. |
| 2012/0042815 | A1 | 2/2012 | Wonderlich |
| 2012/0072533 | A1 | 3/2012 | O'Neil |
| 2012/0109446 | A1 | 5/2012 | Yousefi et al. |
| 2012/0169874 | A1 | 7/2012 | Thomas et al. |
| 2012/0227647 | A1 | 9/2012 | Gelinske et al. |
| 2012/0256763 | A1 * | 10/2012 | Johnson et al. ............... 340/870.07 |
| 2012/0271489 | A1 | 10/2012 | Roberts et al. |
| 2013/0008361 | A1 | 1/2013 | Trevino et al. |
| 2013/0211628 | A1 | 8/2013 | Thurow et al. |
| 2014/0033058 | A1 | 1/2014 | Perotti |
| 2014/0163771 | A1 | 6/2014 | Demeniuk |

FOREIGN PATENT DOCUMENTS

| | | | |
|---|---|---|---|
| EP | 0702890 | | 3/1996 |
| GB | 1514274 | | 6/1978 |
| JP | 2003309584 A * | 10/2003 | .............. H04L 12/46 |
| JP | 2005153684 | | 6/2005 |
| JP | 2005191819 A * | 7/2005 | .............. H04L 12/66 |
| JP | 2005236560 A * | 9/2005 | .............. H04L 12/28 |
| JP | 2008149755 | | 7/2008 |
| JP | 2011120540 A * | 6/2011 | |
| WO | WO 2008/110413 A1 * | 9/2008 | .............. H04L 29/06 |

OTHER PUBLICATIONS

"AFS Concord air seeder monitors planting and fertilization from inside the cab", AgriTech'99 (ASABE, Resource Magazine's 1999 AE50 Award Winners), Jun. 1999, p. 49.*

Hest, David, "Precision Planting launches iPad monitor application", Farm Industry News, Jan. 20, 2012, 2 pages, downloaded from http://farmindustrynews.com/precision-farming/precision-planting-launches-ipad-monitor-application.*

Hest, David, "IAS enhances iPad based seed monitoring system", Farm Industry News, Jan. 24, 2012, 2 pages, downloaded from http://farmindustrynews.com/precision-farming/ias-enhances-ipad-based-seed-monitoring-system.*

"International Search Report and Written Opinion", PCT/US2014/030417, 14 pages, Aug. 27, 2014.

"International Search Report and Written Opinion", PCT/US2015/023415, Jul. 2, 2015.

"Air Seeder Blockage Monitoring and Balancing", *Appareo Systems—A Briefing for Amity Technology*, (Nov. 30, 2010), 1-45.

"Air Seeder Monitor", *Installation & Operation Instructions air seeder monitor 1020* www.farmscan.net, (Apr. 00, 2006, 1-22.

"Amity Technology", www.amitytech.com Retrieved from the Internet Aug. 19, 2010.

"International Search Report and Written Opinion", PCT/US2012/028795, (Jun. 1, 2012), 11 pages.

Stone, M. L., et al., "Evolution of Electronics for Mobile Agricultural Equipment", *American Society of Agricultural and Biological Engineers* ISSN 0001-2351 vol. 51(2), (2008),385-390.

* cited by examiner

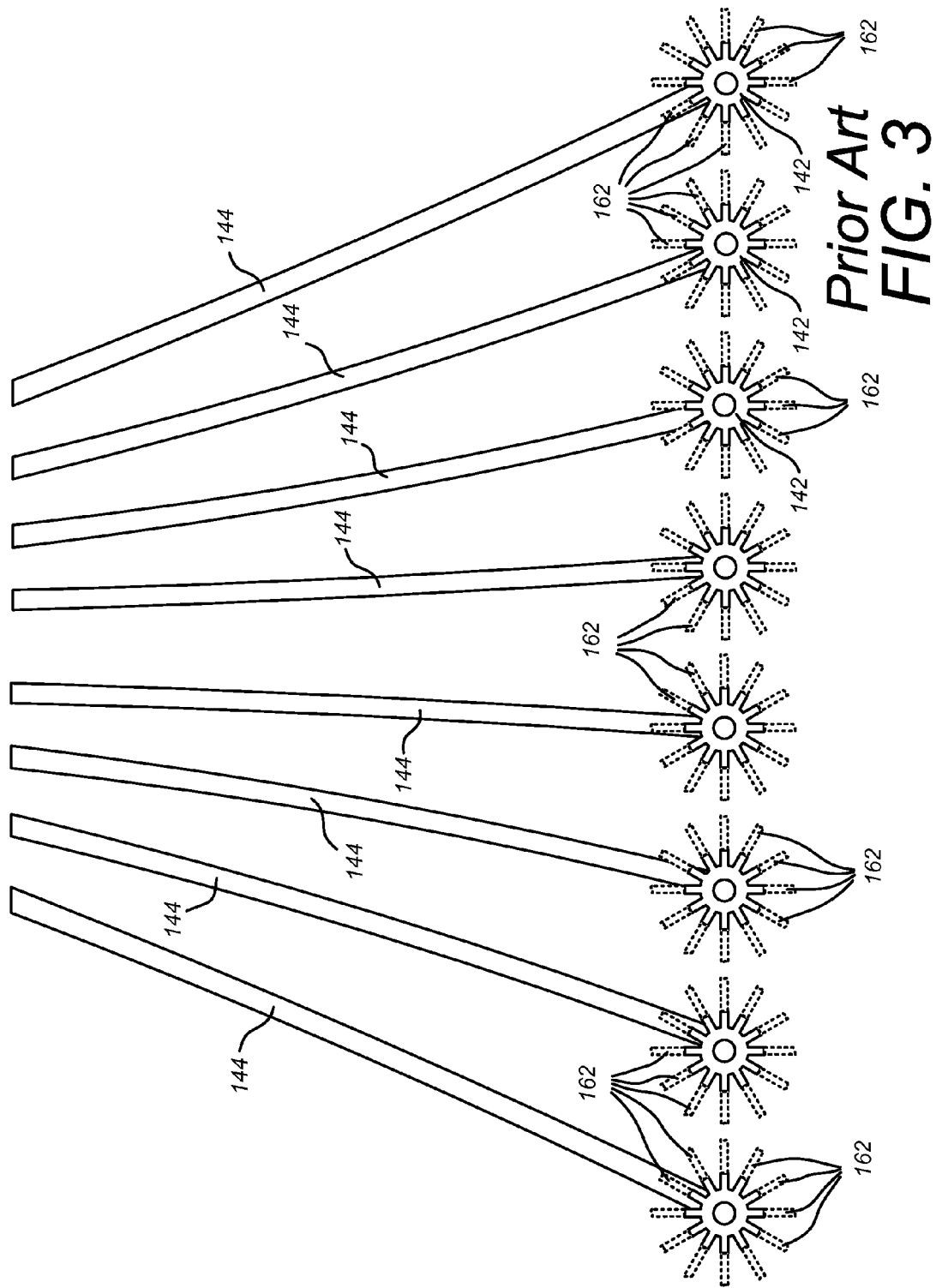

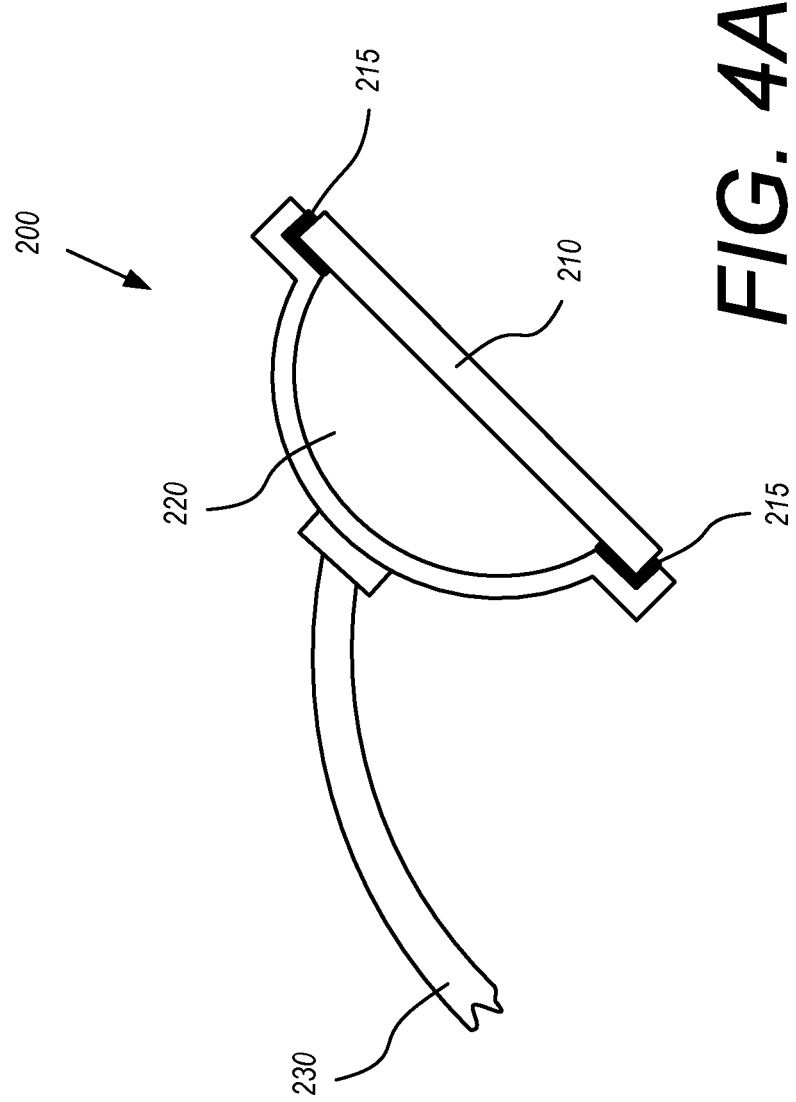

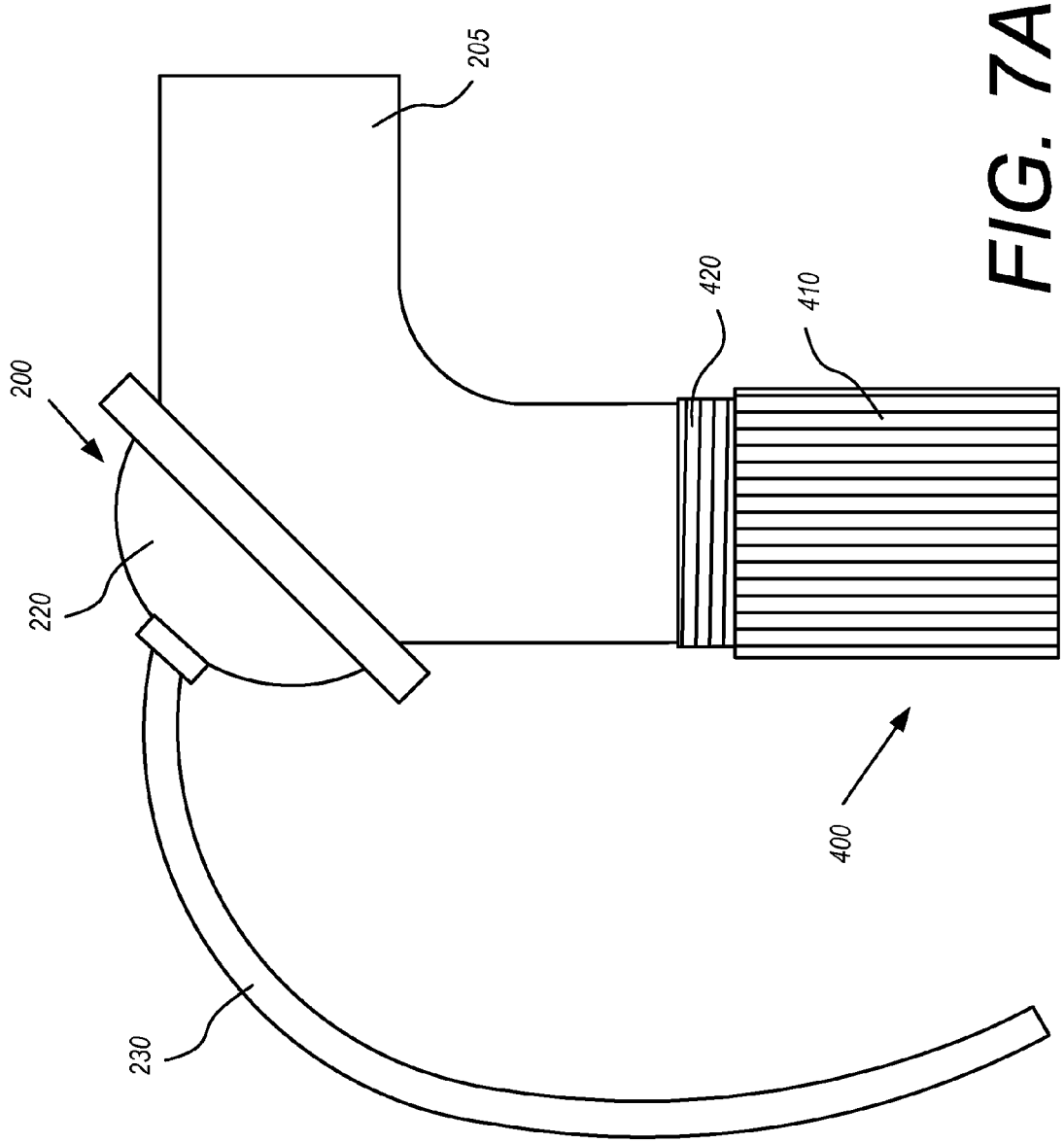

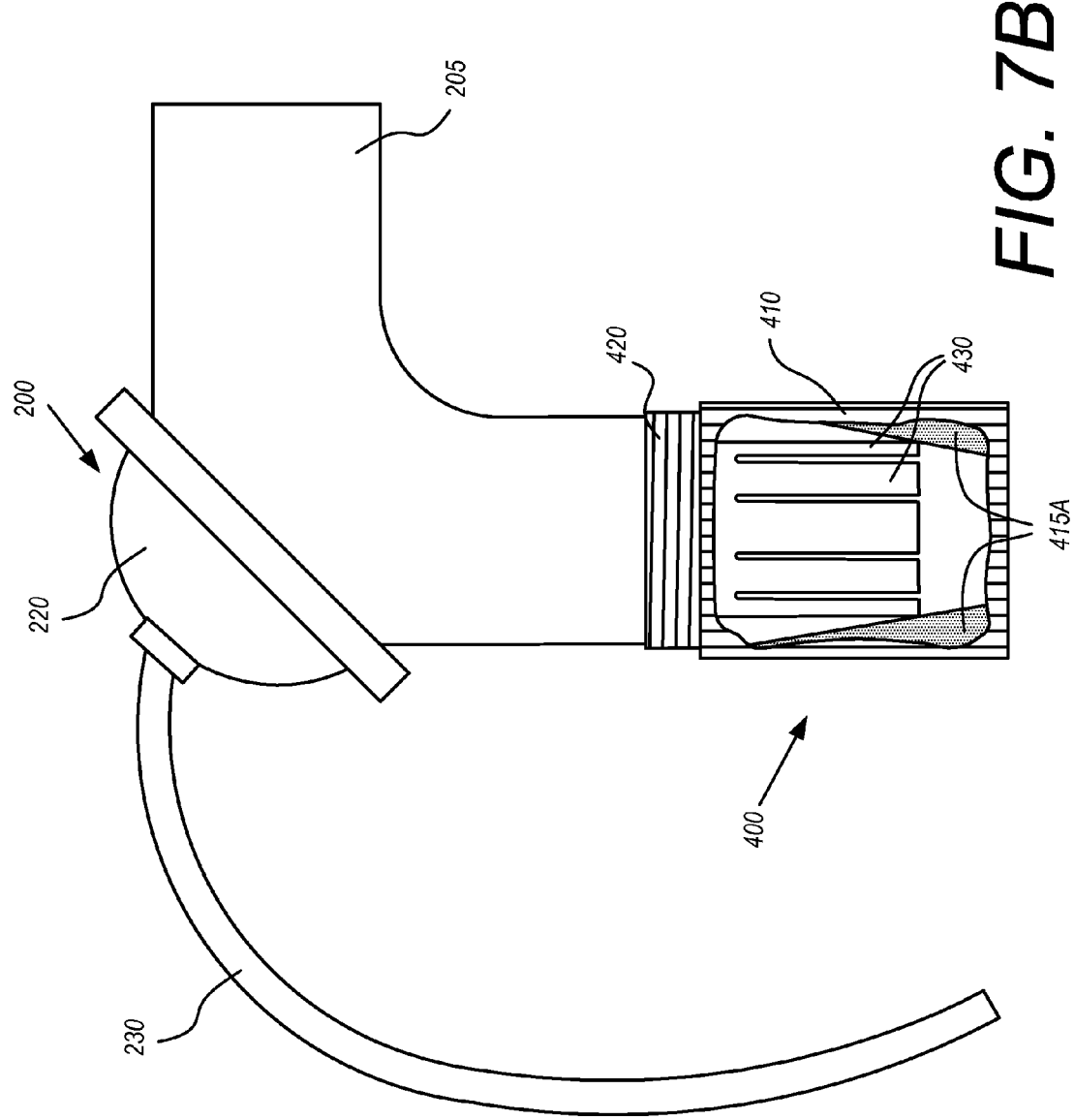

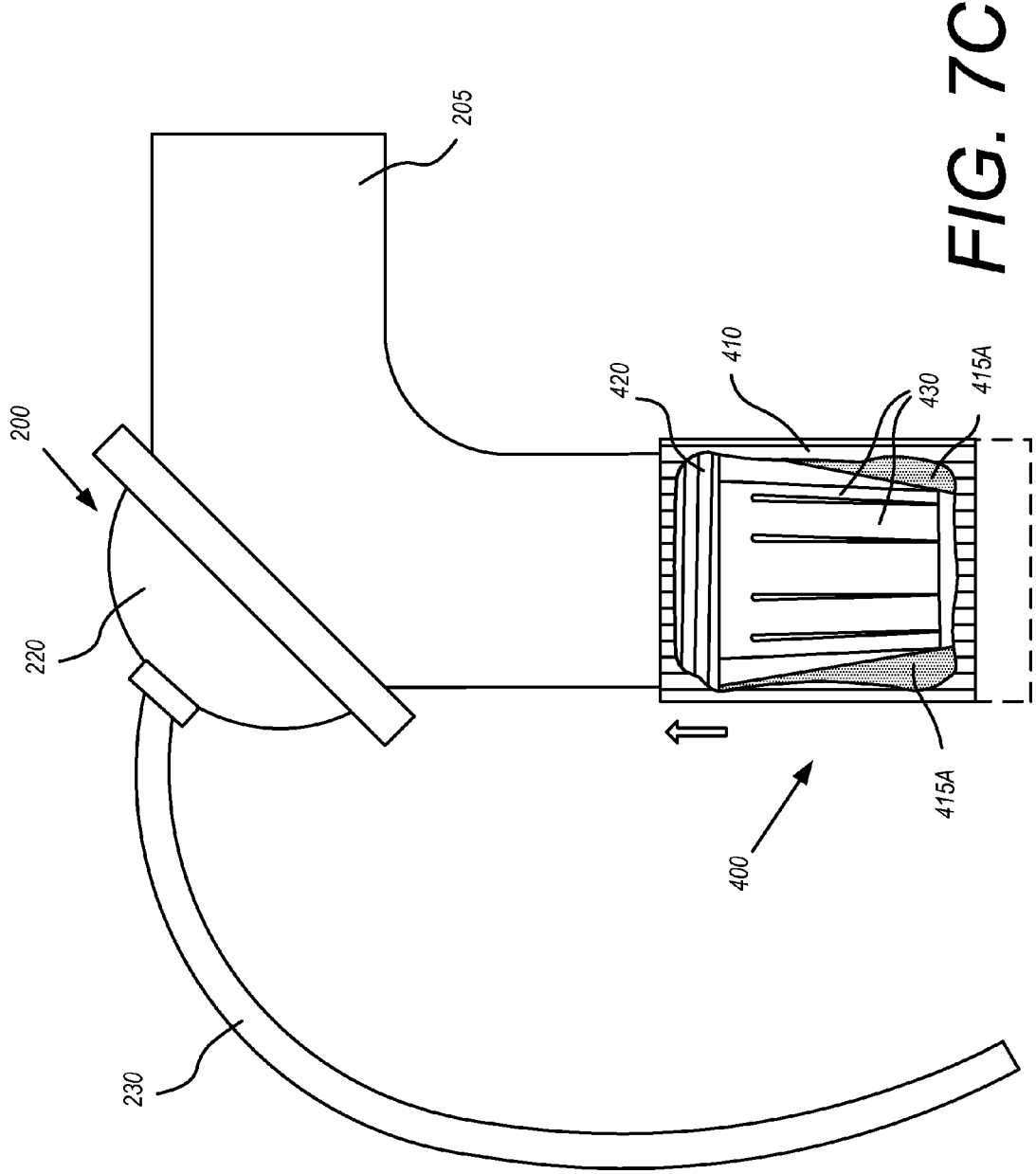

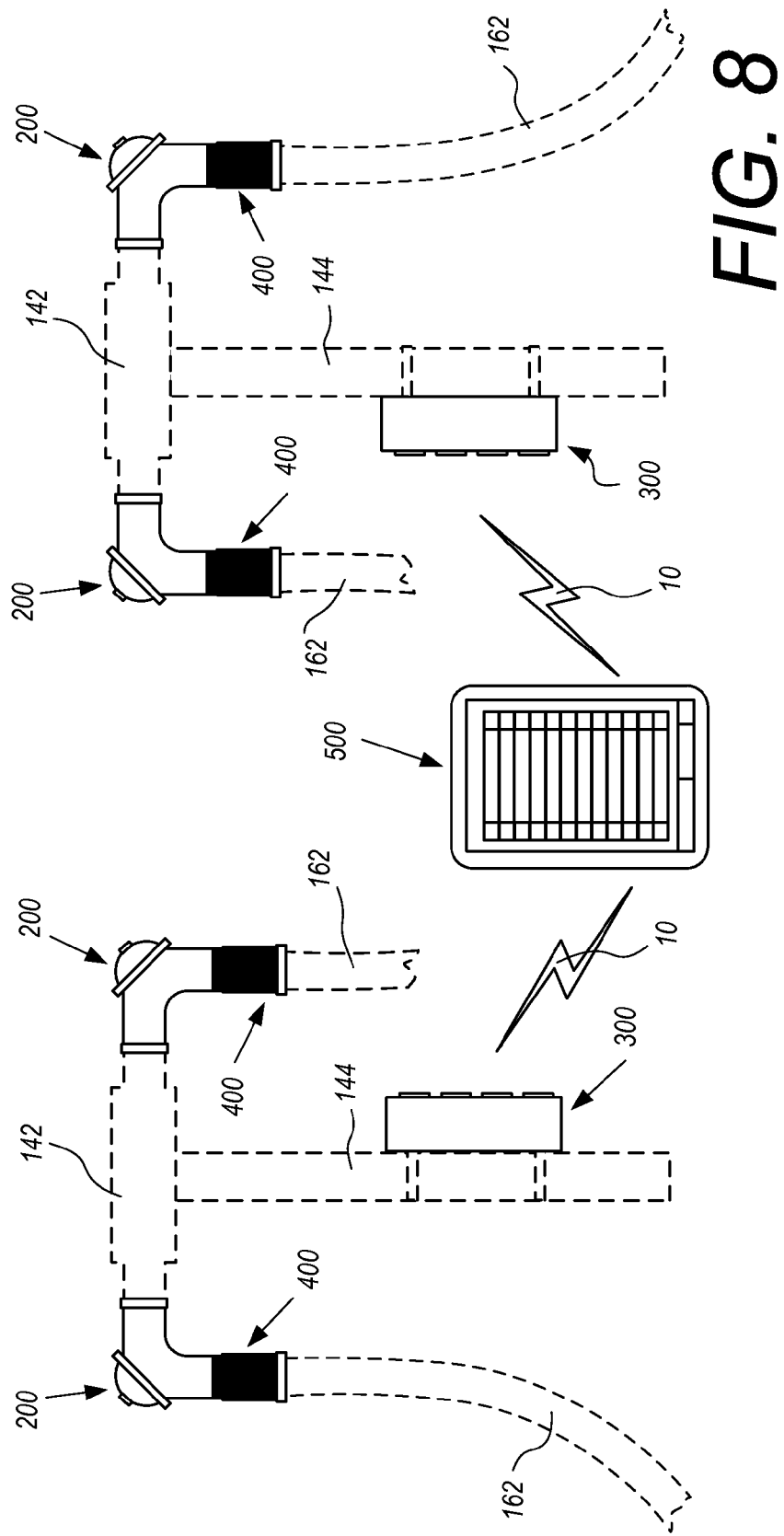

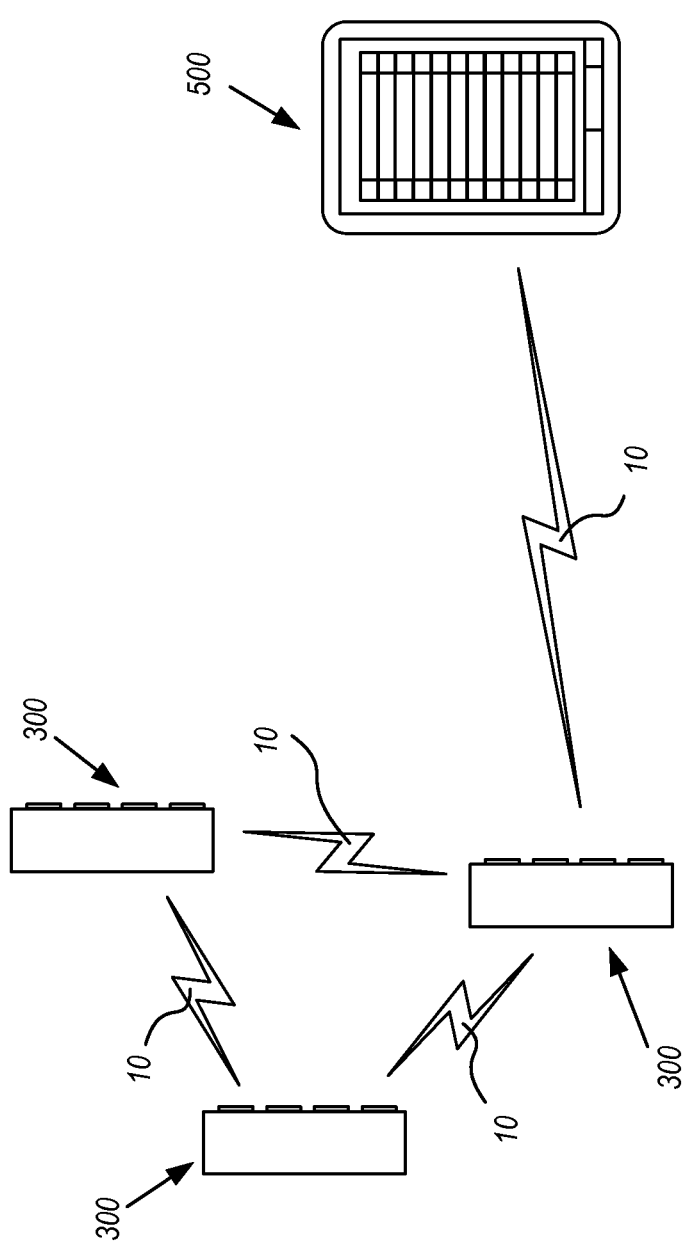

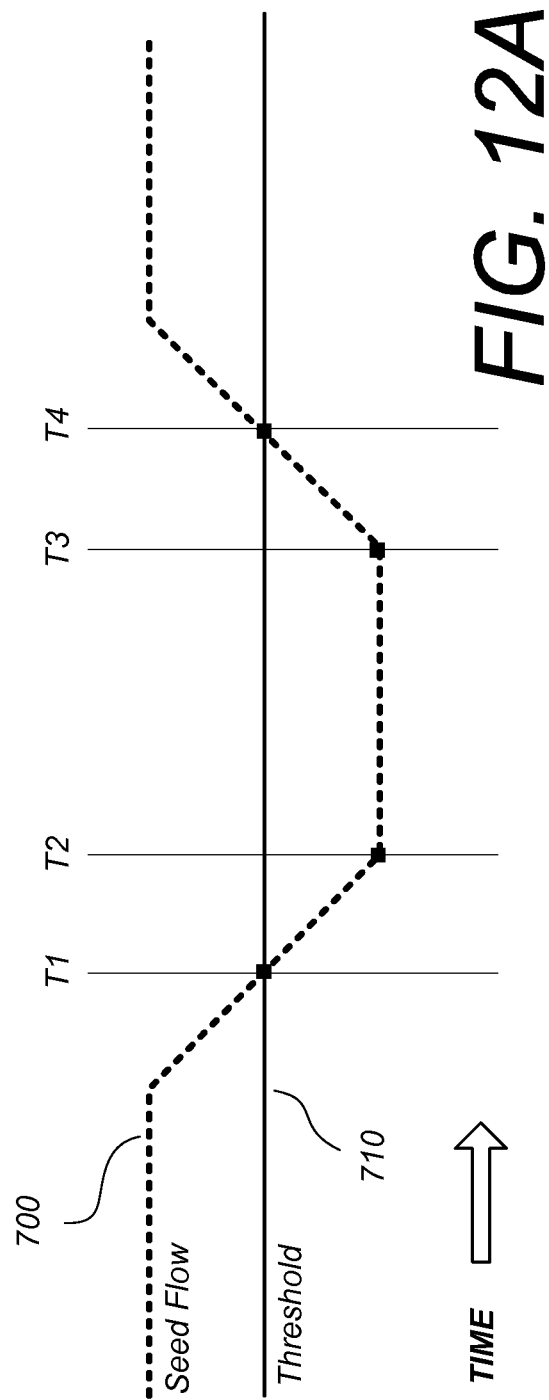

720 {
Let Tcurr be the current time of evaluation
Let AUDIBLE_ALARM be the flag denoting the audible alarm is set
Let VISUAL_ALARM be the flag denoting the visual alarm is set
Let BELOW_THRESHOLD be the flag denoting the seed flow
      is below the threshold
Let FLOW_FALLING be the flag denoting the seed flow falling over time
Let FLOW_RISING be the flag denoting the seed flow rising over time
Let FLOW_STEADY be the flag denoting steady seed flow (neither
      dropping nor rising)
Let ALARM_TIMEOUT be a number of seconds for the alarm timer 725 {
//Happens when the threshold is crossed
If (BELOW_THRESHOLD AND FLOW_FALLING and NOT VISUAL_ALARM) then
      VISUAL_ALARM = true
      Reset ALARM_TIMEOUT
End 730 {
If (VISUAL_ALARM)
      If (BELOW_THRESHOLD AND FLOW_FALLING AND (Tcurr-T1) > ALARM_TIMEOUT) then
            //Happens if flow has been falling for "too long"
            AUDIBLE _ALARM = true
      Else
            //Flow left the "falling" state before timeout
            Reset ALARM_TIMEOUT
      End 735 {
      If (BELOW_THRESHOLD AND FLOW_STEADY AND (Tcurr-T2) > ALARM_TIMEOUT) then
            //Happens if flow has been steady for "too long"
            AUDIBLE _ALARM = true
      Else
            //Flow left the "steady" state before timeout
            Reset ALARM_TIMEOUT
      End 740 {
      If (BELOW_THRESHOLD AND FLOW_RISING AND (Tcurr-T3) > ALARM_TIMEOUT) then
            AUDIBLE _ALARM = true
      Else
            //Flow left the "rising" state before timeout
            Reset ALARM_TIMEOUT
      End
End 745 {
//Now above threshold, clear warnings
If (NOT BELOW_THRESHOLD) then
      Reset ALARM_TIMEOUT
      AUDIBLE_ALARM = false
      VISUAL_ALARM = false
End

*FIG. 12B*

VEHICLE CONTROL AND GATEWAY MODULE

CROSS-REFERENCE TO RELATED APPLICATION

This patent application is a continuation-in-part of and claims priority in U.S. patent application Ser. No. 13/046,549, entitled Air Seeder Monitoring and Equalization System Using Acoustic Sensors, filed on Mar. 11, 2011. The entire disclosure of the above-noted patent application is incorporated by reference in its entirety herein.

BACKGROUND OF THE INVENTION

1. Field of the Invention

The present invention relates generally to a material flow monitoring and equalization system, and more particularly to a system for measuring and balancing the flow of seeds and/or other material through an air seeding system using acoustic sensors and adjustable flow restrictors. This invention also relates generally to certain new and useful improvements in vehicle control, and, more particularly, to a control system allowing wireless access to and control of a vehicle's subsystems.

2. Description of the Related Art

The general principle of an air seeding system is to dispense seeds and/or other particulate matter (fertilizers, herbicides, etc.) from a hopper or other container into a moving flow of air, where the moving air will carry it through a series of branching tubes to a point where it will ultimately be deposited into the soil. The particulate matter is typically metered in a controlled fashion as it is dispensed from the hopper, allowing the total rate of material distributed to be controlled. However, once the material leaves the hopper, it is difficult to determine precisely which portion takes which specific path through the branching network of tubes to eventually make its way to the end of the seed tubes and be placed into the soil. An air seeding system represents a complex fluid dynamics problem, in which a single initial flow of air and suspended particulate material may be continuously divided and redirected through multiple tubes to manifold towers where it is then split off into branching seed tubes of varying lengths to a point of eventual discharge into the soil. Sharp turns, bends, and forks in the distribution tubes cause restrictions on the material flow, and make balancing the system for even seed and particulate dispersal problematic. A modern air seeder may plant well over 100 rows of seeds simultaneously. If a partial or full blockage develops in one or more of the particulate flow tubes, air flow (and, therefore, particulate flow) increases proportionately in the remaining tubes, further complicating the balancing problem. To optimize the distribution of material and maintain an even balance of distribution, an air seeding system must employ some type of particulate flow monitoring system which measures the amount of particulate material flowing in the distribution tubes (the particulate flow path), a means by which the flow may be adjusted so that an operator can balance the system prior to field use, and a means to detect particulate flow disruption or blockage during use should field conditions cause the system to become unbalanced.

It should be noted that the term "blockage" will be used generally throughout the specification to refer to either a full and a partial blockage in some part of the air seeding system. A partial blockage will still allow some amount of air and material to flow past it, but will reduce the flow noticeably. A full blockage will not allow any material to flow past it (although it may be possible for a small amount of air to leak past a full blockage).

Seed monitoring systems do exist in prior art. One type of seed monitoring system uses optical sensors which detect changes in the amount of light being received from a light source as seeds and other particles pass between the light source and a sensor, blocking light that would otherwise impinge on the sensor. The attenuation of the light received is related to the amount of material passing through the beam. These optical sensors are subject to a number of problems particular to the technology. One such problem is caused by the non-uniformity of the intensity of the light beam used to sense the particles moving in the tube. If the beam intensity is not uniform, and two different but identically shaped and sized particles move through different parts of the light beam, they will produce different results to the receptor, even though they are identical particles. Hence, the amount of material passing in the tube is not directly correlated to the amount of light that reaches the optical sensor, which can result in an incorrect determination of the actual amount of material passing in the tube. In addition, the optical sensors may not be able to detect at all certain material that is moving through locations in the seed tubes that are not covered by the beam. Attempts to create more uniform or more complete light beams to correct these problems have been inadequate or overly complex. As a result, although in optimal conditions optical sensing systems may work well in detecting total tube blockage, they are not very effective in measuring overall material flow, particularly in situations where a great deal of material is flowing in the tubes.

Optical-based seed monitoring systems are also susceptible to problems in normal use caused by a build-up of dust and other foreign matter that can be found inside an air seeder. Often this build up is gradual, causing the sensor to lose calibration over time, becoming less capable of accurately detecting material flow. This build-up can ultimately block sensors and/or light sources completely, causing the system to determine that a large amount of material is moving through the seed tube, or that a blockage has occurred.

Another source of inaccurate readings in an optical seed monitoring system is that when two or more particles happen to line up in such a manner that an imaginary line drawn between them is parallel to the axis of the beam of light from the transmitter to the receiver, one particle can occlude another, causing them to be read as a single particle instead of multiple particles. In other words, one or more particles can hide in the shadow of another particle as they pass through the beam and not have an effect on the quantity of the light reaching the sensor, adversely affecting the ability of the sensor to accurately measure material flow. Further compounding this problem is that not all particles are uniformly shaped (i.e. spherical). An example of one such particle is a wheat seed, which is more or less cylindrical in shape. Such a particle will occlude the beam of light to a greater or lesser extent, depending upon the orientation of the seed as it passes through the light beam. As a result, it is generally not possible to tell with a reasonable degree of accuracy the amount of material moving past an optical sensor in an air seeder.

Another type of material flow monitoring system uses a piezoelectric sensor that is placed into a seed tube such that the moving particles strike the face of the sensor. When a particle strikes the piezoelectric sensor, the sensor is momentarily deformed, causing the sensor to generate a small electrical charge. The magnitude of the electrical charge is detected by an electronic circuit and the particle is counted accordingly.

However, piezoelectric sensors have a number of characteristics that can limit their usefulness when used in an air seeding application or other similar harsh environments. The sensors are high impedance and hence susceptible to interference by strong voltage fields in the environment. This characteristic demands that the sensor be placed close to the detection circuit in order to minimize the effects and occurrences of these fields. This is particularly a problem in an environment like that of an air seeder, where collisions of seeds, dust, fertilizer and other particles generate a large amount of static electricity, and where high electromagnetic field strengths are likely. Placing the sensing electronics in these areas, as dictated by the necessity to place the high impedance piezoelectric sensors close to their electronic discrimination circuitry, exposes them to premature failure as a result of electrostatic discharge and circuit overvoltage.

Another problem with piezoelectric sensors is that the crystal is prone to damage by cracking if overstressed. Because it is desirable to produce a signal strong enough to overcome the background noise inherent in an air seeding system, and because the amplitude of the signal generated by the sensor is directly proportional to the deflection of the crystal, piezoelectric sensors are often placed such that maximum deflection of the crystal is achieved, which requires location directly in the path of the material flow such that some material will strike the sensor pad with maximum impact. Being so placed, the piezoelectric sensors are subject to damage through impact and abrasion in being stuck by numerous, large, or fast moving particles in the air stream (small stones, for example) over a prolonged period of time. Further complicating matters, even though these sensors are placed directly in the path of material flow, they are characteristically struck by a relatively small portion of the total material flowing in the sensor tube, and hence are incapable of accurately measuring the total amount of material flowing in the line due to the relatively small amount of material that actually strikes the sensor.

In yet another embodiment, the piezoelectric sensors are designed such that a pin is attached perpendicular to the surface of the sensor. In this design, the piezoelectric crystal is not placed directly in the path of the material, which helps to mitigate damage which may be caused by material directly striking the piezoelectric material. This implementation is further beneficial in that the magnitude of the output signal of the sensor is amplified by virtue of the lever arm that is formed by the distance from the point of impact of the material on the pin to the surface of the piezoelectric material to which it is attached. However, a major drawback of this implementation is that material often gets lodged in the sensor tube because of the pin obstructing a portion of the flow path. Another serious drawback of this design is that the pins often fail after a period of use due to being repeatedly struck by the particles in the air stream. These sensors also fail to accurately measure the amount of material flowing in the line because only very small amount of the material actually strikes the pin.

Yet another drawback to currently deployed piezoelectric sensor based systems, or any prior art system that places electronic sensors in or near to the stream of material, is that they require that the electronics associated with the sensors be replicated in every location where the sensors are installed. With current state-of-the-art air seeders employing a hundred or more tubes, the cost of these sensors, if deployed in every tube, can become a significant impediment to the deployment of the system.

In an attempt to save system costs, some air seeding systems will place sensors in only a small percentage of seed tubes and use those sensors to estimate the overall performance of the machine. An example of such a system is a material flow monitoring system that uses piezoelectric sensors mounted on top of secondary distribution manifolds in an air seeder to estimate the amount of material flowing into the manifold. In this embodiment, a piezoelectric sensor is caused to vibrate when material striking the inside top of the distribution manifold creates vibrations which are transmitted along a mounting bolt into the sensor. The principle of operation is that the amount of vibration transmitted up through the mounting bolt is directly proportional to the amount of material striking the manifold top. The assumption is that, if a material distribution line leaving the distribution manifold becomes blocked, the amount of material entering the manifold will decrease, causing the noise generated to decrease, which will indicate that a line is blocked.

However, this system suffers from a number of serious shortcomings, principal of which is the lack of sensitivity of the system to partial blockages, whereby the flow to an individual tube may become partially restricted without substantially changing the total material flow into the distribution manifold; inasmuch as airflow and hence material flow will increase in the remaining distribution lines should one or more distribution lines become partially blocked. Another shortcoming of this system is that the amount of signal presented to the sensor can be highly variable from one manifold to the next on a single machine with multiple manifolds. Inasmuch as this system uses a common "sense line" and hence a common blockage sensing threshold, the level at which the system must be set in order to operate without causing blockage alarms must necessarily be less than the least sensitive node in the system. Therefore, the system can operate without alarm should a secondary distribution line become blocked or partially blocked in a manifold with a higher threshold requirement. Additionally, since this system is designed as a blockage monitoring system, it lacks both the sensitivity and granularity to be used as a material flow measurement system. Finally, this system, and others like it that do not use a sensor in each final run, are incapable of being used to help balance the flow of material across the final distribution runs of an air seeder system.

An important metric for measuring the balance of an air seeder system is the "Coefficient of Variation." "Coefficient of Variation," or CV, is a technical term used to describe the variability in the metering and distribution of material from the seed hopper throughout the seed tubes and into the soil. The CV is expressed as a percentage difference between the various final seed runs (known as "secondary seed tubes") across the width of a seeder. The Prairie Agricultural Machinery Institute has published guidelines for CV values as its basis for rating the uniformity of distribution for seeding implements. These guidelines describe the rating scale as: a CV greater than 15% is unacceptable, a CV between 10% and 15% is acceptable, and a CV less than 10% is good.

If there is not a sensor capable of measuring material flow in every secondary seed tube, the only method of determining the CV for an air seeder is to run material through the system, collect the output of each of the final distribution tubes in separate containers, weigh the containers and compare their weights. This is obviously a laborious process which may have to be repeated multiple times as an individual is attempting to balance a system.

Even if sensors described in prior art are used in every secondary seed tube on an air seeder, these sensors are not, for the most part, designed to measure material flow, but rather are designed to detect lack of material flow (blockage). Assuming these sensors could be used to accurately measure material flow, there still is currently no efficient way of balancing the outputs of these tubes based on the data from the sensors. Some air seeding systems utilize hinged diverters or baffles at a branching point in a tube to direct more or less air flow down one of the two branches, but this can only affect the flow of the two branches of that particular tube in relation to each other, and does not correct any imbalance which may exist further downstream in the system.

Another problem common to all modern air seeders is the severe environmental conditions under which the equipment must operate. These conditions include extremes in vibration, dust, temperature, humidity, shock and moisture. As a consequence, electrical and electronics components utilized in these systems must be very robust or risk premature failure. It is undesirable to introduce components into this environment that by virtue of their electrical complexity are prone to failure. Unfortunately, that is precisely the situation with many of the flow monitoring systems in use today. Monitor systems of the present art, for the most part, employ sensors which are uniquely powered and addressed, resulting in hundreds of connections which are prone to failure due to the severe environmental conditions under which they must operate.

What is needed in the art is an inexpensive but accurate method of sensing and measuring the material flow in every secondary seed tube on an air seeder simultaneously, as well as a means for controlling or changing the air flow in each individual seed tube on the implement based on data derived from these sensors so as to properly balance the system and attain optimum seed uniformity.

Modern vehicles are generally operated with relatively sophisticated control systems, including digital processors and other electronic components. Such control systems typically include monitors and other user interface devices for enabling operators to monitor and control operations. Designing and manufacturing monitors and other interface devices for retrofitting on existing equipment can be challenging due to the wide variety of equipment systems and functions which must be accommodated. For example, tractors, implements and other equipment commonly used for agriculture typically have specialized monitoring and display requirements associated with their operations. Cultivating, planting, spraying and harvesting operations are commonly monitored and controlled with special-purpose devices for maximizing crop yields and optimizing equipment usage efficiencies. Various OEM and after-market systems and devices are commercially available for these purposes.

Some attempts have been made to address these challenges by decentralizing the display intelligence and moving the processing power out to each vehicle and/or implement, and then creating a "dumb display" that can accept industry standard messages from vehicles and implements which contain display directives. "Virtual terminals" meeting industry-standard protocol requirements and compatible with various vehicles and implements are commercially available, but are often subject to cost, performance and installation disadvantages. What is needed in the art is a method and system for controlling vehicles and implements and displaying information therefrom using inexpensive wireless mobile devices. Operators can move the mobile devices to alternative locations, including outside the vehicles, while still using the mobile devices for vehicle controls, monitors and displays. Operators can use the wireless networking capabilities of the mobile devices to tie into any number of external, third-party applications via cloud server interfaces.

SUMMARY OF THE INVENTION

In accordance with the teachings of the present invention, a particulate flow measurement, monitoring and balancing system is disclosed. The system has a particular use for monitoring and measuring the particulate flow in a pneumatic system such as an air seeder, such particulate flow consisting of seeds, fertilizer, or a combination of both seeds and fertilizer; and, based upon data derived from sensors in the system, provide a means to simply and effectively balance the material flow being dispensed by a plurality of seed tubes so as to affect uniform distribution of the material across the field. Each system consists of a plurality of discrete sensors placed in the particulate flow tubes such that the signals received are analyzed by a computational means, the data from which is transmitted to a central operator interface.

Each discrete sensor consists of an acoustic sensing means which is placed into the flow of material such that substantially all of the particulate traveling in the tube strikes the sensing means. In striking the sensing means, the particulate undergoes a change in momentum resulting in an impulse of energy being transferred from the material into sound power. The sound power is directed by an acoustic pathway onto a MEMS microphone, the output of which is digitized and analyzed with respect to energy and frequency. Numerous acoustic pathways are directed to a single computational means, thus reducing the complexity of the system and the number of required electrical connections.

An operating system can consist of one or many computational nodes and one or many discrete sensors. Each node will be capable of communicating with each other node and with a master operator interface node on a system by wireless means.

A new vehicle control and gateway module will be described. The invention described herein is centered around an electronics module called the gateway module, which acts as a bridge between the proprietary communication busses standard on a vehicle (such as those commonly seen on commercial agricultural and construction vehicles, including the standardized communication busses used for operator displays in the vehicle), and various external, remotely-located wireless networks (including but not limited to personal area networks, local area networks (LANs), mesh networks, wide area networks (WANs), metropolitan area networks, and cellular networks). The gateway module receives messages from one system (from one or more of the vehicle busses or from one or more of the off-board wireless networks), interprets the message, translates it into a form appropriate to the receiving system, and transmits it to the receiving system seamlessly. This allows a mobile device to access data from the vehicle as needed, or even to be used as a controller for the vehicle. It also allows an application programming interface (API) to be created that will allow an external, web-based application to access and use vehicle-generated data (such as vehicle service information, vehicle or implement status, seed or chemical quantity, etc.).

BRIEF DESCRIPTION OF THE DRAWINGS

FIG. 3 shows an example of how the primary seed tubes bring seeds to the secondary manifolds, which in turn branch the flow of material into several secondary seed tubes.

FIG. 4A shows a stand-alone, cutaway view of an acoustic sensor of the present invention.

FIG. 7A shows an alternative embodiment of the acoustic sensor where the air flow restrictor of FIG. 6 is built into the acoustic sensor housing.

FIG. 7B shows the alternative embodiment of the acoustic sensor from FIG. 7A with a cutaway view of the air flow restrictor.

FIG. 7C shows the cutaway view of the air flow restrictor from FIG. 7B, but with the restrictor shell tightened such that the restrictor fingers are squeezed more tightly together.

FIG. 8 illustrates how the blockage monitoring nodes of FIG. 5A communicate wirelessly with a handheld computing device, which may be used as both a system display and control device.

FIGS. 10A, 10B, and 10C illustrate how the blockage monitoring nodes of the present invention can communicate wirelessly with each other, as well as with a remote information display.

FIGS. 12A and 12B illustrate one embodiment of an algorithm for determining when an air seeding system using the present invention is stopping or turning around at the end of a field, allowing the blockage alarms to be disabled to prevent false alarms.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

II. Air Seeder Monitoring and Equalization System and Method

With reference now to the drawings, and in particular to FIGS. 1 through 14 thereof, a new air seeder monitoring and equalization system embodying the principles and concepts of the present invention will be described.

Figure 1:
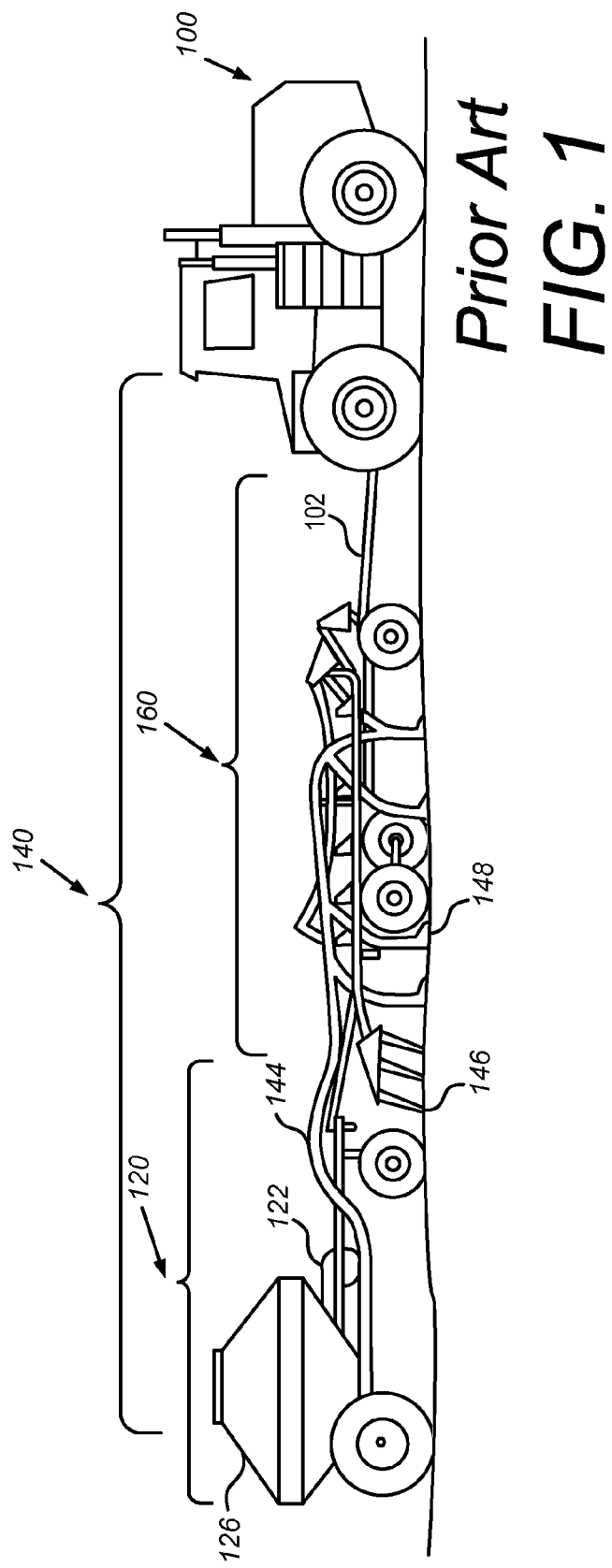
FIG. 1 shows a side view of a typical air seeding system being pulled by a tractor.

FIG. 1 shows a side view of a typical air seeding system being pulled by a tractor, which illustrates a typical system on which the present invention may be employed, and to provide a context for the present invention. A tractor 100 is towing an air seeding system 140. The air seeding system includes a tool bar 160 and an air cart 120, and is connected to the tractor by a tow bar 102. It should be noted that the configuration and details of the system shown in FIG. 1 are meant to be exemplary, and the actual system may vary in the exact configuration and components. For example, in some configurations, the position of the air cart 120 and the tool bar 160 may be reversed, such that the air cart 120 tows the tool bar 160.

While the exact configuration of the system shown in FIG. 1 does not limit the present invention, certain components of the system should be highlighted for clarity. Additional details on the configuration and operation of the air seeding system are provided in FIG. 2, which will be discussed shortly. The air cart 120 consists of one or more hoppers 126 which contain the material that is to be dispensed into the soil during operation. The material to be dispensed may be a particulate, which may consist of any particles suitable for achieving the purpose described herein, such as seeds, grains, herbicides, fertilizers, chemicals, etc., or any combination thereof; however, for the purposes of this discussion, the material will be referred to generically in the text of this specification as seeds. Any operations described herein in reference to seeds may also be applied to any other appropriate particulate or combination without changing the inventive concept.

It is important to note that the air cart 120 may actually have more than one hopper 126, and that each hopper 126 may contain a different type of material. For example, one hopper may include seed and a second hopper may contain fertilizer or other chemicals. It is also possible that the air seeding system 140 may itself include more than one air cart 120, with each air cart 120 potentially holding a different type of material. The exact number of air carts 120 in an air seeding system 140, as well as the exact number of hoppers 126 per air cart 120, can vary within the scope of the invention presented herein.

A fan 122 is connected to the air cart 120, and is used to introduce a flow of air into the implement which is used to carry seeds throughout the system. In general terms, seeds are dropped into a primary manifold 124 from the hopper 126, where they enter into the flow of air provided by the fan 122. The seeds flow from the primary manifold 124 to the primary seed tube 144 to secondary seed tubes (not shown in FIG. 1) distributed throughout the tool bar 160. The air and seeds flow through the tool bar 160 and are deposited into a furrow dug in the ground by openers 148. The openers 148 are blades which extend into the soil, and create furrows for holding the seeds as they are drawn through the ground. As the tractor 100 and air seeding system 140 continue forward, the furrows created by the openers 148 are pushed shut by closers 146, covering the dispensed seeds with soil.

Figure 2:
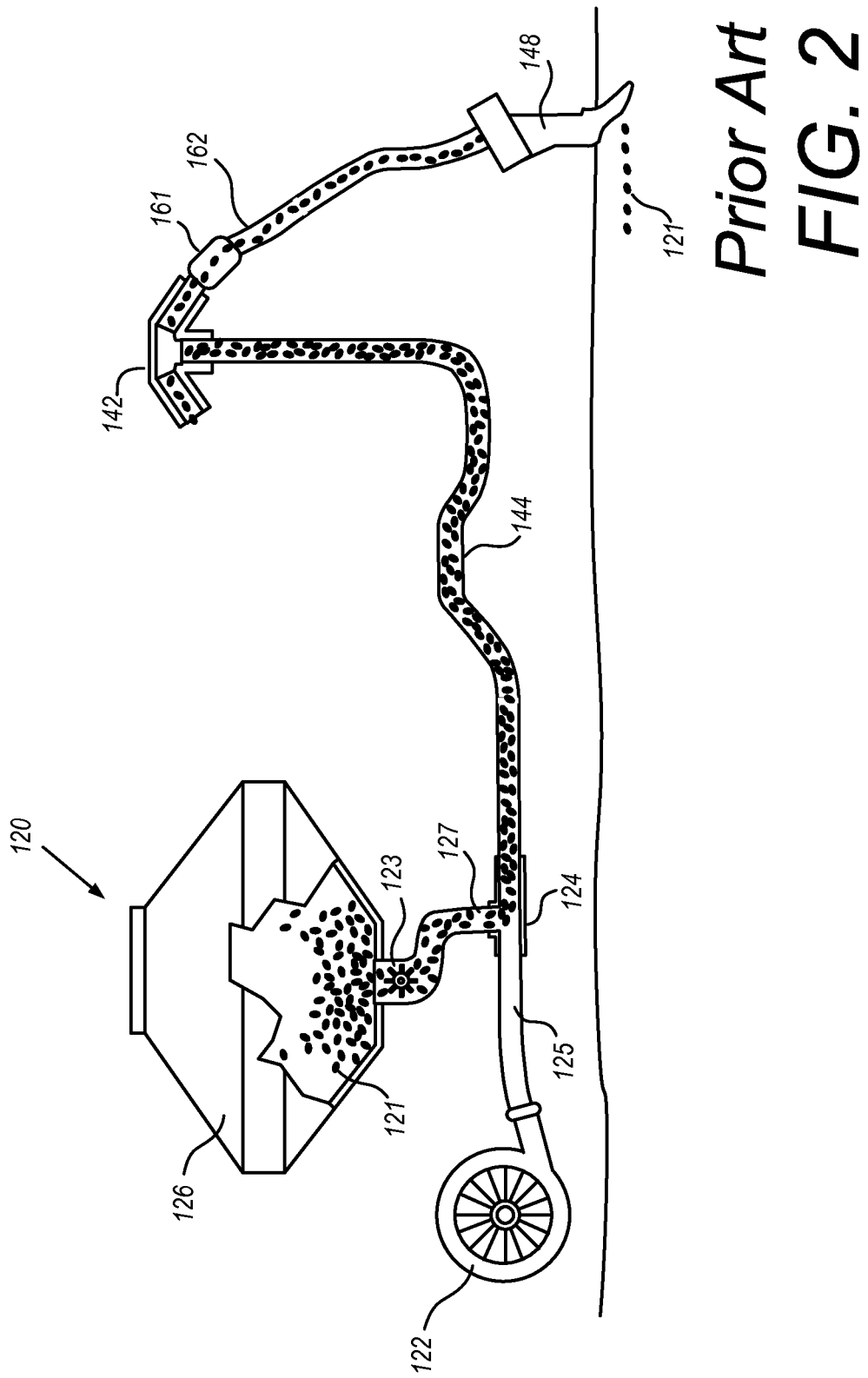
FIG. 2 shows a cutaway view of one embodiment of an air seeding system.

Referencing now to FIG. 2, a cutaway view of a portion of the air seeding system 140 is shown, detailing the path of seeds and particulate flow through the system. As with FIG. 1, FIG. 2 is intended to show an exemplary system to outline the functioning of a typical air seeding system, and is not meant to be limiting in any way. Various changes to the configuration and components of the system can be made without affecting the overall inventive concept presented herein.

For the example embodiment of an air seeding system shown in FIGS. 1 and 2, we will use the terms "primary" and "secondary" to indicate a component's relative position on the example air seeding system shown. In this example, seeds leaving the hopper first enter into a primary manifold, where they are divided into one or more primary seed tubes. The primary seed tubes carry the seeds away from the air cart and onto the tool bar, where the primary seed tubes each flow into a secondary manifold, where the flow of material is once again divided. From each secondary manifold, the seeds flow into secondary seed tubes, and eventually down into the furrow being made in the ground by the openers on the air seeder. It should be noted that the exact configuration of the manifolds and seed tubes is not critical to the key inventive concepts presented herein, and that the present invention will work on any configuration of air seeder. What is critical to the inventive concepts presented herein is that the amount of material flowing through each of the final seed runs in the system, just prior to the seeds leaving the machine and flowing into the earth below, is sensed as described herein. In the example system presented in the figures contained herein, these "final seed runs" are referred to as secondary seed tubes, but they could be called by another name in another system. This example system is further described, with the appropriate reference designators, in the following text.

The air cart 120 includes a hopper 126 which holds the seeds 121 to be dispensed by the implement. The seeds 121 are released from the hopper 126, falling into a conduit 127 that is connected to the rest of the system. As the seeds 121 pass into the conduit 127, the rate of their flow is controlled by a metering system 123. The seeds 121 fall through the conduit 127 into the primary manifold 124, where they are introduced to the flow of air produced by the fan 122. The fan 122 is connected to the primary manifold 124 by a hose 125.

The seeds 121 are propelled out of the primary manifold 124 by the flow of air and enter into one or more primary seed tubes 144. From the primary seed tube 144, the seeds 121 travel into a secondary manifold 142, where the flow of seeds 121 is split or branched in several directions and directed into a plurality of secondary seed tubes 162. The secondary seed tubes 162 then deliver the seeds 121 down into and behind the opener 148, where the seeds 121 fall down into the furrow in the ground created by the opener 148. Block 161 in FIG. 2, shown in the location between the secondary manifold 142 and the secondary seed tube 162, is one possible location for the sensor and restrictor components described in detail in FIGS. 3 through 6.

FIG. 2 illustrates a single path through the system from the hopper 126 to an opener 148. To better illustrate how an air seeding system represents a complex fluid dynamics problem, it is helpful to describe the flow of material through an air seeder. FIG. 3 shows one example of an air seeding system which can seed up to ninety-six rows simultaneously. An air seeder with ninety-six rows is a common configuration, and modern air seeding systems may have more than one hundred rows. For the example air seeder shown in FIG. 3, only certain components are depicted to show the flow of material through the system. For ninety-six rows, this example system uses eight primary seed tubes 144 supplying a flow of material to eight secondary manifolds 142. Each of the eight secondary manifolds 142 then split the flow of material into twelve separate secondary seed tubes 162. In FIG. 3, only a portion of each of the secondary seed tubes 162 is shown (in dashed lines) to simplify the drawing. In reality, each of these ninety-six secondary seed tubes 162 will flow out onto the tool bar 160 and down into each of ninety-six openers 148, where the flow of seeds 121 will be injected into the corresponding furrow.

As illustrated in FIG. 3, the length of the primary seed tubes 144 will vary, depending on which secondary manifold they are routed to. The primary seed tubes 144 are routed over the structure of the tool bar 160, and may each have dips and bends where the flow of seed material can be slowed or otherwise disturbed. The secondary manifolds 142 are typically raised on towers, and the primary seed tubes 144 rise up into the towers, causing the flow of material to flow straight up, directly against gravity. Within the secondary manifolds 142, the flow of material is branched in twelve different directions (in this example), and follows the air flow into the secondary seed tubes 162. Similar to the primary seed tubes 144, the secondary seed tubes 162 must also be routed from the secondary manifolds 142 across the structure of the tool bar 160 and into the furrows behind the openers 148. The flow of air created by the fan 122 is split ninety-six times (in this example), and each branch of this flow has a different geometry and length, creating different impediments to the flow of air and airborne material and hence completely different flow characteristics. Creating a system in which this flow of material is balanced with all of the flows coming into the openers 148 on the system are essentially the same, is an extremely difficult task. The present invention provides an inexpensive yet accurate particulate flow monitor and a method of balancing the flow of particulate throughout the entire particulate flow path of a pneumatic system, such as an air seeding system.

Throughout this specification, various terms may be used interchangeably to describe the present invention. As previously discussed, the term "seeds" will be used generally to cover any type of particulate (that is, a material made up of particles or droplets) that is flowing through a system. Although the examples given herein primarily represent an air seeding system, the same inventive concepts may be applied to any particulate flow system in which particles or droplets of material are pushed through the system by a flow of air. Because the systems being described are based on flowing air, the term "pneumatic system" may be applied to these particulate flow systems. In general, the term "pneumatic" means filled with air, especially compressed or forced air.

The detailed description describes various embodiments and features of a particulate flow monitor, or simply flow monitor, which, for the purposes of this description, is a means of sensing the amount of particulate matter flowing through a pneumatic system at a given time. Other terms for a particulate flow monitor may include "seed flow monitor" or "material flow monitor."

The key inventive component of the present invention is an acoustic sensor, also referred to as an acoustic transducer. The purpose of the acoustic sensor or transducer is to transform the sound waves generated by the flow of particulate material in a pneumatic system into electrical signals representing the amount of particulate flow through the flow paths of the pneumatic system. Sound waves are created by the vibrations of an object in air, which causes the air to be compressed in waves or impulses. The acoustic sensor detects the pneumatic impulses created by particulate striking the face of the acoustic sensor and directs them into an internal microphone, where the impulses are transformed into electrical signals to be interpreted by a processor.

For the purposes of this discussion, the term "processor" or "controller" is used in a general sense to describe electronic and/or software means for processing signals and/or data generated by a system, and may refer to a microprocessor, a microcomputer, or a separate computer system. A processor may be part of an "electrical signal generator," which is a module or collection of modules or functions that interpret data items or events (such as pneumatic impulses) and output electrical signals representing the data items or events.

The present invention also provides a means of displaying or outputting the electrical signals and/or the information they represent. This may be done using a direct mounted computer monitor (that is, a display built in or directly wired into a vehicle or application) or on a handheld computing device. The term "handheld computing device" is intended to generally refer to any type of easily portable computing platform that does not require being directly wired into a vehicle or application. One example of such a device is the iPad manufactured by Apple, Inc. Other examples may include a laptop computer, a tablet computer, or even a personal cellular phone with sufficient processing and displaying capabilities.

The present invention will now be described in additional detail in the following text and the remaining figures.

Figure 4B:
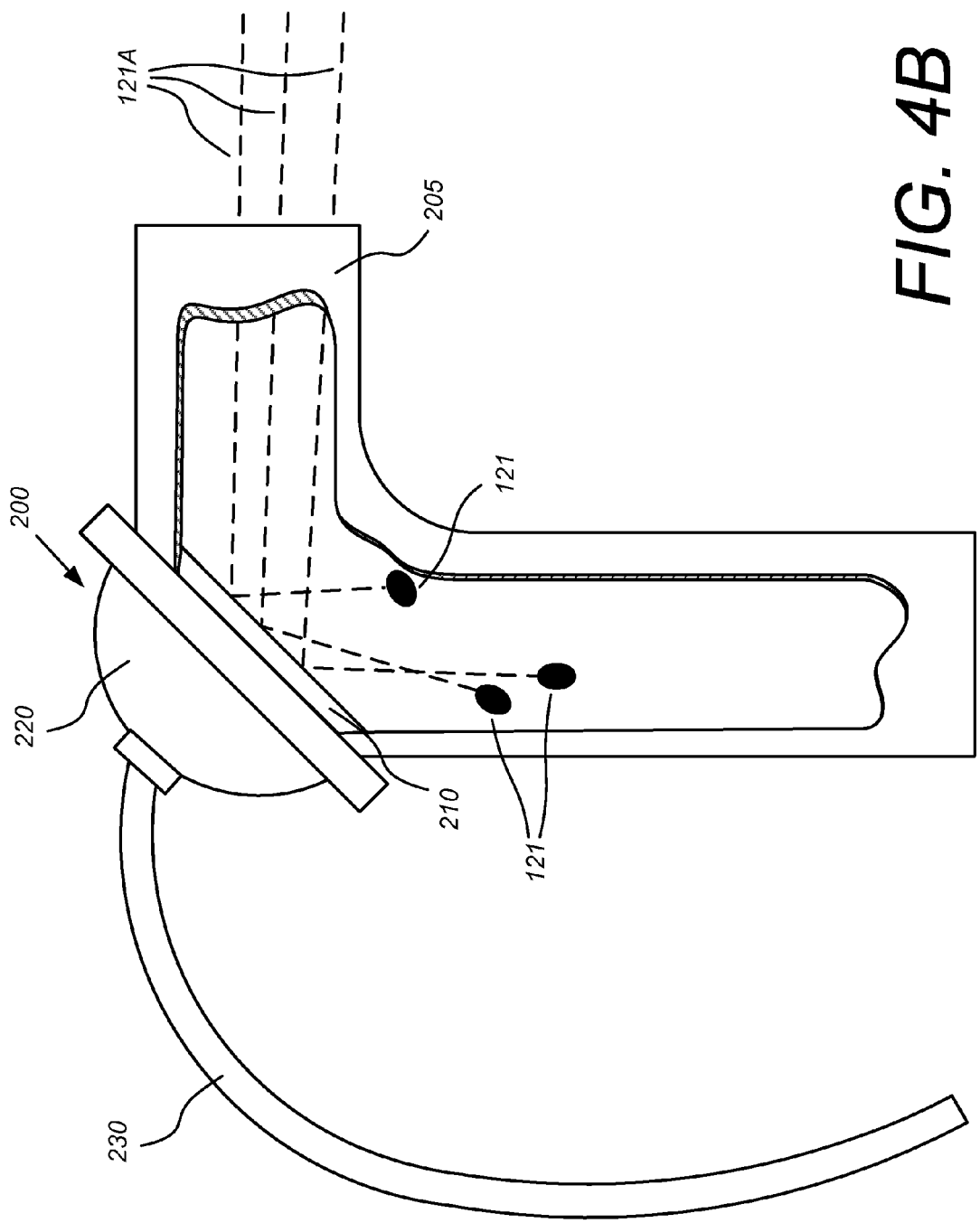
FIG. 4B shows a cutaway view of the mounting of an acoustic sensor of the present invention, showing how the sensor interacts with and detects seeds.
Figure 5A:
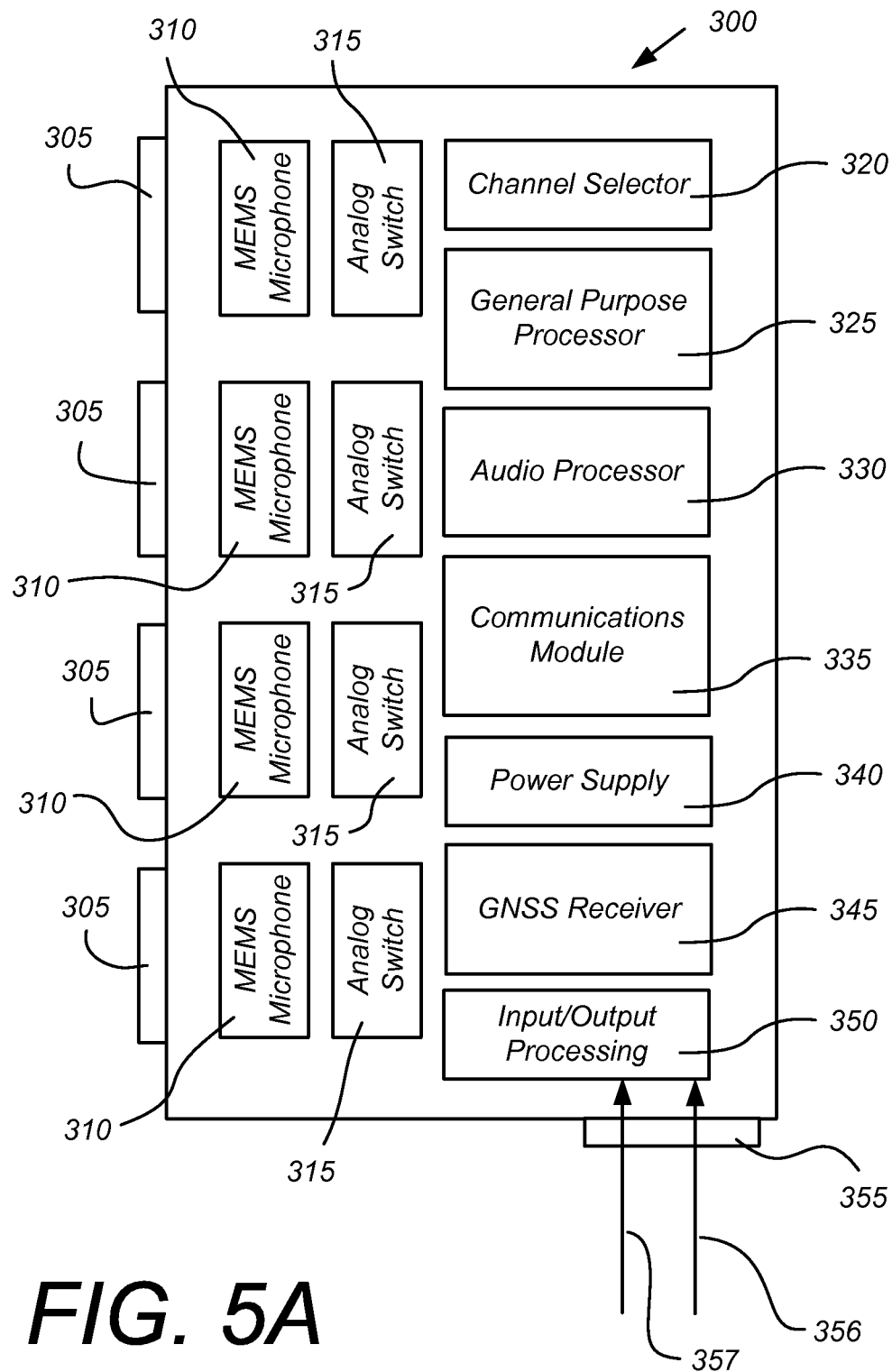
FIG. 5A shows a block diagram of a blockage monitoring node of the present invention.
Figure 5B:
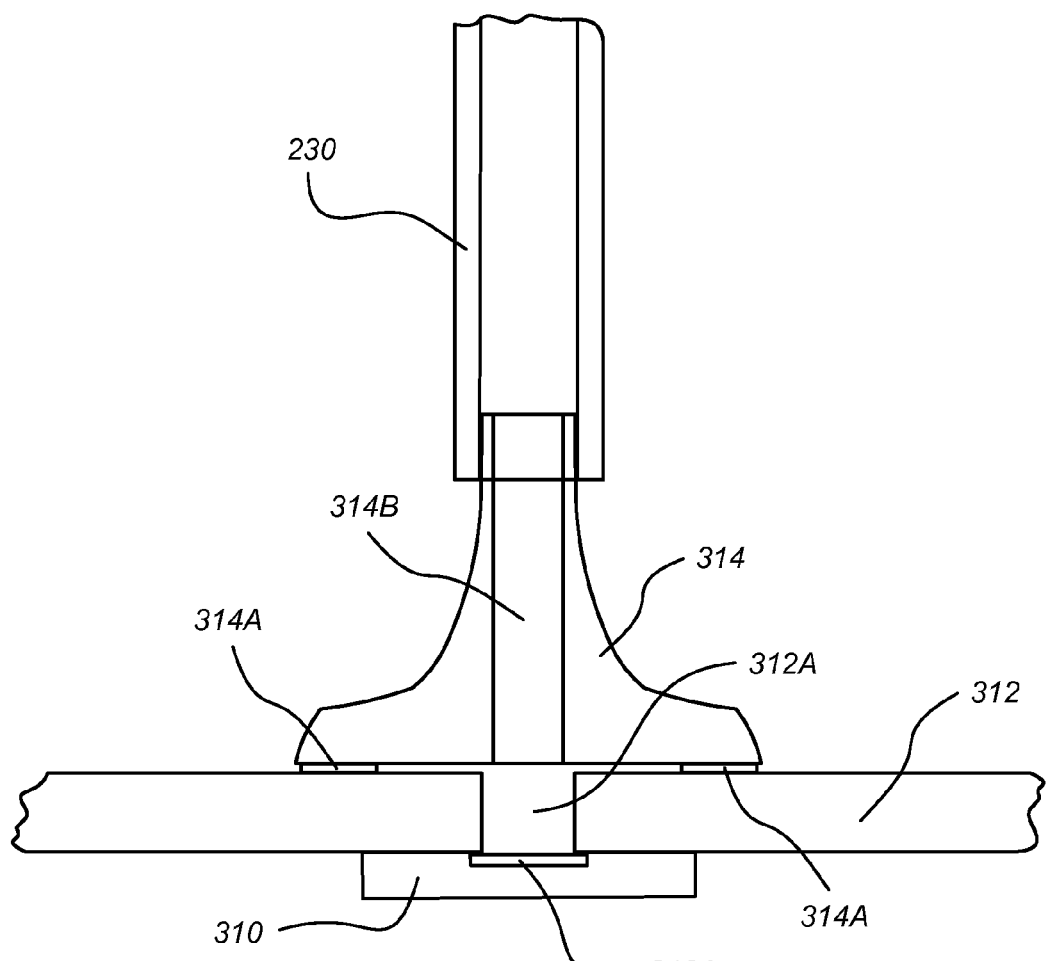
FIG. 5B shows a cutaway view of one embodiment of the connection between the transmitting hose and the microphone mounted inside the blockage monitoring node.

Referencing now to FIGS. 4A and 4B, an embodiment of an acoustic sensor used for detecting the amount of seeds and material flowing through the system will be discussed. FIG. 4A shows a stand-alone, cutaway view of an acoustic sensor of the present invention. The acoustic sensor 200 is a mechanical component that is designed to pick up, amplify, and direct sound from the inside of a seed tube into a separate electronics module called a blockage monitoring node 300. The blockage monitoring node 300 is not shown in FIGS. 4A and 4B, but is presented in detail in FIGS. 5A and 5B, and FIG. 5B shows one embodiment of how the blockage monitoring node 300 may be mounted along with one or more acoustic sensors 200.

In FIG. 4A, a sensor plate 210 is mounted over a hollow acoustic chamber 220. In the preferred embodiment, the sensor plate 210 is constructed of a durable material such as stainless steel which can withstand the impact of seeds, rocks, and other materials which may enter the material stream flowing through the air seeding system, and can also transmit sound into the acoustic chamber 220. Although stainless steel offers an ideal surface that provides high-amplitude signals and is both strong and resistant to corrosion, it is important to note that any appropriate material can be used to create the sensor plate 210. A gasket 215 is placed over or between the sensor plate 210 and the acoustic chamber 220 to prevent material from getting inside the acoustic chamber 220, thereby affecting the acoustic properties of the sensor, and also as a means of holding the sensor plate 210 in place. The gasket 215 may be a separate piece or may be applied as a paste in a dispensing operation. The gasket 215 is a flexible or spongy material that can be readily compressed to form an airtight seal between the sensor plate 210 and the acoustic chamber 220.

The acoustic chamber 220 is designed such that it can direct the sound picked up from objects striking the sensor plate 210 and direct them toward the back of the acoustic chamber 220, where they enter a transmitting hose 230. The sound travels through the transmitting hose 230 and is directed into the blockage monitoring node 300 (shown in FIGS. 5A and 5B).

In the preferred embodiment, the acoustic chamber 220 is made from an injection-molded plastic, such as those plastics commonly used for the construction of electronics enclosures and which withstand the extreme conditions found in the harsh environment of an air seeding system. However, the acoustic chamber 220 may be constructed by any appropriate manufacturing technique and using other materials without changing the inventive concept of the acoustic chamber 220.

The selection of materials is very important for the design of an acoustic sensor. The thickness and density of the material (for example, the sensor plate 210) will determine the frequency of the sound data that is transmitted into the acoustic chamber 220, and thus the sensor design can be "tuned" such that the frequencies it produces fall into an environmental "sweet spot" which is relatively free of background noise. Similarly, the design of the transmitting hose 230 is critical. The material of the transmitting hose 230 can have a filtering or attenuating effect on the noise that is transmitted down its length. If the transmitting hose 230 is too soft, it may also collapse and cut off sound transmissions. The material should be chosen with consideration for stiffness and such that the filtering effect of the transmitting hose 230 will not attenuate the frequencies in the system "sweet spot."

The transmitting hose 230, in the preferred embodiment, is constructed from a length of rubber hose. This material is flexible and allows the transmitting hoses 230 of several separate acoustic sensors to be easily routed to a nearby blockage monitoring node 300. However, the transmitting hose 230 may be made in a different manner, in a different geometry, or with a different material without altering its function, which is to create a conduit of sound which directs the sounds from the acoustic sensor 200 into a blockage monitoring node 300. The acoustic sensor 200 is a simple mechanical solution which can be easily and inexpensively manufactured. The acoustic sensor 200 does not contain electronics, but instead routes the sounds it detects to a remotely located node where the sounds can be processed. As shown in FIG. 5B, the outputs of several acoustic sensors 200 can be directed into a single blockage monitoring node 300, so that the total amount of electronics on the air seeding system can be minimized, significantly reducing system cost and increasing system reliability.

Referencing now FIG. 4B, the acoustic sensor 200 is shown mounted on a hollow, tubular sensor housing 205. The sensor housing 205 provides a mounting point for the acoustic sensor 200. In the preferred embodiment, the sensor housing 205 is mounted between the secondary manifold 142 and the secondary seed tube 162 (placed in the position marked as 161 in FIG. 2, and as shown in FIG. 5B). The sensor housing 205 is essentially a rigid piece of tubing, bent at an angle such that the acoustic plate 210 of the acoustic sensor 200 will be impacted by seeds 121. The acoustic sensor 200 is mounted in an opening at the bend of the sensor housing 205, such that the acoustic plate 210 is directly exposed to the flow of material leaving the secondary manifold 142. Multiple seeds 121 are blown into the sensor housing 205 (following seed travel paths 121A, shown here as examples), where they impact the acoustic plate 210 and are deflected back down into the sensor housing and continue traveling down into the secondary seed tubes 162. Sounds created by the impacts of the seeds 121 on the acoustic plate 210 are transmitted into the acoustic chamber 220, and then are directed into the transmitting hose 230.

It should be noted that the sensor housing 205 could be designed such that it is an integral part of the acoustic sensor 200, or it could be a separate piece that connects the output of the secondary manifold 142 to the input of the secondary seed tubes 162. Although the angle of the sensor housing 205 is shown to be approximately 90 degrees in the figures, the ideal angle may be different, and would be calculated based on the geometry of the air seeding system for which the sensors are being designed. The angle of the acoustic sensor 200 would be optimized such that is presents the acoustic plate 210 to the flow of seeds 121 such that the sounds of impact can be adequately detected without adversely affecting the flow of material.

FIG. 5A is a functional block diagram of one embodiment of the blockage monitoring node 300 referenced previously in the specification. FIG. 5A shows one embodiment of the blockage monitoring node 300 capable of connecting to four acoustic sensors 200. The transmitting hoses 230 from one or more acoustic sensors 200 would connect to the blockage monitoring node 300 via a hose port 305. In alternative embodiments, the blockage monitoring node 300 may have any number of hose ports 305, and would likely offer the same number of hose ports 305 as there are acoustic sensors 200 on a single secondary manifold 142. As shown in the example system configuration of FIG. 3, each secondary manifold 142 would have a dedicated blockage monitoring node 300 (for a system total of eight blockage monitoring nodes 300), and each blockage monitoring node 300 would have a total of twelve hose ports 305. The number of hose ports 305 for a single blockage monitoring node 300 is variable, and may be any appropriate number.

Returning to FIG. 5A, for each hose port 305, there is a corresponding MEMS microphone 310 and a corresponding analog switch 315. "MEMS" is an acronym which stands for Micro-Electro-Mechanical Systems, and is used generally to refer to small devices or components which are micrometers (microns) in size. The MEMS microphones 310 receive the sound waves through the hose port 305 as they travel down from the transmitting hose 230 from the acoustic sensor 200. The analog switches 315 are used by the blockage monitoring node 300 to select which of the input streams from the MEMS microphones 310 should be processed at a given time.

MEMS microphones 310 are preferred for several reasons. Not only are the MEMS microphones 310 very small parts, contributing to a small blockage monitoring node 300, but they are also manufactured from a process that produces consistent parts, with very little part-to-part variation. This is important because it means that no calibration is required to account for the large part-to-part variations seen in traditional (non-MEMS) microphone components.

A general purpose processor 325 is provided to control the basic operations of the blockage monitoring node 300. A channel selector circuit 320 is controlled by the general purpose processor 325, and is used to toggle the analog switches 315 to select which of the MEMS microphones 310 should be processed. The audio signals captured by the MEMS microphones 310 are sent to an audio processor 330. In the preferred embodiment, the audio processor 330 is a high-end audio frequency processor, ideally suited for processing the frequency-based audio data captured from the acoustic sensors 200.

The blockage monitoring node 300 contains a communications module 335, which is responsible for communicating the analyzed audio signals and related data to a remote device, such as a central display in the tractor cab. Alternatively, the communications module 335 may transmit the data to an off-board device, such as a tablet computer or similar handheld computing platform. In the preferred embodiment, the communications module 335 is a wireless transceiver, capable of both transmitting and receiving information via a wireless protocol. An alternative embodiment of the communications module 335 is the circuitry required to communicate over a hardwired connection, such as a serial communications bus.

The blockage monitoring node 300 also has a power supply circuit 340, which is used to process and regulate the power coming into the blockage monitoring node 300, and provide it as necessary at the proper voltage level for the functional blocks shown in FIG. 5A. In one embodiment, the blockage monitoring node 300 will receive power from the implement or tractor through a wired connection. In another embodiment, the blockage monitoring node 300 could have its own internal power source, such as a battery pack.

In at least one embodiment, the blockage monitoring node 300 contains a global navigation satellite system (GNSS) receiver 345 to provide information on the location of the blockage monitoring node 300 in three-dimensional space. The GNSS receiver 345 may comprise any appropriate device for receiving signals from geosynchronous satellites and/or ground-based stations. Common examples of deployed, available GNSS systems include the global positioning system (GPS) and the Russian GLONASS system.

The general purpose of the GNSS receiver 345 is to allow the blockage monitoring node 300 to determine its current position at any given moment in time, and, by knowing its current position, to be able to calculate a ground speed (by determining how far the air seeding system has moved between two points in time) and to determine whether the air seeding system has reached the end of the field (which it may determine by detecting a reducing ground speed combined with consecutive changes in position that indicate the vehicle is turning around).

Also, some embodiments of the blockage monitoring node 300 may include the ability to accept inputs other than the audio signals entering the blockage monitoring node 300 through the hose ports 305. For instance, the blockage monitoring node 300 may accept a work switch input 356, which could be a digital switch input indicating that the operator of the air seeder has stopped the flow of seed through the system (perhaps because they have reached the end of the field and are turning around and do not wish to seed in this area). Another potential input the blockage monitoring node 300 may receive is an alternative ground speed input 357 (from a source such as a speed sensor that may already exist on the system). Inputs such as the work switch input 356 and alternative ground speed input 357, as well as additional outputs, may enter and leave the blockage monitoring node 300 through one or more I/O connectors 355. A block of input/output circuitry 350 would control and process the inputs and outputs from the blockage monitoring node 300.

FIG. 5B shows a cutaway view of one embodiment of the connection between the transmitting hose and the microphone mounted inside the blockage monitoring node. The components shown in FIG. 5B are internal to the blockage monitoring node 300. Inside the blockage monitoring node 300, the required electronics are mounted to a printed circuit board, or PCB, 312. A portion of the PCB 312 is shown in FIG. 5B, highlighting the acoustic connections made to the PCB 312.

A MEMS microphone 310 is mounted to the back or bottom side of a PCB 312, positioned so that a resistive membrane 310A built into the MEMS microphone 310 is directly in line with a hole 312A that passes through the thickness of the PCB 312. On the top or front side of the PCB 312 (that is, on the side of the PCB 312 opposite that of the MEMS microphone 310), an acoustic coupler 314 is attached to the PCB 312 with an adhesive 314A. The hollow center of the acoustic coupler 314B is positioned such that it lines up above the hole 312A in the PCB 312. The end of the transmitting hose 230 (the other end of which is attached to the acoustic sensor 200) is placed over top of the acoustic coupler 314. Sounds passing into the acoustic sensor 200 as pressure waves are directed into the transmitting hose 230, travel down the transmitting hose 230 into the acoustic coupler 314, and pass through hole 312A to strike the resistive membrane 310A. The resulting vibrations on the resistive membrane 310A are detected in the MEMS microphone 310 as changes in electrical characteristics, which can be interpreted by other electronics (not shown) mounted on or near the PCB 312.

It should be noted that other types of non-MEMS microphones could be used without changing the inventive concepts of the present invention. MEMS microphones are used for their size, reliability, and uniformity, as described previously. Also, the technology used for the MEMS microphones of the present invention is resistive (in which the amount of resistance in the membrane changes when it is compressed by sound waves), and this technology is inherently immune to the environmental noise present in an air seeding system.

Figure 5C:
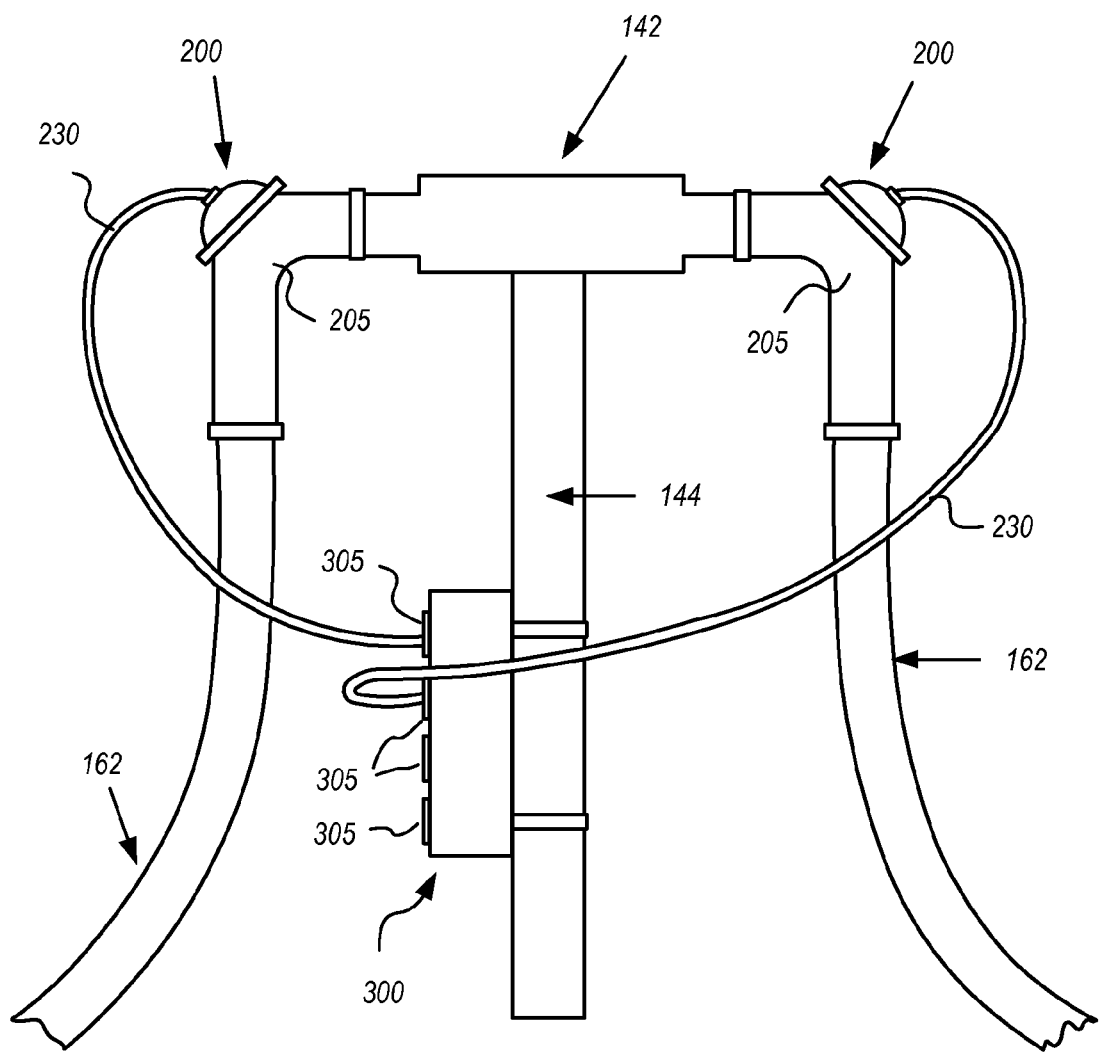
FIG. 5C shows a side view of the blockage monitoring node of FIG. 5A in use as it would be mounted and connected to the acoustic sensors of the present invention.

FIG. 5C shows how the blockage monitoring node 300 may be mounted on the air seeding system and interconnected with other system components. As previously discussed, the examples shown in the figures show one possible configuration, and configuration details may change in the implemented system without affecting the invention content. Specifically, the blockage monitoring node 300 shown here offers only four hose ports 305, and only two acoustic sensors are shown connected to the system. Detail on the secondary manifold 142 has been omitted for clarity. In a real system, several additional acoustic sensors 200 would be present (up to twelve per manifold for the example system shown in FIG. 3), and the blockage monitoring node 300 would have a corresponding number of hose ports 305.

The intent of FIG. 5C is to show how the components of the present invention would be utilized on a typical secondary manifold tower 142. In the preferred embodiment, the blockage monitoring node 300 is attached to a rigid vertical section of the primary seed tube 144. As material flows up through the primary seed tube 144, it enters into a secondary manifold 142 and is split into multiple sub-streams. For simplicity, FIG. 5B shows only two such branches from the secondary manifold 142, one going to the left and one going to the right, but in reality these branches would occur in several directions, directed radially out from the center of the secondary manifold 142. The sensor housing 205 attached to each acoustic sensor 200 acts as a connector from the secondary manifold 142 to the secondary seed tubes 162. As the branched flow of material passes through the sensor housings 205, the seeds 121 impact the acoustic sensors 200 before continuing to flow into the secondary seed tubes 162. The sounds thus created by the impacts are directed into the transmitting hoses 230 and travel down into the blockage monitoring node 300, where the sounds are processed to determine the amount of flow traveling into each secondary seed tube 162.

The previous figures have illustrated how the present invention is used to determine the amount of material flow traveling through an air seeding system such as that shown in FIGS. 1 and 2. This is done by using the acoustic sensors detailed in FIGS. 4A and 4B in conjunction with the blockage monitoring nodes detailed in FIGS. 5A and 5C. By thus equipping every secondary seed tube with the sensors and modules described in these figures, a value of material flow, as calculated from the relative audio signal detected within each seed tube, can be calculated for these seed tubes. Additional details on how these material flow values are determined, and how they are used, are provided later in FIGS. 9A through 9E and the corresponding textual description. Once these material flow values are determined, measures can be taken to balance the material flows so that the flow is consistent within every secondary seed tube. Although existing prior art systems offer very little in the way of a means for balancing the material flow within the seed tubes, the present invention differs from the prior art by offering a means for adjusting the flow within each secondary seed tube independently, based upon data derived from the sensors 200. For example, this could be accomplished by providing an adjustable air flow restrictor within each secondary seed tube as a means of balancing the material flow values across the air seeding system.

Figure 6:
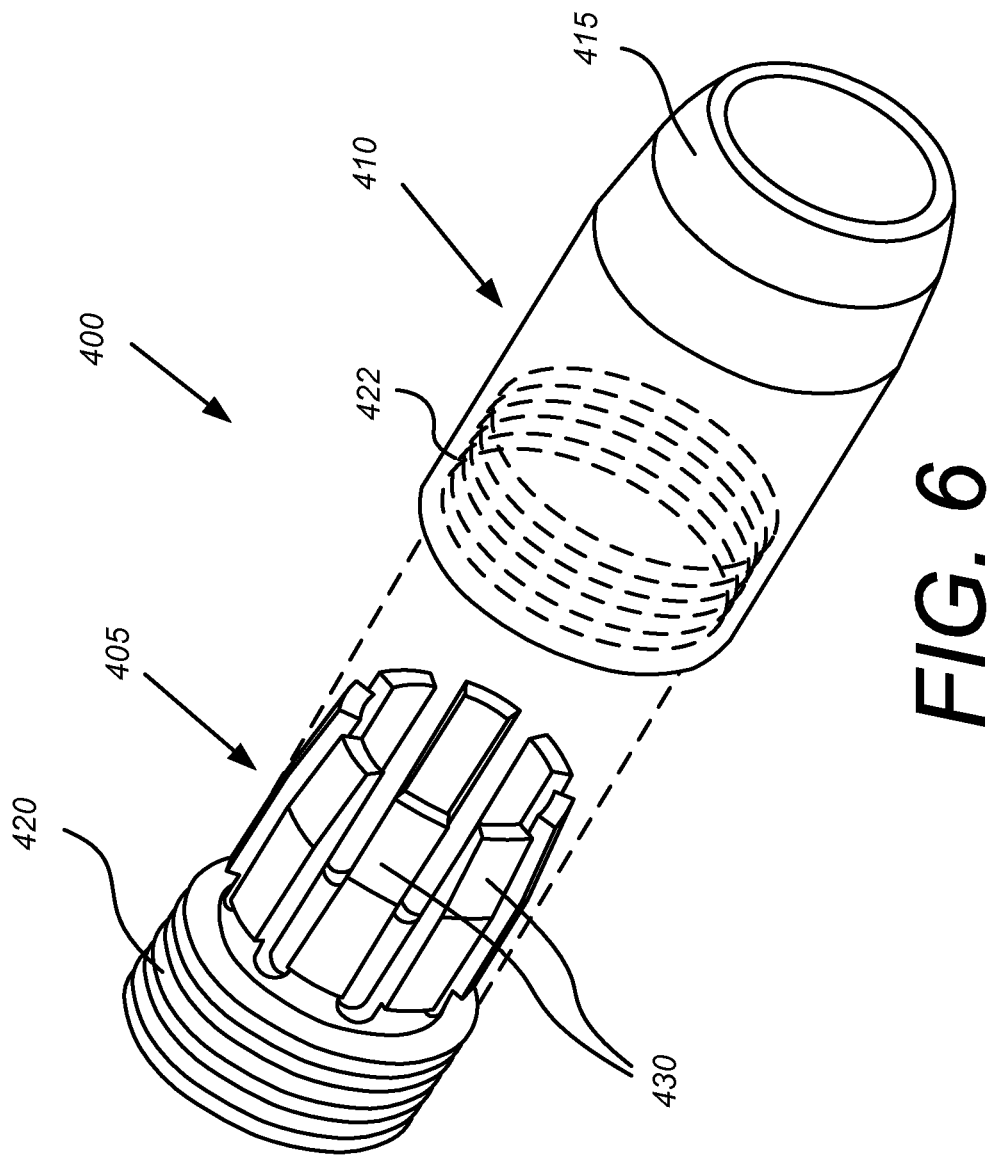
FIG. 6 shows a perspective view of an air flow restrictor as used in the present invention.

FIG. 6 shows a perspective view of an air flow restrictor 400 as used in the present invention. The air flow restrictor 400 is comprised of two independent pieces: a toothed insert 405 and an outer adjustment sleeve 410. The toothed insert 405 includes insert threads 420 and a set of fingers 430 arranged in a circular grouping separated by a small gap. The outer adjustment sleeve 410 includes internal threads 422 which mate with the insert threads 420 on the toothed insert and is designed with a tapered end 415. When the outer adjustment sleeve 410 is placed over the toothed insert 405, such that the internal threads 422 just begin to engage the insert threads 420, the air flow restrictor 400 is assembled. When it is assembled, it can be placed in line with the secondary seed tubes 162 such that the material flowing through the secondary seed tubes 162 will also pass through the air flow restrictor 400. The two pieces of the air flow restrictor 400 are designed in such a way that, as the outer adjustment sleeve 410 is rotated, the internal threads 422 engage the insert threads 420 and pull the outer adjustment sleeve 410 further down onto the toothed insert 405. Because the outer adjustment sleeve 410 has a tapered end 415, the movement of the outer adjustment sleeve 410 as it engages the toothed insert 405 causes the internal walls of the tapered end 415 to come in contact with the fingers 430 and constrict them such that they push in toward each other. This squeezing of the fingers 430 causes the movement of air and other material through the center of the air flow restrictor 400 to be reduced. Loosening the outer adjustment sleeve 410 by rotating it in the opposite direction allows the fingers 430 to open back up again, allowing more air to pass through the center of the air flow restrictor 400.

The air flow restrictor 400 has a hollow center that allows air and material to flow through it, allowing it to be placed in-line anywhere in the secondary seed tube 162. An alternative method of introducing the air flow restrictor 400 would be to make it integral to the sensor housing 205 of the acoustic sensor 200 assembly. FIG. 7A shows an alternative embodiment of the acoustic sensor assembly of FIG. 4B where the air flow restrictor 400 is built into the lower half of the sensor housing 205. In this position, the flow of air and material entering the secondary seed tube 162 can be restricted by turning the outer adjustment shell 410 to close down the fingers 430. Note that the outer adjustment shell 410 is shown here with a non-tapered exterior, but the interior of the outer adjustment shell 410 is still tapered, as will be shown in cutaway views in FIGS. 7B and 7C.

FIG. 7B shows the alternative embodiment of the acoustic sensor from FIG. 7A with a cutaway view of the air flow restrictor 400. As viewed through the cutaway portion of FIG. 7B, the outer adjustment shell 410 has inner tapered walls 415A. The numeric designator for the interior tapered walls is 415A, to show the relation to the tapered end 415 of the outer adjustment shell 410 shown in FIG. 6. Both numeric designators, 415 and 415A, refer to the tapered features, but 415 refers to the tapered end in general and 415A refers to the interior tapered walls. The insert threads 420 are integral to or otherwise connected to the sensor housing 205. The fingers 430 are shown through the cutaway just coming into contact with the tapered walls 415A, but they are not yet compressed in this position. Full air and material flow would be allowed in this configuration.

FIG. 7C shows the cutaway view of the air flow restrictor from FIG. 7B, but with the restrictor shell tightened such that the restrictor fingers are squeezed more tightly together. The dashed lines near the bottom of FIG. 7C show the former position of the outer adjustment shell 410 as it appeared in FIG. 7B, before it was tightened down. The small arrow on the diagram near the insert threads 420 shows the direction in which the outer adjustment shell 410 moved. The insert threads 420 are now visible through the cutaway in the outer adjustment shell 410, instead of above it as they were in FIG. 7B. As shown, the fingers 430 are compressed by the tapered walls 415A, and are tightly squeezed together. The resulting configuration of the fingers 430 constricts the air and material flow that can pass through the sensor housing 205 as it passes into the secondary seed tube 162.

The information obtained by the acoustic sensors 200 as processed by the blockage monitoring nodes 300 is communicated to an operator. If a blockage is detected in one or more of the secondary seed tubes 162, then this condition should be displayed to the operator of the air seeding system so that appropriate steps can be taken to clear the condition. In addition, to be able to equalize the output of all of the secondary seed tubes 162, an operator must be able to have access to the output values of all of the seed tubes 162 in order to make corrections. Once these current output values are known, an operator can correct an imbalance in the system by manually adjusting the air flow restrictors 400 on the appropriate secondary seed tubes 162 in order to change the air and material flows in those tubes.

In an alternative embodiment of the present invention, the air flow restrictors 400 might be connected to electric motors or otherwise automatically controlled. In this embodiment, an electronics module (possibly a variation of the blockage monitoring node 300, or a separate module) could be entered into an "automatic balancing" mode. In this mode, the electronics module could read the seed flow rates for all of the secondary tubes 162 on the system, check for imbalances, and then drive the electric motors (or other automatic means) to adjust the air flow restrictors 400 automatically, without manual intervention. This would enable automatic adjustment of a system every time an operator pulls the air seeding system into a new field or changes crops.

FIG. 8 illustrates how the blockage monitoring nodes 300 are capable of communicating wirelessly with a handheld computing device 500. FIG. 8 also shows how the primary inventive components of the present invention might be mounted in one embodiment of the invention. The acoustic sensors 200 are between the secondary manifold 142 and the secondary seed tubes 162. The air flow restrictors 400 are show in-line with the acoustic sensors 200 and secondary seed tubes 162. One or more blockage monitoring nodes 300 are mounted on the vertical portion of the primary seed tube leading up into the secondary manifold 142. As previously described, FIG. 8 illustrates one possible configuration of the inventive components of the present invention, and is not meant to be limiting in any way. There may be alternative configurations of an air seeding system that would require a different configuration of the acoustic sensors 200, air flow restrictors 400, and blockage monitoring nodes 300.

The handheld computing device 500 may be used as both a system display and control device. In one embodiment, the handheld computing device 500 is a commercially available computing platform such as a version of the iPad computing device available from Apple, Inc., or any similar commercial computing platform. In an alternative embodiment, the handheld computing device 500 is a custom-designed handheld computing platform, which can be specifically designed for use with the present invention.

The handheld computing device 500 can receive and transmit wireless messages 10 with the blockage monitoring nodes 300. In one operating scenario, one or more of the blockage monitoring nodes 300 detects a drop in sound level from one or more of the acoustic sensors 200 to which it is connected. This information is transmitted to the handheld computing device 500 in the form of wireless messages 10. The handheld computing device 500 receives the wireless messages 10, processes the information contained within them, and determines what to display on the handheld computing device 500.

In the preferred embodiment, the algorithms that determine how to interpret the data transmitted by the blockage monitoring nodes 300 are located on the handheld computing device 500. By locating the algorithms inside the handheld computing device 500, the blockage monitoring nodes 300 may have less powerful, inexpensive processors, reducing the overall system cost. In an alternative embodiment, the algorithms for determining if there is a blockage are located within each blockage monitoring node 300, instead of in the handheld computing device 500. In this alternative embodiment, the handheld computing device 500 effectively becomes a sort of "dumb display", and is only used to display the results calculated by the blockage monitoring nodes 300. Although, in the preferred embodiment, the handheld computing device 500 does the majority of the processing, it may be desirable to have the blockage monitoring nodes 300 communicate with an existing "dumb display" on the tractor, instead of to the handheld computing device 500. In these cases, the blockage monitoring nodes 300 may need to do all of the processing, and send display directives to a non-processing (dumb) display, instead of allowing a handheld computing device 500 to do the processing.

For the purposes of this discussion, a "dumb display" or "non-processing display" shall be defined as a display with very limited processing power, which must be commanded what it should display through messages sent to it by a separate electronics module. Many modern tractor manufacturers provide such non-processing dumb displays for their tractors, as the displays must be capable of receiving and displaying information from different implements (hay balers, air seeders, spray equipment, etc.) from various manufacturers. Instead of trying to create a single display type that contains all of the processing power and algorithms needed for all of the various types of implements, the tractor manufacturers instead often provide a single "dumb display" which simply displays the information it receives from a separate module mounted on the implement.

Figure 10B:
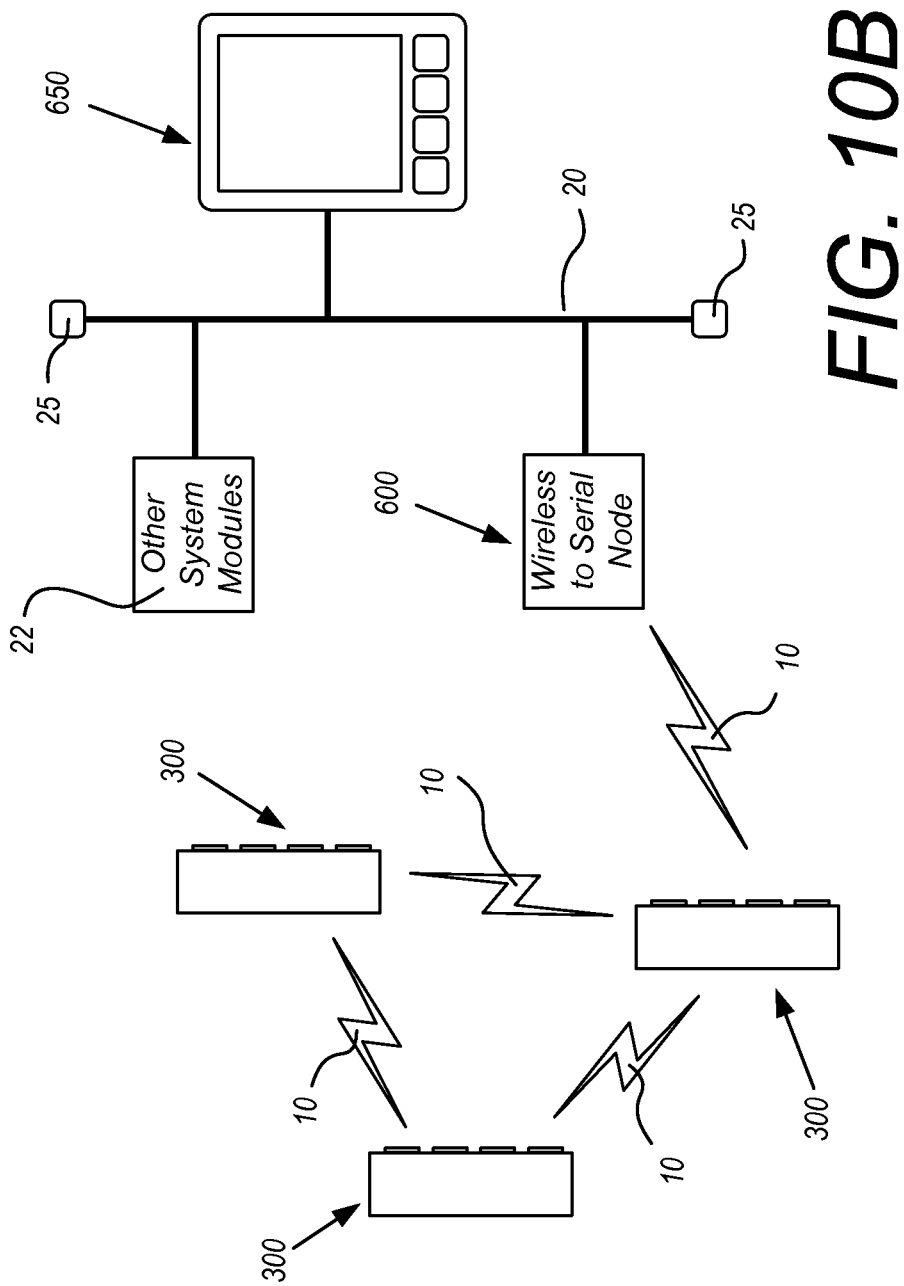

In this way, the "intelligence" is encapsulated in the electronics on the implement, and a single dumb display type will work with many different kinds of implements. In order to communicate with a single display type, all of the implements must send messages in a standardized format to the display in the tractor. One example of such a non-processing display is the GreenStar display found on tractors manufactured by the John Deere Company of Moline, Ill. The GreenStar display is an ISOBUS virtual terminal, where "ISOBUS" refers to a standardized open communications network technology for connecting electronic devices on agricultural equipment, and "virtual terminal" refers to a display which follows the ISOBUS standard. An ISOBUS virtual terminal accepts messages from implements using the industry-standard ISO 11873 communications protocol. Any implement that can send the proper commands using this communications protocol is capable of displaying information on the GreenStar display. Many other types of ISOBUS virtual terminals are available. FIG. 10B provides additional information on how the present invention might communicate to an existing non-processing display, such as an ISOBUS virtual terminal.

Referring now to FIGS. 9A through 9E, several examples of user interface pages will be described. The pages shown in these figures are intended to be examples only and not limiting in any way, and are representative of any number of similar pages that could be created for the application. For the purposes of this discussion, these user interface screens will be shown as they might appear being displayed on a handheld computing device 500. It should be noted, however, that similar screens could be displayed on any type of displaying device, including an ISOBUS virtual terminal as previously described and as illustrated in FIG. 10B.

Figure 9A:
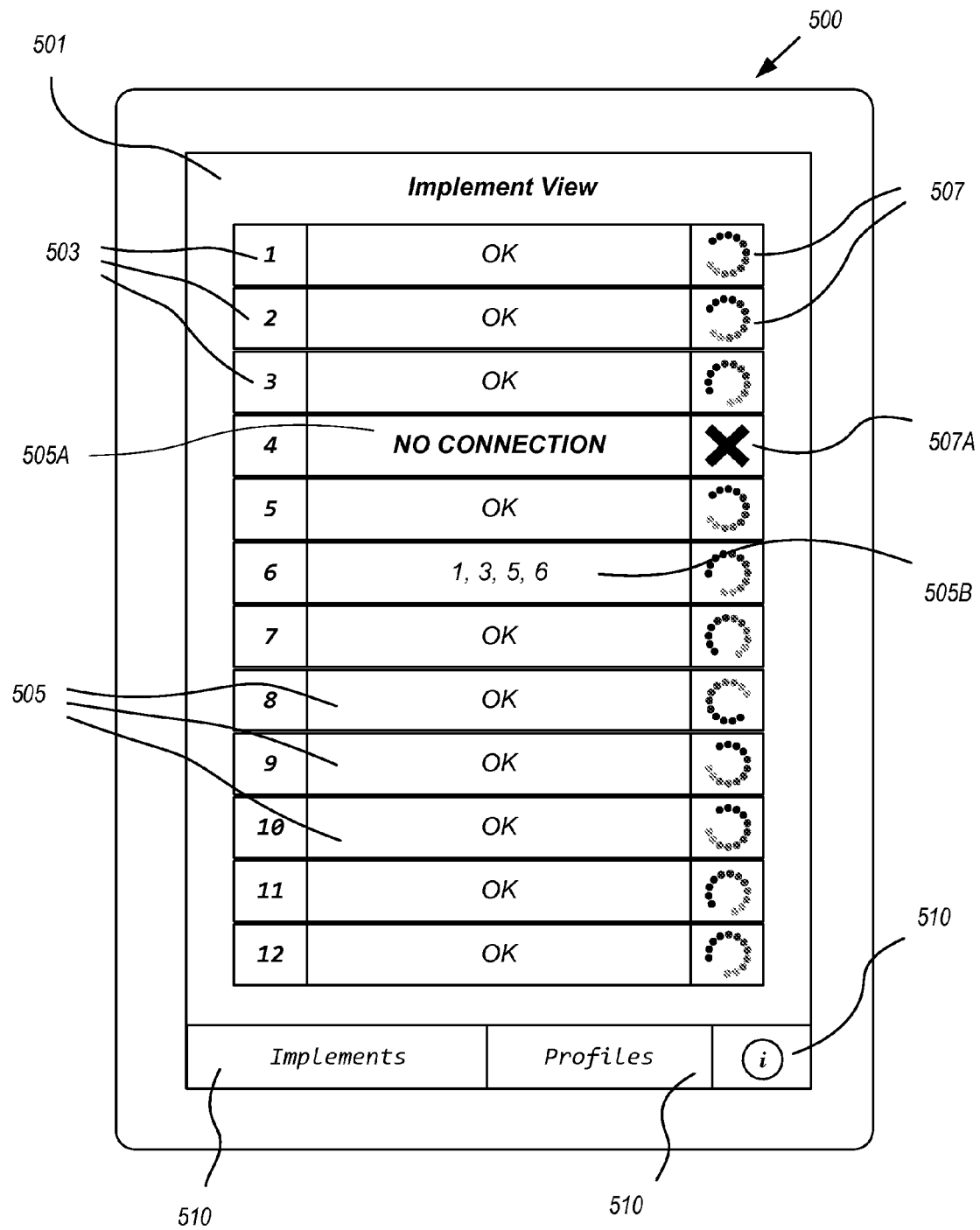
FIGS. 9A through 9E show various examples of user interface screens that might be used on the handheld computing device to configure and operate the system.

FIG. 9A shows one embodiment of a default information screen showing status information on the air seeding system. A display screen 501 displays information on the handheld computing device 500. In the preferred embodiment, the display screen 501 has a touch-sensitive interface (a touch screen), allowing the operator to interact with the device to bring up different displays, or to send commands to the blockage monitoring nodes 300, via the handheld computing device 500.

In the screen illustrated in FIG. 9A, a summary view of the entire air seeder implement is shown. In this view, numeric designators 503 refer to the number of a specific secondary manifold 142 on the seeder. FIG. 9A shows 12 separate numeric designators 503, showing that the air seeder implement now connected to the machine has 12 separate secondary manifolds 142. Next to each numeric designator 503 is a manifold status 505. In this embodiment, a manifold status 505 of "OK" indicates that the manifold in question is operating correctly (no blockages). A manifold status 505 other than "OK" will appear next to secondary manifolds 142 which have one or more problems. For example, as shown in FIG. 9A, a manifold status 505A stating "NO CONNECTION" is shown next to the entry for manifold 4, and manifold status 505B showing the numbers "1, 3, 5, 6" next to the entry for manifold 6.

A connection icon 507 appears to the right of each manifold status 505 (including statuses 505A and 505B). The connection icon 507 may be an animated icon such as a spinning disk or any appropriate symbol when the wireless connection to the blockage monitoring nodes 300 on the corresponding secondary manifold 142 is working properly. An alternative form of the connection icon 507A is used to indicate a malfunctioning or non-existent wireless connection between the handheld computing device 500 and the corresponding secondary manifold 142. In the embodiment shown in FIG. 9A, an "X" is used for the alternative connection icon 507A to indicate a bad connection. The manifold status 505A of "NO CONNECTION" is shown as an additional indication that the wireless connection is faulty. As previously indicated, the status labels, specific graphics, and the number and arrangement of onscreen components is intended to be an example only, and not meant to be limiting in any way.

The manifold status 505B showing the numbers "1, 3, 5, 6", as shown in FIG. 9A, is used to indicate that the corresponding secondary manifold 142 is detecting partial or full blockages on the first, third, fifth, and sixth secondary seed tubes 162 on that manifold. The fault condition shown in this FIG. 9A would likely have been caused by a detected and significant decrease in the amount of noise received from the acoustic sensors 200 associated with the secondary seed tubes 162 numbered 1, 3, 5, and 6 on the secondary manifold 142 numbered 6.

Each user interface screen, such as the one shown on the display screen 501 in FIG. 9A, will also likely contain one or more navigation controls 510. In FIG. 9A, the navigation controls 510 are displayed along the bottom of the display screen 501, and include buttons for moving to additional user interface screens (shown here with labels "Implements" and "Profiles") and a Help button (shown here as a circle with a lowercase "i" inside it).

Figure 9B:
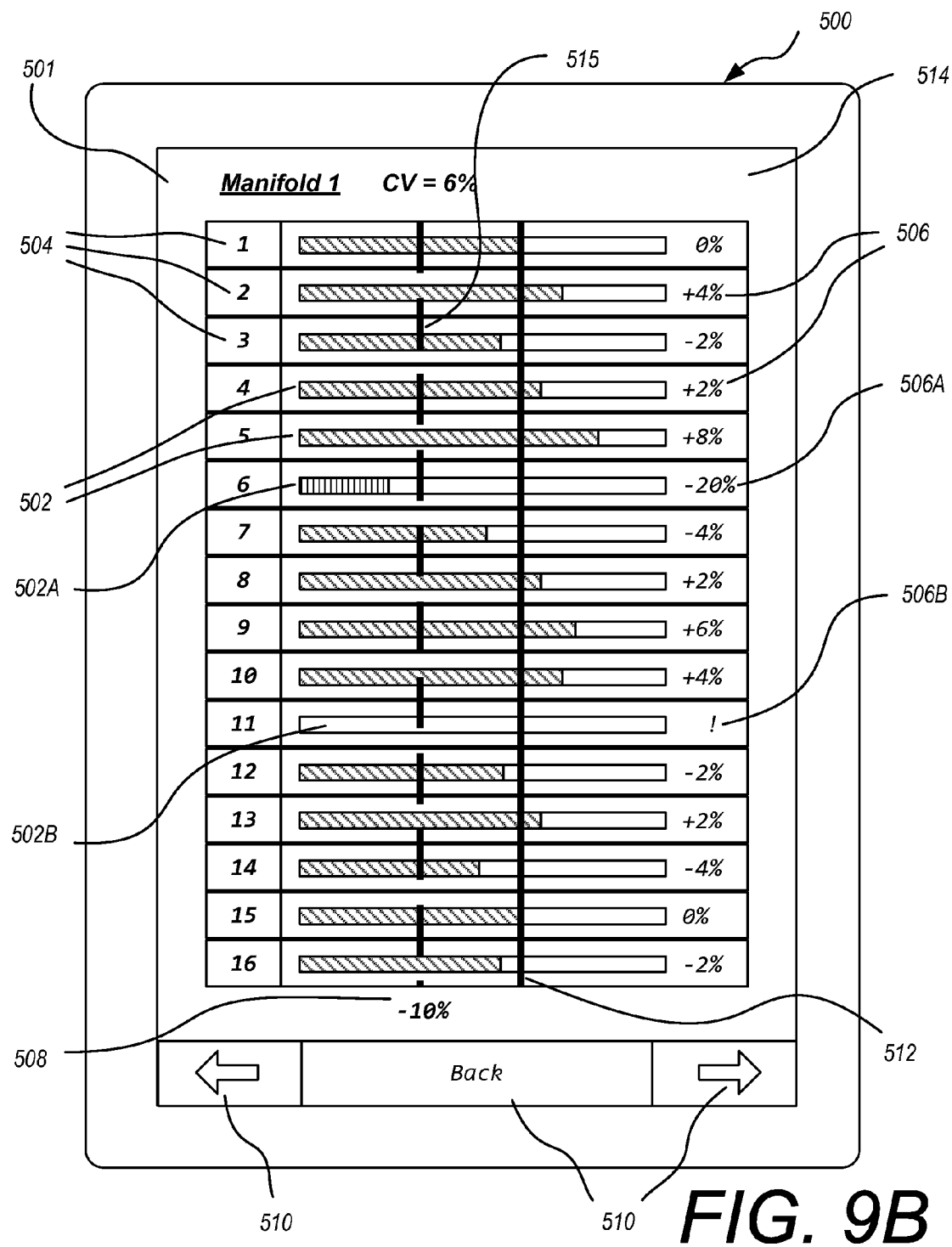

FIG. 9B shows one embodiment of a manifold information page. While FIG. 9A presented summary information showing the status of all of the secondary manifolds 142 on an air seeding system, FIG. 9B show the relative flow rates for each of the secondary seed tubes 162 connected to a single secondary manifold 142. This page, or one like it, may be displayed after an operator touches one of the manifold statuses 505 shown on FIG. 9A. For example, if the operator were to touch the top manifold status 505 on the display screen 501 illustrated in FIG. 9A (manifold number 1), the screen illustrated in FIG. 9B would appear.

In this embodiment, the manifold information page of FIG. 9B displays the current coefficient of variance (CV) numbers for each secondary seed tube 162 on Manifold 1 as a bar graph 502. The bar graphs 502 are created and displayed on the display screen 501 such that the exact middle point of each bar graph 502 represents the average flow rate across all of the secondary seed tubes 162 on this secondary manifold 142. The far left side of each bar graph 502 represents 0% flow rate. The far right side of each bar graph 502 represents twice the average flow rate. Each bar graph 502 is preceded by a numeric designator 504 indicating the number of the corresponding secondary seed tube 162. The CV numbers 506 displayed to the right of the bar graphs 502 represent the percentage that a secondary seed tube 162 is either above or below the average. For example, secondary seed tube number 2 (the second bar graph 502 from the top of the display screen 501) shows that its current CV is +4%, meaning that the flow rate in that secondary seed tube 162 is 4% greater than the average of all the secondary seed tubes 162 on this secondary manifold 142. Secondary seed tube number 14, near the bottom of the display screen 501, is 4% blow the average (shown as −4%). The overall average flow rate 514 across all secondary seed tubes 162 for the displayed manifold 142 is shown at the top of the page.

A center line 512 (FIG. 9B) is displayed as a visual reference and represents 0% CV (it represents the average flow rate). A dashed line 514 is used to show the point to which a bar graph 502 must drop before the system will indicate a blockage or partial blockage has occurred. An alarm percentage 508 is displayed beneath the dashed line 514, showing the actual percentage drop that will trigger a blockage alarm. The alarm percentage 508 shown in this example is −10%, indicating that an alarm will be triggered when one or more of the bar graphs 502 falls at least 10% below the average flow rate. In a preferred embodiment, this alarm percentage 508 and the relative position of the dashed line 514 are user adjustable, allowing the operator to pick a different alarm percentage 508.

When an alarm condition occurs, the graphics shown on the bar graphs 502 may change as an indication of the condition. Bar graph 502A (shown corresponding to secondary seed tube 6 in FIG. 9B) has dropped below the dashed line 514 and is thus shown as a different color than the other bar graphs 502. The corresponding CV value 506A shows −20%, a significant drop from the average flow rate. Bar graph 502B has dropped to 0%, indicating either a total blockage condition (no seed flow) or an error in receiving data from the corresponding secondary seed tube 162 or blockage monitoring node 300. The CV value 506B is shown as an exclamation point, in this example, to indicate a serious condition exists.

Navigation controls 510 are provided for this page, as well. In this example, left and right arrows are provided to move from one manifold display to the next, and a "Back" button is provided to return the operator to the screen that was previously displayed. The navigation controls 510 shown here are intended to be representative of any type of virtual user control that allows the operator to navigate through the screens.

Figure 9C:
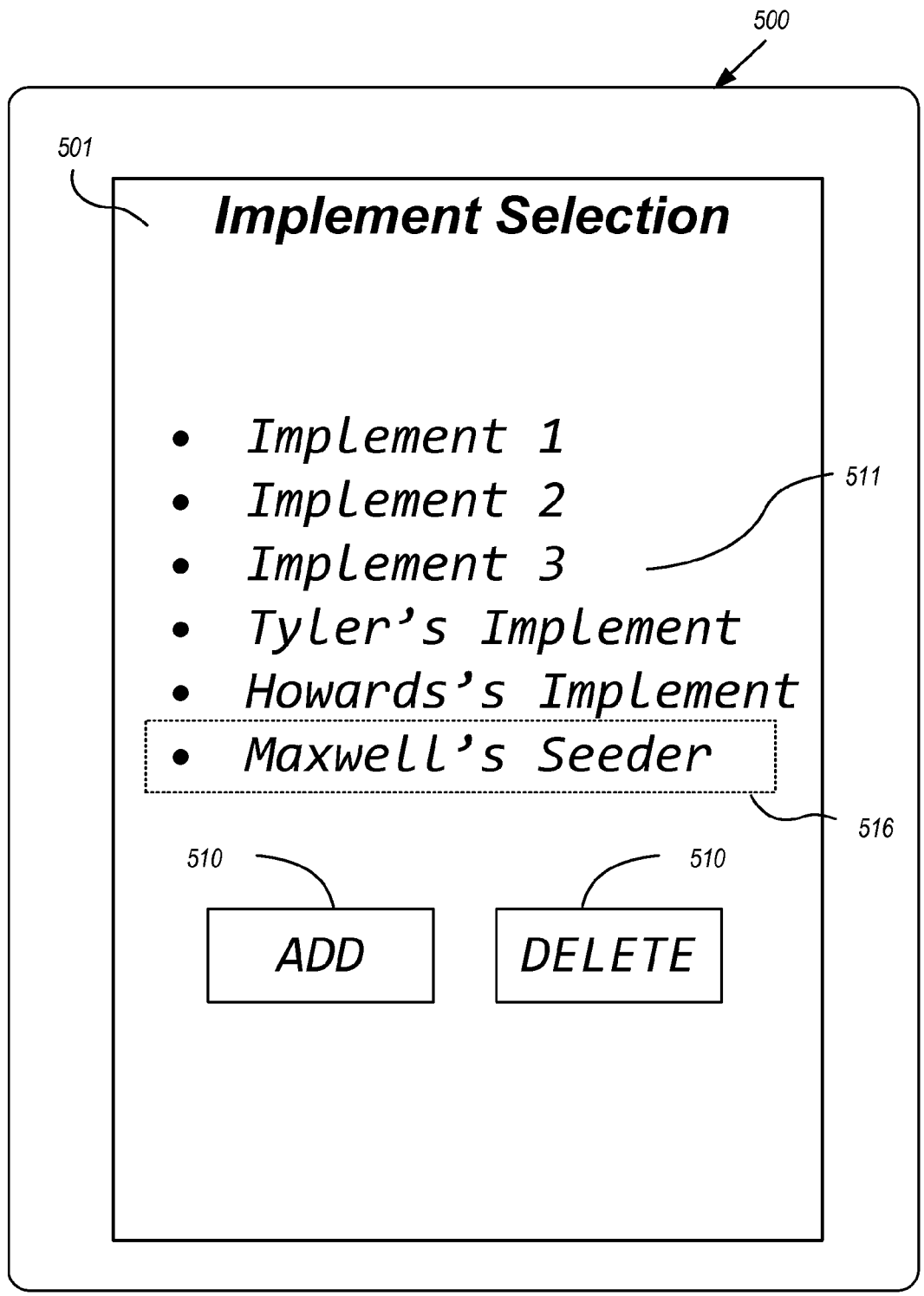

FIG. 9C shows one embodiment of an implement selection page. For the purposes of this discussion, an "implement" is any piece of agricultural machinery that can be attached to and pulled from a tractor (such as an air seeder or air cart). This page might be displayed when the handheld computing device 500 is first turned on, or when the software application for the air seeding system is first executed. An implement list 511 will appear on this page, showing a list of all of the implements that are currently in wireless communications range with the handheld computing device 500. If no implements are within communications range, the implement list 511 might display "No implements in range" or a similar informational message. If only one implement is in range, this implement selection page may not appear, as there are no choices to be made (the solitary implement will be the one chosen by default). When the implement list 511 has two or more selections to choose from, a selection indicator 516 will appear on the display screen 501, indicating which implement is currently selected. The operator can touch a different implement on the implement list 511 with a finger or stylus, and the selection indicator 516 will then appear around the selected implement. Navigation controls 510 are provided for additional functionality on this page. These may include an ADD and DELETE button, such as those shown in FIG. 9C, to allow the operator to define a new implement, or to remove an existing implement from the implement list 511.

Figure 9D:
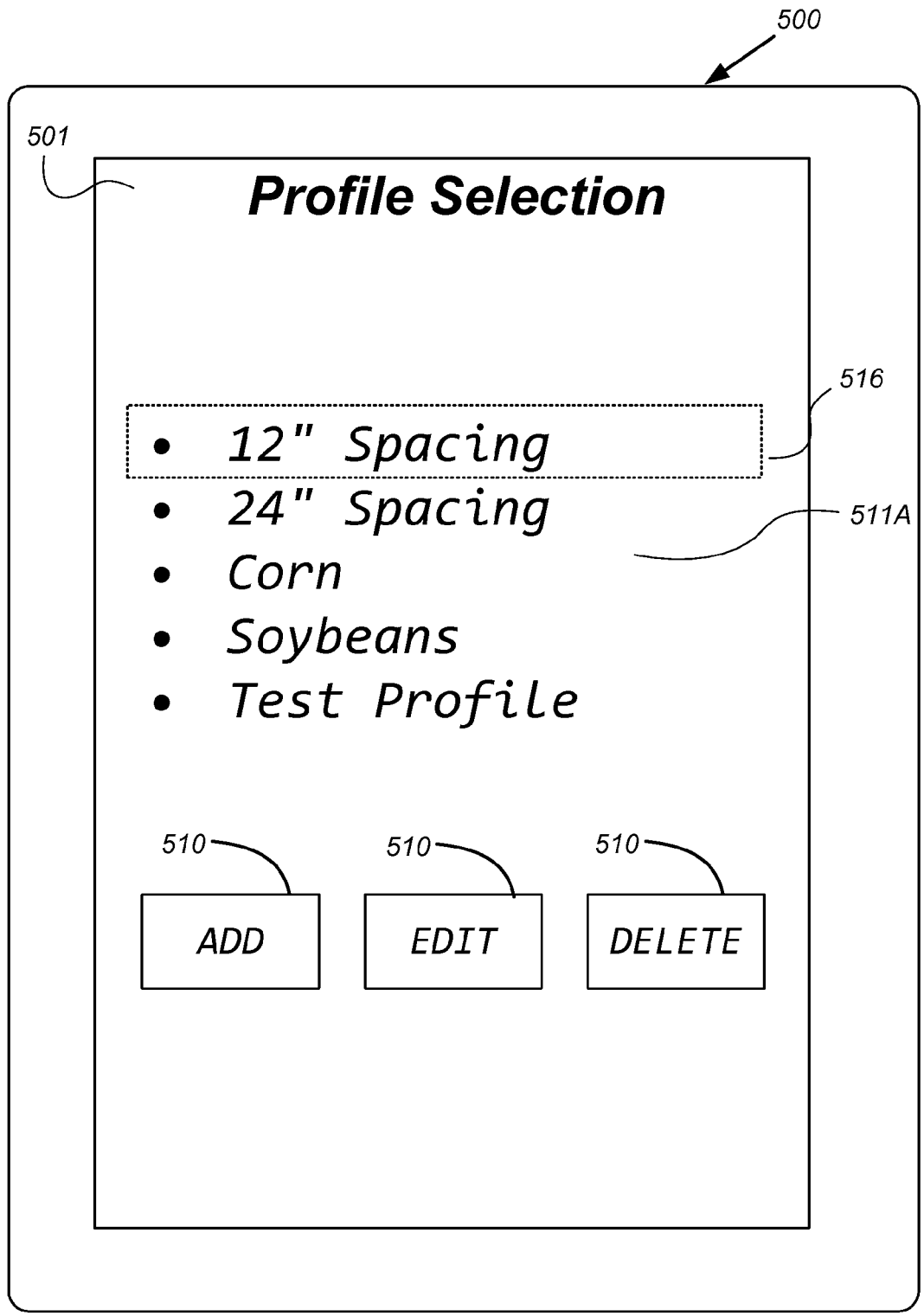

FIG. 9D shows one embodiment of a profile selection page. For the purposes of this discussion, a "profile" is defined as a specific pattern of secondary seed tubes 162. Defined profiles are sometimes required because different kinds of crops may require different row-to-row spacing when being planted. If the openers 148 (from FIG. 1 or 2) which dig the furrows in the soil are spaced on the air seeding system 12 inches apart, but a crop is known to grow better using a 24-inch spacing, then the operator of the air seeding system can disable every other row on the air seeder. This is typically done by blocking the entry of every other secondary seed tube 162 inside of the secondary manifold 142, so that only half of the seed tubes 162 will have air and seed flow. However, since all of the seed tubes 162, even the blocked ones, will have an acoustic sensor 200 installed, the system needs a means of detecting which of the secondary seed tubes 162 have been blocked, and which acoustic sensors 200 should be ignored, so that a false alarm is not triggered. Additional detail on how a specific profile is created will be shown on FIG. 9E.

The display screen 501 of the profile selection screen shown in FIG. 9D has a profile list 511A, listing all of the profiles that have been defined by the operator. A selection indicator 516 is used to indicate which profile is currently selected. The operator can choose a different profile by touching the profile name from the profile list 511A. Example navigation controls 510 allow the operator to add, delete, or edit profiles.

Figure 9E:
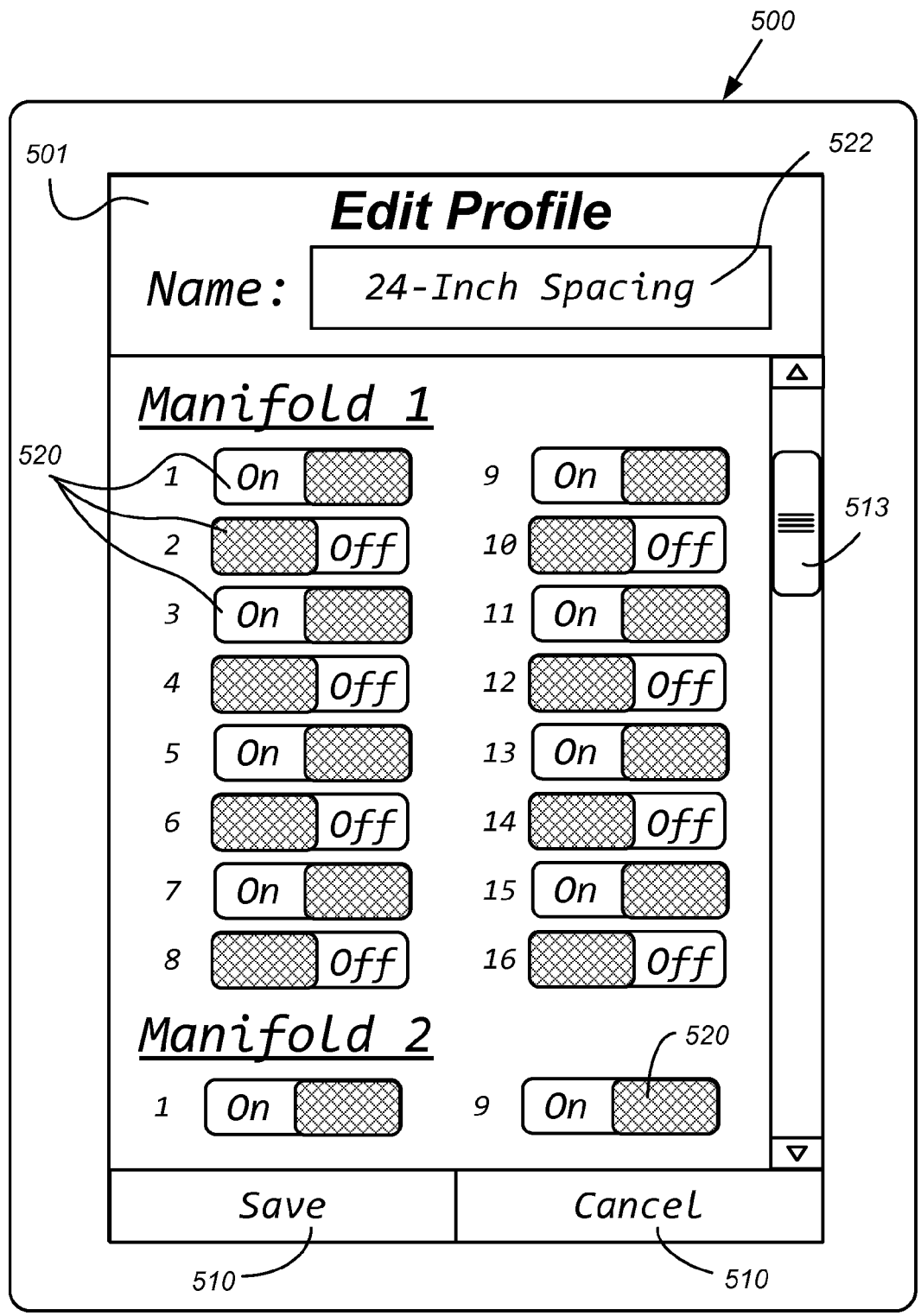

FIG. 9E shows an embodiment of an edit profile page, which can be used to create a new profile or to edit an existing one. At the top of the display screen 501, there is a profile name box 522, displaying the name of the profile currently being edited. In this example, the current profile is called "24-Inch Spacing". Below the profile name box 522, a series of virtual on/off switches 520 are displayed, one for each secondary seed tube 162 in the corresponding secondary manifold 142. By touching one of the on/off switches 520 with a finger or stylus, the operator can toggle the status of that switch. If a specific on/off switch 520 is shown to be "ON", that means that, for this profile, the secondary seed tube 162 corresponding to that on/off switch should be considered. If the on/off switch 520 is shown to be "OFF", the corresponding seed tube 162 is assumed to be blocked off and the data from the acoustic sensor 200 associated with that secondary seed tube 162 will be ignored when determining if there is an alarm condition.

As a profile may contain switch definitions for multiple manifolds, a slider bar 512 or similar control is provided to move the display up or down (to make other manifold switch sets visible). Example navigation controls 510 may include buttons to save an edited profile, or cancel editing mode and return to the previous screen.

The example pages shown in FIGS. 9A through 9E are intended to be representative of the types of operations that could be done using the handheld computing device 500. They should not be considered complete, and a person skilled in the art should realize that any number of display and control pages could be created. The fundamental concept presented herein is that a wireless display (the handheld computing device 500) can be used as a user interface and display for the air seeding system of the present invention.

Other types of display pages could include, but are certainly not limited to, the following types:

A grouping page, which allows subsets of secondary manifolds from a single implement to be grouped together based on the type of material flowing into them. This may be needed in the case when two or more hoppers 126 (from FIGS. 1 and 2) are used on an air seeding system, with each containing different materials (for example, one containing seed and the other containing fertilizer).

A documentation page, allowing an operator to display user's manuals or other documents.

An "about" page, showing firmware and hardware revision numbers for each blockage monitoring node 300 on the seeder, and software revision numbers for the application running on the handheld computing device 500.

A built-in-test (BIT) page, allowing an operator to initiate and see the results of system tests.

A log page, displaying the text of log files created by the system software, perhaps showing the occurrence and location of blockage events or sensor/electronics errors.

It should be noted that, in one embodiment of the present invention, much of the configuration system described in FIGS. 9A through 9E may be stored in the blockage monitoring nodes 300 instead of or in addition to storing this information in the handheld computing device 500. By storing configuration information such as profile definitions in the blockage monitoring nodes 300, it becomes possible to swap out one handheld computing device 500 for another, allowing multiple handheld computing devices 500 to be used with the system without requiring a complete re-configuring of the system and redefinition of profiles. Since the blockage monitoring nodes 300 are meant to be mounted directly to the implement, the configuration information can be stored here, with the implement for which it is defined, instead of solely on the handheld computing device 500.

Figure 10C:
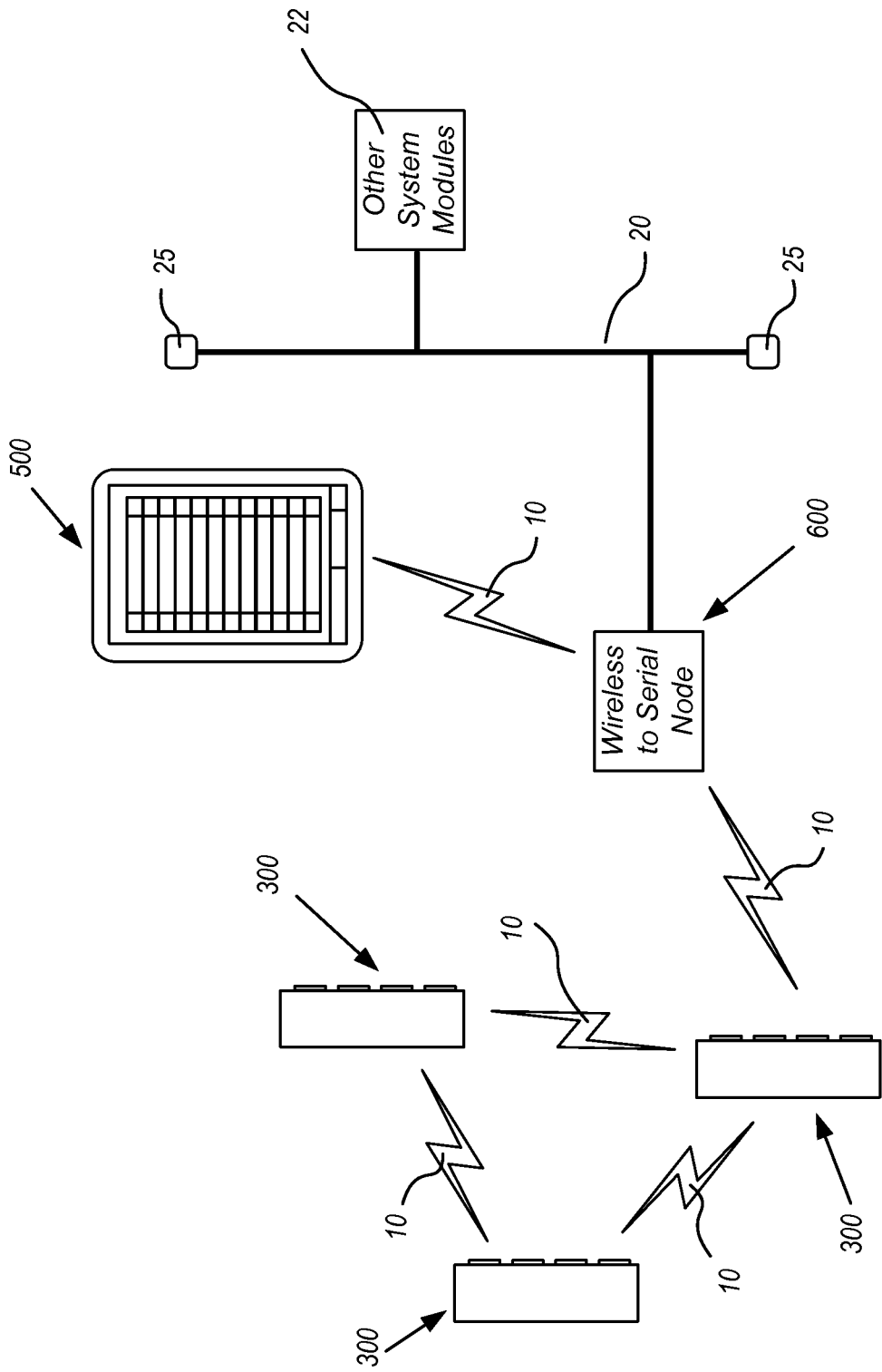

FIGS. 10A, 10B, and 10C illustrate how the blockage monitoring nodes of the present invention can communicate wirelessly with each other, as well as with a remote information display. FIG. 10A shows a set of blockage monitoring nodes 300 (shown here removed from the air seeding system, which is assumed to exist) communicating wirelessly 10 with each other and with a handheld computing device 500. As previously discussed, in the preferred embodiment, the majority of the processing required by the system (such as determining if there are blockages or alarm-triggering events) would be done by the handheld computing device 500. The blockage monitoring nodes 300 would simply capture the audio data from the acoustic sensors 200, convert the data into wireless messages 10, and transmit the messages to the handheld computing device 500 for processing and eventual display.

FIG. 10B illustrates an alternative embodiment of the present invention, in which the handheld computing device 500 is replaced by a tractor-mounted, hard-wired or wireless tractor display 650. As previously discussed, the tractor display 650 may be an ISOBUS virtual terminal (a non-processing or "dumb" display) or similar display which is designed to accept display directives from an electronics module on the implement. These virtual terminal displays receive the display directives from other system modules 22 over an industry standard, hard-wired communications bus 20 following the ISO 11873 communications protocol. The other system modules 22 may be any number of separate electronic modules connected to the communications bus 20, and may include items such as transmission controllers, engine controllers, implement controllers, or any other appropriate electronic modules configured to send and receive messages using the ISO 11873 communications protocol.

In an embodiment using a tractor display 650 connected to a communications bus 20, a wireless-to-serial node 600 must be introduced to intercept the wireless communications 10 transmitted by the blockage monitoring nodes 300, and convert them to ISO 11873 messages for transmission over the communications bus 20. This added component, the wireless-to-serial node 600, allows the present invention to work with existing tractor displays 650. Also shown on FIG. 10B are bus terminators 25, which are required by some communications physical layer implementations.

FIG. 10C illustrates yet another embodiment of the present invention for use in an air seeding or similar system that uses the ISO 11873 communications protocol. Similar to the embodiment in FIG. 10B, this embodiment has a wireless-to-serial node 600 connected to a communications bus 20, and in communications with one or more other system modules 22. In this embodiment, however, the hardwired tractor display 650 has been replaced with a handheld computing device 500. In this embodiment, the handheld computing device 500 communicates wirelessly at 10 to the wireless-to-serial node 600, and can thus retrieve ISO 11873 messages from the communications bus 20. A ISOBUS virtual terminal emulator (a software program, and thus not shown here) can be executing on the handheld computing device 500, allowing the handheld computing device 500 to be used in place of the tractor display 650.

The embodiment shown in FIG. 10C is a significant advance in the art, because a typical tractor display 650, such as an ISOBUS virtual terminal supplied by an original equipment manufacturer (such as John Deere, CASE IH, etc.), is very expensive and may be several thousand dollars. If the same functionality can be supplied by an off-the-shelf handheld computing device 500 for a few hundred dollars, this is a significant benefit to the operator. The handheld computing device 500 may also be taken off of the tractor and used for other purposes, further reducing the system cost.

In the alternative embodiments shown in FIGS. 10A, 10B, and 10C, the wireless communication link 10 could be replaced with direct-wired communication links, but this would add additional system costs and decrease the system reliability (additional wiring provides additional failure points in the system). Also, although the ISO 11873 communications standard is described above in some detail, any similar protocol or messaging scheme can be supported using the same invention.

The other system modules 22 can include an electronic equipment control module connected to the dynamic equipment and configured for controlling and monitoring one or more equipment functions. The electronic equipment control module can be connected to the wireless to serial node 600 via the communications bus 20 (FIG. 10 C).

Figure 11:
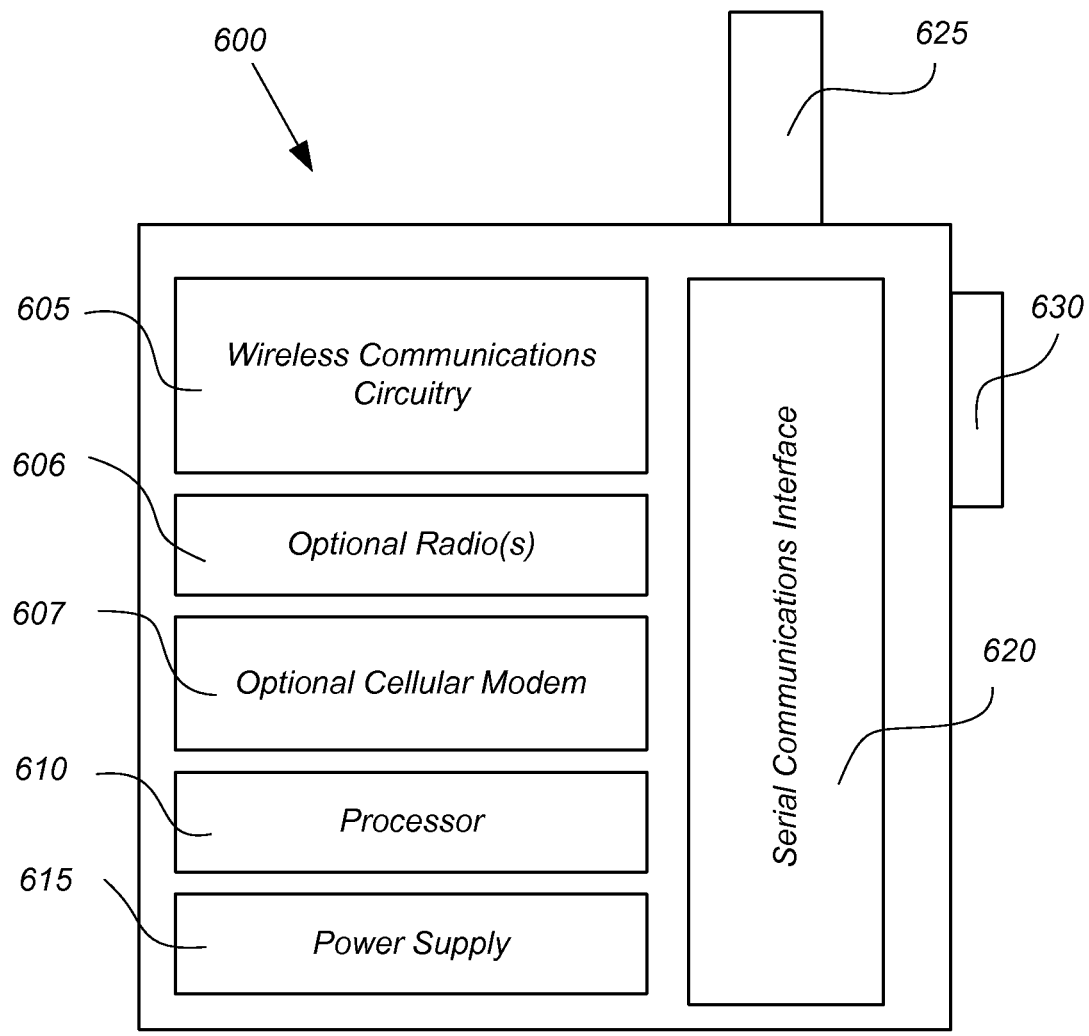
FIG. 11 shows a functional block diagram of the wireless-to-serial node shown in FIGS. 10B and 10C.

FIG. 11 shows a functional block diagram of the wireless-to-serial node introduced in FIG. 10B. In one embodiment, the wireless-to-serial node 600 includes wireless communications circuitry 605 to exchange wireless information with the blockage monitoring nodes 300. Optionally, the wireless-to-serial node 600 may contain optional radio devices 606 or an optional cellular modem 607, for communicating with other systems either on the air seeding system or external to it. The cellular modem 607 may be one adhering to the CDMA, GSM, or any other appropriate cellular communications protocol.

A processor 610 controls the operations of the wireless-to-serial node 600, and contains instructions for processing the information received from the wireless communications circuitry 605, or optional radios 606 or cellular modem 607, and sends it to the serial communications interface 620, which packages the data received wirelessly into messages based on the particular serial communications protocol employed by the system. A connector 630 provides a connection point for the communications bus 20. An antenna 625 is provided to allow the wireless-to-serial node 600 to receive and transmit information wirelessly. The wireless-to-serial node 600 includes a power supply circuit 615 to regulate incoming power and convert it to the levels required for the circuitry within the node. Power may be supplied from the vehicle or implement (routed through the connector 630), or may come from an optional internal power source such as a battery pack.

The remaining figures illustrate some of the operational aspects of the present invention. FIGS. 12A and 12B illustrate one embodiment of an algorithm for determining when an air seeding system using the present invention is stopping or turning around at the end of a field, allowing the blockage alarms to be disabled to prevent false alarms. During normal operation, the acoustic sensors 200 will determine the relative amount of seed flowing through the secondary seed tubes 162 based on the sound level present in the tubes. If one or more of the acoustic sensors 200 detects a sudden drop in sound level, the blockage monitoring node 300 will determine that the corresponding seed tube 162 has a partial or full blockage and will indicate an alarm condition (in at least one embodiment, the determination of whether there is an alarm condition may actually take place in the handheld computing device 500, based on information it receives from the blockage monitoring node 300).

However, when the air seeder reaches the end of the field, the operator typically lifts the implement (the components of the air seeding system that are in contact with the ground, such as the openers 148), turns off the flow of seed, and begins to turn around to make the next pass down the field. Since the flow of seed is stopped during the turn, the acoustic sensors 200 will detect a drop in sound level which may in turn be falsely interpreted by the system as a blockage. To prevent false alarms in this manner, some means for detecting when the implement has been lifted must be provided, such that the system can tell the difference between a blockage and the operator turning off the air flow through the system.

One means of doing this is to provide a work switch input 356 to the blockage monitoring node 300, such as that shown in FIG. 5A. In one embodiment, this work switch input 356 is a digital input that is high when the implement is lowered and seed flow is enabled, and low when the implement is lifted and seed flow is turned off. The blockage monitoring node 300 reads the current state of the work switch input 356 and enables or disables the alarms accordingly. As previously discussed, in certain embodiments of the present invention, the blockage monitoring node 300 may simply pass the state of the work switch input 356, along with the data detected from the acoustic sensors 200, to the handheld computing device 500, and it is actually the handheld computing device 500 that determines whether or not an alarm should be sounded.

In some air seeding systems, however, there may not be a work switch input 356, or the work switch input 356 may be malfunctioning. In these circumstances, it is possible to detect the conditions normally associated with seed flow being disabled by using information already present in the system of the present invention. FIG. 12A graphically depicts what happens to the seed flow during a typical work stoppage, and FIG. 12B outlines an algorithm for determining if alarms should be disabled or enabled when a work stoppage is detected.

FIG. 12A shows the relative seed flow 700 in an air seeding system as it changes over time. As shown in FIG. 12A, a user-defined threshold 710 indicates the level at which the seed flow 700 will trigger an alarm, if it drops below threshold 710 for a pre-determined period of time. Four key times are marked as times T1 through T4.

T1 indicates the time when the seed flow 700 first drops below the threshold 710. This time is reached when the seed flow 700 begins to drop off (due to either a blockage or a work stoppage).

T2 indicates the time when the seed flow 700 stops dropping and reaches a steady state below the threshold 710. This might occur, for instance, during a work stoppage, when the seed flow 700 has completely stopped (remains steady at zero flow for a period of time).

T3 indicates the time when the seed flow 700 begins to rise again. This may occur after a work stoppage when the seed flow 700 is resumed. Since seed flow 700 will not jump immediately back to its former "full-flow" level, the seed flow 700 takes some time to climb back above the threshold 710.

T4 indicates the time when the seed flow 700 climbs back above the threshold 710, presumably after a work stoppage has ended and seed flow 700 begins to return to the previous level.

By defining acceptable durations between these key timing events (T1 through T4), the system can be configured so that it can detect the difference between a blockage and a normal end of field work stoppage. For example, if the time between T1 (when the seed flow 700 first falls below the threshold 710) and T2 (when seed flow 700 reaches steady state) takes too long (that is, it exceeds a pre-defined timer), an alarm may be sounded. However, if T2 (steady state) is reached before the pre-defined timer expires, the alarm is disabled, meaning that steady state has been achieved and seed flow is considered off.

FIG. 12B is a block of pseudo-code detailing one embodiment of an algorithm used for determining if alarms should be enabled or disabled for a scenario such as that shown in FIG. 12A. The times T1 through T3 from FIG. 12A are used in this algorithm.

Section or step 720 of FIG. 12B defines the variables used in the algorithm. Most of the variables are "flags" which are Boolean-type variables (set to either "true" or "false"), indicating the presence or absence of a certain condition. For instance, if the FLOW RISING flag is true, that is an indication that the seed flow 700 is currently increasing.

Section 725 indicates what happens when the seed flow 700 is below the threshold and currently falling, but the VISUAL_ALARM flag is false. In this case, the visual alarm flag is set to true and the ALARM_TIMER is reset to 0. Section 725 will only occur when the seed flow 700 first drops below the threshold.

Sections 730, 735, and 740 are all only executed when the VISUAL_ALARM flag is already true, when the seed flow 700 is below the threshold 710. Section 730 checks to see how long the seed flow 700 has been falling, and if it has been falling longer than the pre-defined ALARM_TIMEOUT period, the audible alarm is sounded (AUDIBLE_ALARM set to true).

Section 735 checks to see if the seed flow 700 has been in a steady state for too long (exceeding the ALARM_TIMEOUT). If the ALARM_TIMEOUT is exceeded, the audible alarm is also sounded in this case.

Section 740 checks to see if the seed flow 700 has been rising for too long. If the ALARM_TIMEOUT period is exceeded, the audible alarm is sounded.

Finally, Section 745 resets the ALARM_TIMEOUT, AUDIBLE_ALARM and VISUAL_ALARM flags once the seed flow 700 is no longer below the threshold 710.

It should be noted that the algorithm outlined in FIG. 12B is an example only and is not intended to represent an optimized algorithm or to limit the implementation of the algorithm in any way. One skilled in the art understands that changes can be made to the algorithm shown without deviating from the general idea of the algorithm. For example, instead of a single ALARM_TIMEOUT variable, the algorithm may use up to three separate alarm timeout variables, one each for the scenarios covered in Sections 730, 735, and 740 of FIG. 12B. Other changes are also possible.

Figure 13A:
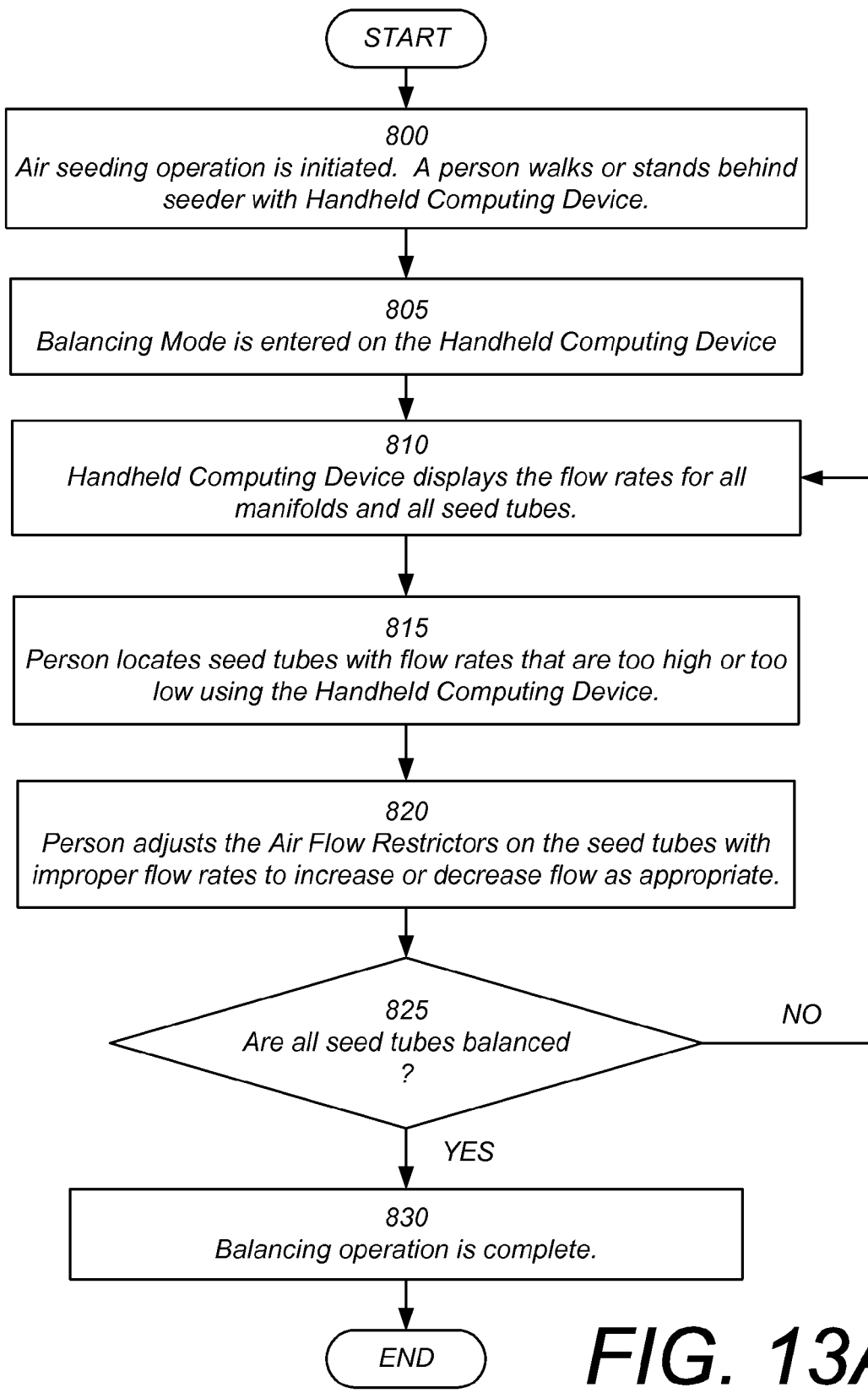
FIGS. 13A and 13B show two possible embodiments of an algorithm for balancing the output of an air seeding system using the present invention.

FIG. 13A shows one embodiment of a flowchart for balancing the output of an air seeding system using the present invention. In Step 800, an operator begins operating the air seeder in a field, or, alternatively, in a stationary test set-up. Seed begins to flow through the air seeding system and secondary seed tubes 162. A person (who could be the same operator who initiated air seeder operation in Step 800, or a second person) walks or stands behind the seeder holding the handheld computing device 500. In Step 805, the person enters "Balancing Mode" on the handheld computing device 500, which is a page that aids the user in equalizing the outputs of all active secondary seed tubes 162. In Step 810, the handheld computing device 500 displays the flow rates for all manifolds and seed tubes in the air seeding system. In Step 815, the person uses the handheld computing device 500 to identify seed tubes with flow rates that are either too high or too low. In Step 820, the person adjusts the air flow restrictors 400 on the seed tubes with improper flow rates to increase or decrease the flow as needed. If the handheld computing device 500 shows that the outputs of all secondary seed tubes 162 are now balanced (Step 825), the balancing operation is complete (Step 830). If the secondary seed tubes 162 are still not balanced, the algorithm jumps back up to Step 810 and these steps are repeated as necessary until the outputs of all secondary seed tubes 162 are equalized.

Figure 13B:
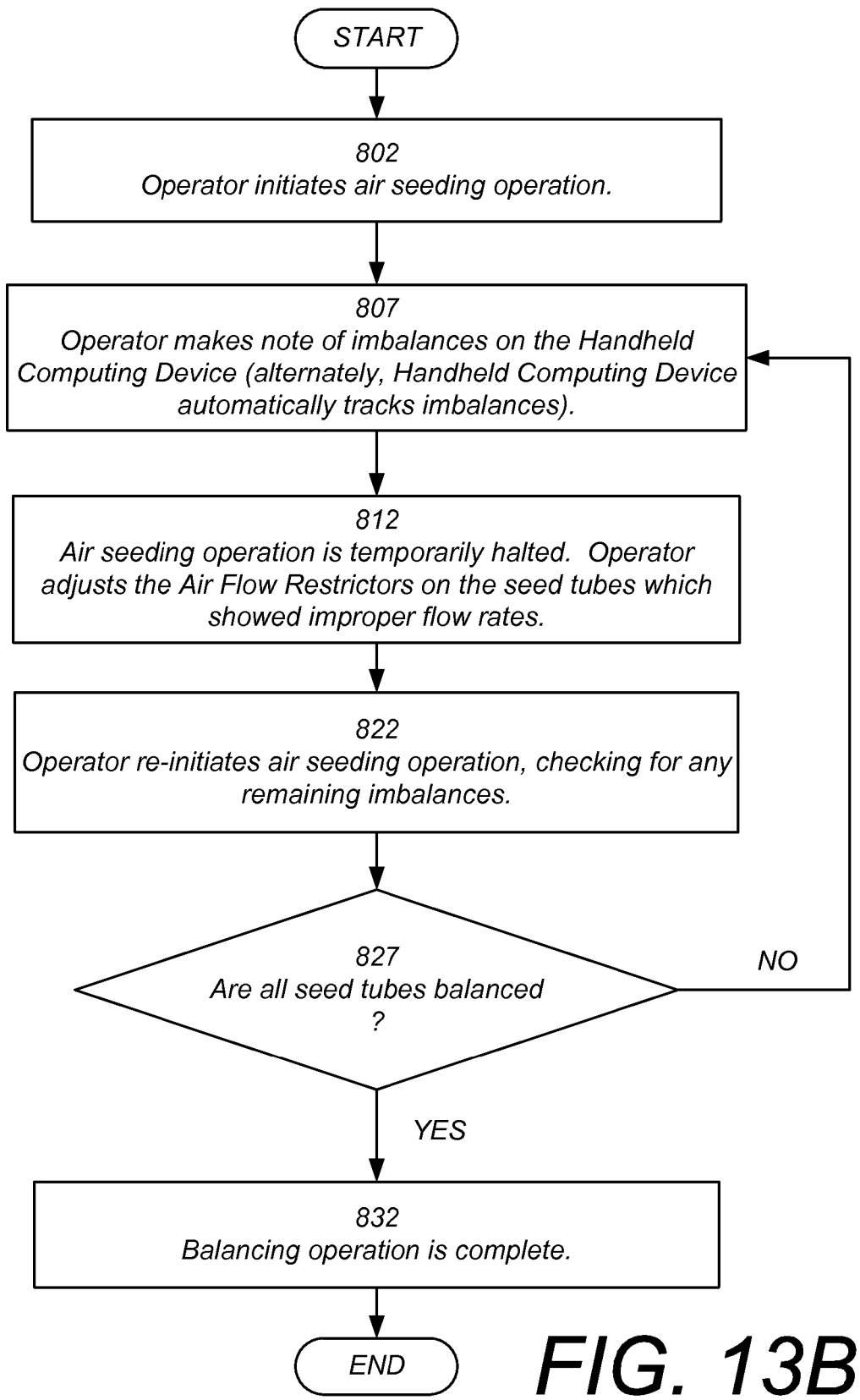

FIG. 13B shows another embodiment of a flowchart for balancing the output of an air seeding system using the present invention. In Step 802, an operator initiates an air seeding operation by driving the air seeder into the field and planting seed. As they seed, the operator or the handheld computing device will keep track of imbalances detected by the present invention (Step 807). After a sufficient section of field has been seeded (enough to note where the system imbalances are), the air seeding operation is halted (Step 812) and the operator adjusts the air flow restrictors on the seed tubes that showed improper flow rates (imbalances). The operator then re-initiates the air seeding operation (Step 822) and checks to see if any imbalances are remaining. If all seed tubes are balanced (Step 827), the balancing operation in complete (Step 832). If the seed tubes are not balanced (Step 827), then Steps 807-827 are repeated until the system is fully balanced.

In the preferred embodiments of an air seeding system, as described herein, a design was chosen to reduce the overall system cost while still providing sufficient functionality, e.g., in processing of the acoustic data captured by the present invention. This was achieved by providing one blockage monitoring node for multiple microphones (potentially more than 20 acoustic sensors may be plugged into a single blockage monitoring node). Since a single blockage monitoring node has to process sound data received by multiple microphones, a multiplexing approach is used, where a blockage monitoring node listens to one microphone for a short period of time, then moves on to the next, and so on, until the blockage monitoring node has sampled all of the microphones and begins again. These multiplexed signals are then converted into the frequency domain and analyzed to produce an estimate for the overall "sound power" seen by the system. This sound power is a relative indication of the amount of flow in a system or in a given seed tube. Instead of showing the exact amount of seed flowing in each tube, the system provides the amount of flow relative to the average of all seed tube flow rates. One embodiment of an algorithm for determining a sound power estimate in this fashion is provided in FIG. 14, which will be discussed shortly.

However, by reducing the amount of or eliminating completely the multiplexing that occurs, possibly by increasing the number of processors available for each microphone, the sound data could be processed in the time domain. This would allow a system to count the actual number of seeds that strike the acoustic sensor, instead of providing a relative flow rate. Working in the time domain in this fashion would allow elements of the present invention to be used in other applications. For instance, the acoustic sensors described in this specification could be used in a grain loss monitor, in which grain falling out of the back of a combine (and therefore lost to the harvester) could be detected by placing an acoustic sensor (or an array of acoustic sensors) on the back of the combine, such that grain falling out of the harvester would first hit the acoustic sensor and be detected. The acoustic sensors and electronic components described herein enable processing in both the frequency and time domains. While this specification describes the inventions use on an air seeding system, it is important to note that the same components can be used in similar material flow applications, including agricultural and other applications.

Figure 14:
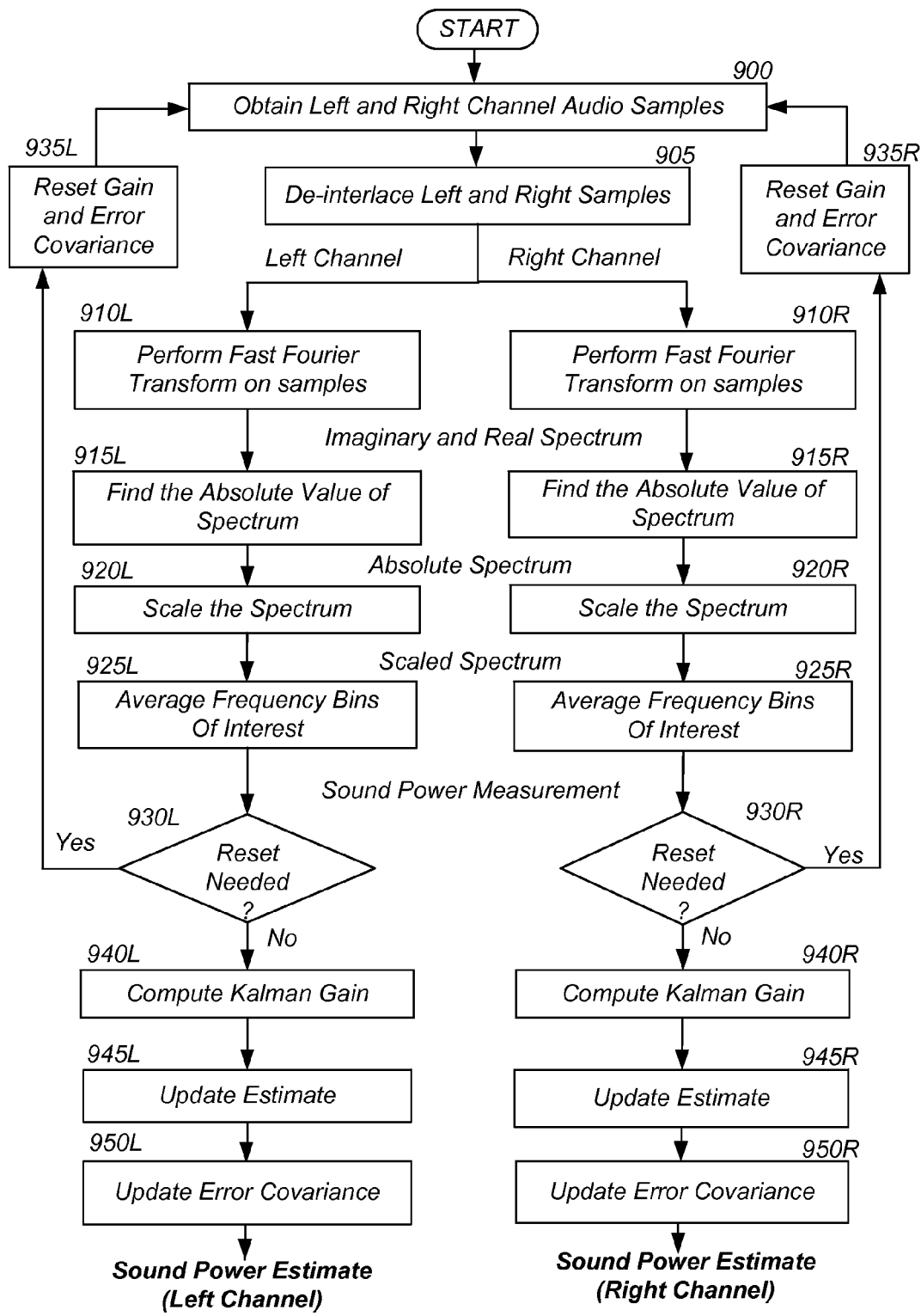
FIG. 14 shows one embodiment of an algorithm for creating a sound power estimate using the acoustic sensors of the present invention.

FIG. 14 shows an embodiment of an algorithm for creating a sound power estimate using the acoustic sensors of the present invention, in which the data is utilized in the frequency domain. In Step 900, audio samples are obtained from the acoustic sensors as interlaced left and right channel samples. Then the samples are separated (de-interlaced) into left and right channel data (Step 905). The processing shown in FIG. 14 from Step 910 on is done for both the left channel data and right channel data. The steps for both left and right channels are labeled with the same number, but an "L" or an "R" is appended to the reference designator to distinguish the processing of the left channel ("L") versus the right channel ("R"). The remaining description of FIG. 14 will apply to both the left and right channels equally.

A fast Fourier transform (FFT) is performed on the raw data from the left and right channels (Steps 910L, 910R). This creates a frequency spectrum containing imaginary and real spectrum information. The algorithm then finds the absolute value of the spectrum (Steps 915L, 915R), and the spectrum is scaled so that the frequency data of interest is better displayed (Steps 920L, 920R). The average of the frequency "bins" of interest is found to produce an instantaneous sound power measurement (Steps 925L, 925R). If the data is out of range, indicating a reset of the gain and error information is needed (Steps 930L, 930R), the algorithm resets the gain and error covariance (Steps 935L, 935R) and a new sample is obtained (Step 900). This is repeated until a valid instantaneous power measurement is obtained (Steps 930L, 930R).

Once a valid instantaneous power measurement is obtained, the algorithm computes the gain required for the Kalman filter (Steps 940L, 940R), the running sound power estimate is updated (Steps 945L, 945R), and the error covariance is updated (Steps 950L, 950R). Finally, an updated sound power estimate is delivered and sent to the handheld computing device 500 for processing and display.

Having described a preferred embodiment, it will become apparent that various modifications can be made without departing from the scope of the invention as defined in the accompanying claims. In particular, the components of the present invention, described herein and in the accompanying drawings, may be used in different configurations and combinations than described in the examples described above. The arrangement of seed tubes, blower fans, manifolds, and other components can vary significantly from one air seeding system to the next. The present invention can be easily adapted to these alternative configurations without changing the inventive concepts presented herein.

Also, as previously discussed, the components of the present invention can be adapted for use in other material flow applications. One such application previously discussed in this specification is a grain loss sensor, where acoustic sensors may be used (perhaps in an array) to detect grain falling from the back of a combine. In the grain loss application, the air flow restrictors of the present invention would not be used, but versions of both the acoustic sensors and blockage monitoring nodes would be employed. These components could be used similarly in any system in which an amount of material is flowing through a system.

III. Vehicle Gateway Module 1600

Alternative Embodiment or Aspect

Referring now to FIGS. 15 through 24B, FIG. 15 is a software architecture diagram showing the various layers of software resident in at least one embodiment of a vehicle gateway module. In this view, the physical gateway module 1600 is shown as a dashed line to indicate that the software layers depicted represent various pieces of software embedded within the gateway module 1600. Additional detail on the gateway module 1600 (the hardware) will be presented in FIG. 16.

The software architecture of at least one embodiment of a gateway module 1600 includes a hardware interface layer 1500, which includes routines for interfacing to and controlling the various physical hardware devices and components that will be further explained in connection with FIG. 16. The hardware interface layer 1500 is essentially the firmware that controls the primary functions of the physical hardware components.

The architecture also contains an ISO 11783 software layer 1400, which is responsible for creating proprietary messages 1420 in ISO 11783 format. The messages 1420 can be used to control functions on the vehicle or an attached implement, or to receive information from the vehicle or the attached implement. The ISO 11783 layer 1400 can also create or receive Virtual Terminal messages 1440 (messages that match the Virtual Terminal protocol specification of the ISO 11783 standard), such that it can communicate with any attached standard Virtual Terminal. The ISO 11783 layer 1400 is responsible for translating messages and data back and forth between ISO 11783 format and other forms which may be used by the gateway module 1600, such as information received by the gateway module 1600 from one of the wireless networks with which it is communicating.

ISO 11783, also known as ISO BUS or ISOBUS, is a common communication protocol used by the agriculture industry, and is based on the J1939 Controller Area Network (CAN) protocol published by the Society of Automotive Engineers (SAE). The ISO 11783 standard specifies a serial data network for control and communications on forestry and agricultural vehicles and implements. The ISO 11783 standard consists of several "parts", each of which describes a different aspect of the standard. Most notably, ISO 11783 Part 6 describes the Virtual Terminal standard. By providing a gateway module which can convert between the type of messages and information typically sent over a wireless network used by a mobile device into a standardized protocol used by a Virtual Terminal, it is possible for the mobile device to act as a Virtual Terminal, or for the mobile device to provide control directives to a vehicle in the same way that an operator would through the use of a Virtual Terminal.

Figure 15:
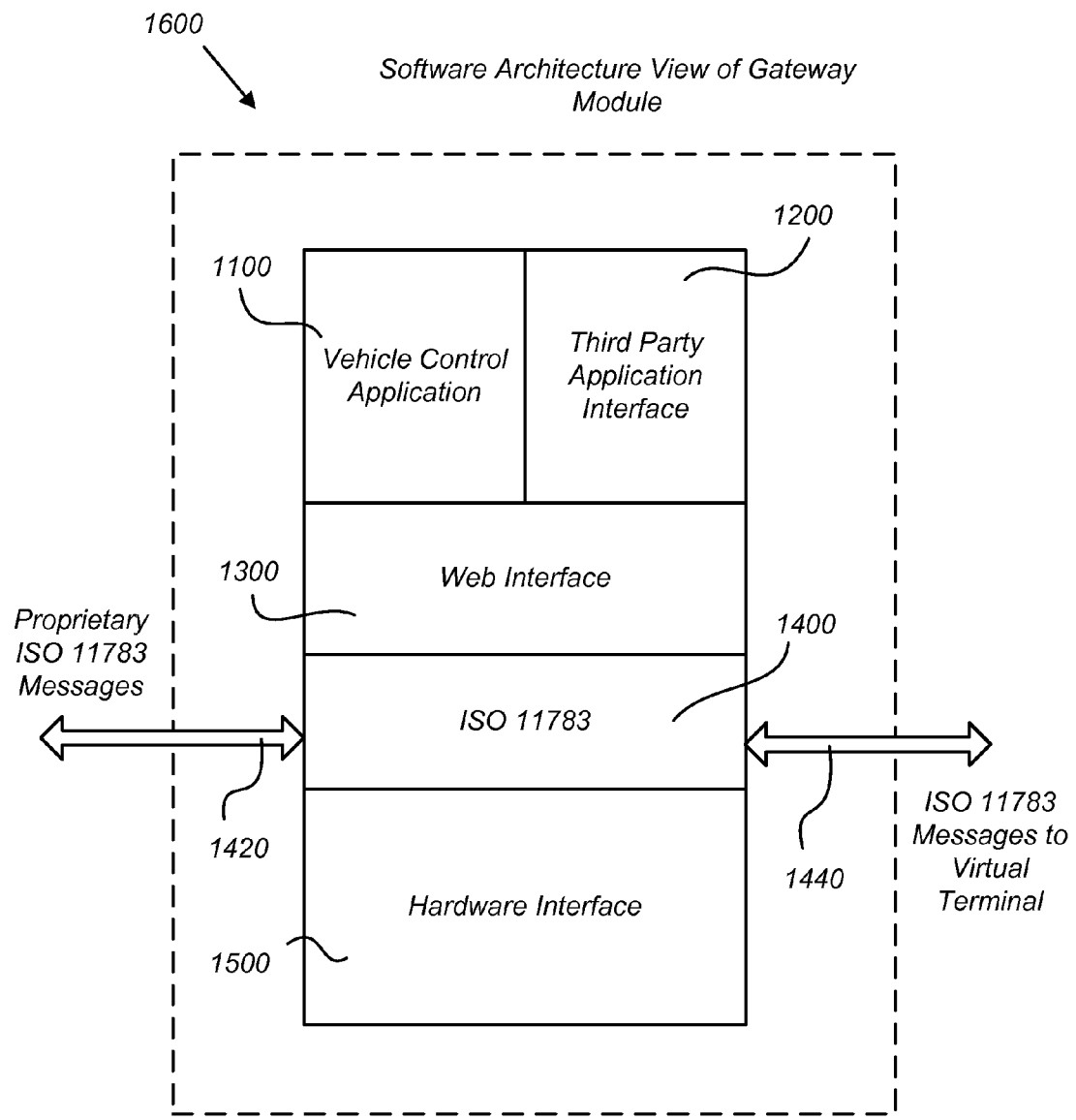
FIG. 15 is a software architecture diagram showing the various layers of software resident in at least one embodiment of a vehicle gateway module.

The use of ISO 11783 in FIG. 15 and in all examples throughout this specification is intended to be exemplary only, and is in no way limiting. Any standard protocol may be used, including a future protocol. Therefore, the use of ISO 11783 can be replaced with any appropriate standardized communication protocol without deviating from the intent of the invention described herein.

The software architecture of the gateway module 1600 contains a web interface layer 1300, which has software which can interpret internet commands such as those written in HTML (hypertext markup language), the language upon which most webpages are written and built. HTML5, the fifth revision of the HTML standard, is currently under development and will include many new syntactical features which allow the easier implementation of multimedia features. This web interface layer 1300 allows vehicle-specific and third-party web-based applications to be executed on the gateway module 1600.

Particularly, a vehicle control application 1100 is provided to allow access to certain vehicle and implement subsystems and data, as well as control of certain subsystems. Requests are made by the vehicle control application 1100 in the form of a web-style request (an HTML command) through the web interface layer 1300, which is received by the ISO 11783 layer 1400, which translates the request into ISO 11783 format for transmittal on one of the vehicle's communications busses. Information is returned to the vehicle control application 1100 via the reverse of this request path.

Similarly, applications provided by third parties (such as vendors of seed requesting data on seed usage from a planter, for example) can gain access to data contained within the gateway module 1600 by making requests through the third-party application interface layer 1200. These requests by third-party applications are passed down from a cloud or internet server as will be described in additional detail in FIG. 17.

In addition to accepting and processing requests made by third-party applications passed down from the cloud server, the third-party application interface layer 1200 also allows third-party applications to be hosted directly on the gateway module 1600. This means that an original equipment manufacturer (OEM) using a version of the gateway module 1600 can create variations of the control software as required to operate their vehicles and implements and can install them as applications directly on the gateway module 1600. The third-party application interface layer 1200 has knowledge of function calls available within the vehicle control application 1100 that allow it to access desired functions.

Figure 16:
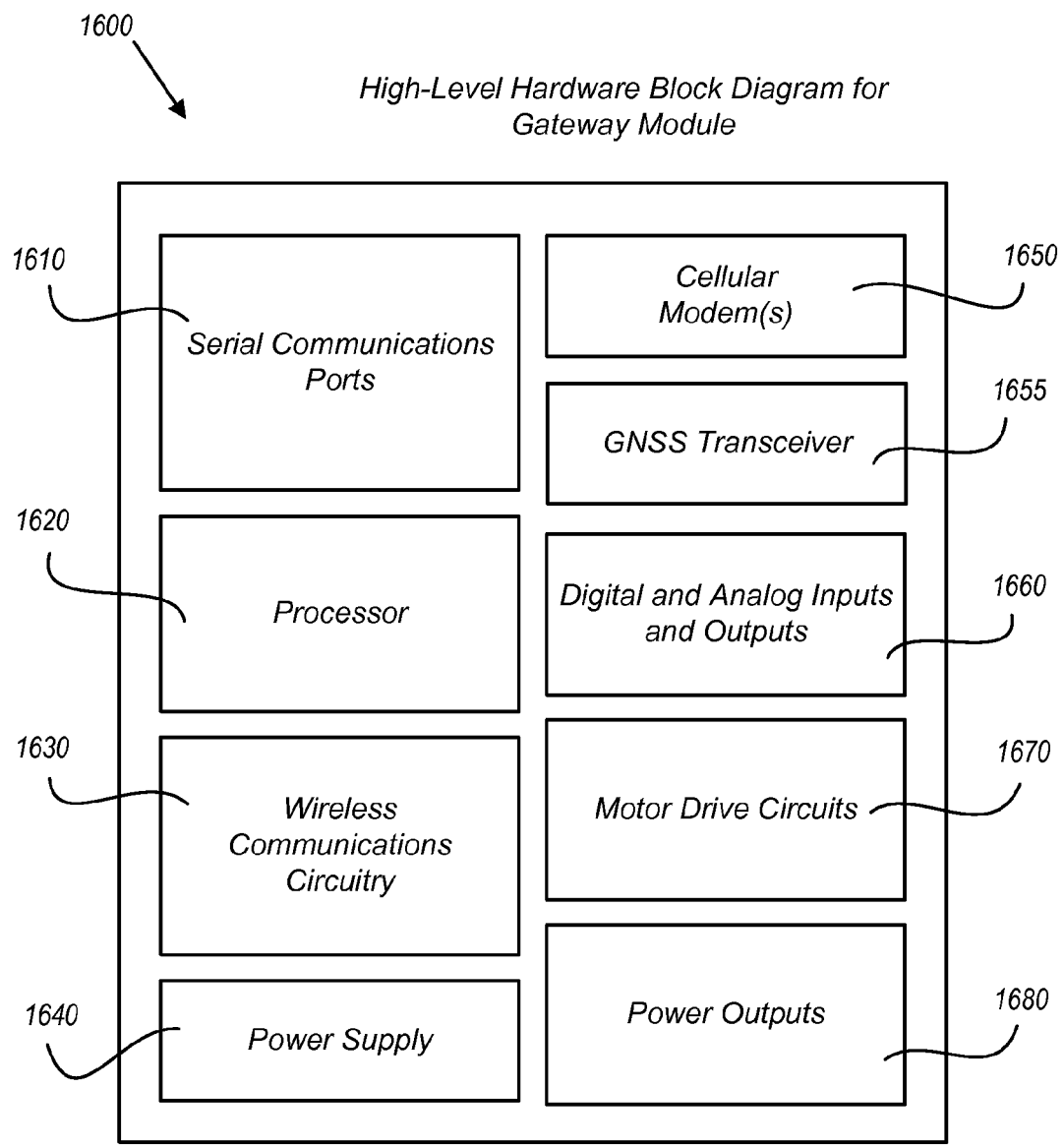
FIG. 16 is a high-level hardware block diagram illustrating the physical hardware components of at least one embodiment of a vehicle gateway module.

FIG. 16 is a high-level hardware block diagram illustrating the physical hardware components of at least one embodiment of a vehicle gateway module. The gateway module 1600 contains a power supply 1640 which manages the input power to the gateway module 1600 and steps the power level down and conditions the power appropriately for the various sub-circuits in the gateway module 1600. The power supply 1640 may also supply power to other, external systems through one or more power outputs 1680, which may, for example, be sensors or other modules which require a power supply with a voltage or other characteristics not otherwise available on the vehicle.

A processor 1620 serves as the primary control for the gateway module 1600, executing the embedded software and controlling the functions of the system including the module 1600. The gateway module 1600 has serial communications ports 1610 for sending messages to other parts of the vehicle system. Serial communications on the vehicle may include, but are not limited to, ISO 11783 messages, CAN messages, and other proprietary messages in a serial format.

Wireless communications circuitry 1630 is used to control the exchange of information with various wireless networks, which may include but are not limited to IEEE 802.11, WiMAX, Bluetooth, Zigbee, or any other appropriate wireless communications protocol. One or more cellular modems 1650 are provided to allow the gateway module 1600 to communicate via cellular networks. The gateway module 1600 can include a global navigation satellite system (GNSS) transceiver 1655.

The gateway module 1600 can provide control to a vehicle or receive inputs from a vehicle using digital and analog inputs and outputs 1660, the number of which can vary (from zero to several of each type) based on the needs of the system. The gateway module 1600 may also have a number of motor drive circuits 1670 that can be used to engage motor drives on a vehicle or implement.

It should be noted that the block diagram shown in FIG. 16 is one embodiment of a gateway module, and is not meant to be limiting in any way. Variations can be made to the number and types of circuits included without deviating from the inventive concept. For example, a gateway module embodiment with no digital and analog inputs and outputs and no motor drive circuits would still meet the intent of the invention described herein. There are other variations possible which can be made, as well, while still maintaining the concept of a module which provides a bridge or translation pathway between hard-wired, vehicle-based or application-based communication busses and wireless networks.

Figure 17:
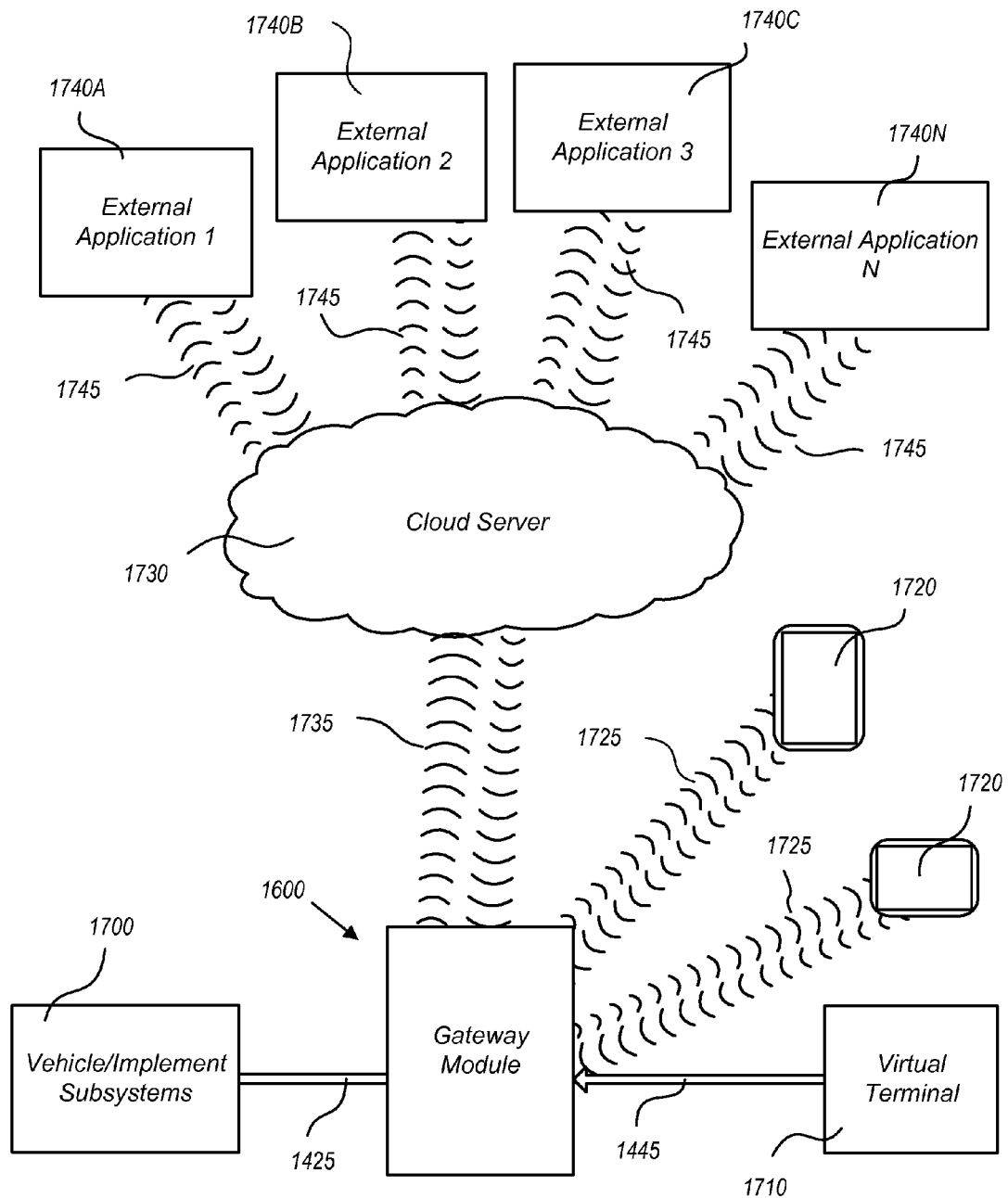
FIG. 17 is a system architecture diagram showing one embodiment of a vehicle gateway module interacting with other components in the system.

FIG. 17 is a system architecture diagram showing one embodiment of a vehicle gateway module interacting with other components in the system. Central to this system is a gateway module 1600, such as those described in the embodiments shown in FIGS. 15 and 16 previously. This gateway module 1600 is attached to the subsystems of a vehicle or implement 1700 via a proprietary communications bus 1425, such as the ISO 11783 bus shown in FIG. 17 (although, as previously stated in this specification, any appropriate communication standard could be used in place of ISO 11783). A virtual terminal 1710 is optionally connected to the gateway module 1600 via a communications bus 1445, such as an ISO 11783 bus over which virtual terminal commands may be sent. It should be noted that, although a virtual terminal standard (meeting ISO 11783, Part 6, as described previously) is shown in this example illustration, any other appropriate type of display which can receive and send information via a standard, published protocol can be used in place of the virtual terminal without deviating from the invention.

The gateway module 1600 optionally communicates with one or more mobile devices 1720 (such as a smart phone, tablet computer, notebook computer, etc.) over a wireless communications means 1725 such as an IEEE 802.11 connection or any appropriate wireless connection. A user operating the mobile device 1720 can use an application running on the device and written specifically for the vehicle or application on which the gateway module 1600 is mounted for accessing data and controlling the vehicle by issuing wireless commands. The commands can be translated into standard protocol messages for the vehicle, as previously described in the detailed description of FIG. 15 and FIG. 16.

In this way, the mobile device 1720 can actually be used in place of the virtual terminal 1710 as the primary display and control interface to the vehicle and/or the implement attached to the vehicle. This allows the operator to replace a potentially expensive piece of hardware (the virtual terminal 1710) that was specifically designed for use in the vehicle with an inexpensive and multipurpose mobile device that the operator may already own for another purpose. This also has the added advantage of allowing the operator to leave the cab of the vehicle with the display (in the form of the mobile device 1720, instead of the hard wired virtual terminal 1710), which gives the operator greater freedom and enables features that could not be done with a permanently-mounted, single-purpose display.

In addition to enabling communication with one or more mobile devices 1720, the gateway module 1600 allows the vehicle to communicate with a cloud server 1730 over a wireless communication means 1735 such as a cellular network (or any appropriate wireless protocol). The cloud server 1730 is an internet-based set of resources that comprises one or more physical servers and which can draw upon additional resources as the need demands. The cloud server 1730 may optionally offer a single company-hosted database which stores information collected from a fleet of deployed vehicles and/or implements, each with their own gateway modules 1600, or the cloud server 1730 can provide direct access to a number of external applications 1740 (shown here as 1740A through 1740N, but collectively referred to as 1740) over a separate communication means 1745. Communication means 1745 may be implemented as a wireless connection (such as a cellular connection or any of the various wireless network protocols available) or as a wired connection to the internet and the cloud server 1730.

These external applications 1740 can make requests through the cloud server 1730 to the gateway module 1600. These requests are received by the gateway module 1600 through the third-party application interface 1200 (FIG. 15) and are translated into machine-specific requests as previously described in this document.

Examples of external applications 1740 may include, but are not limited to, the following examples:

Prognostics/Diagnostics Application: An original equipment manufacturer (OEM) of a vehicle such as a tractor could receive information directly from a deployed fleet of gateway modules that would allow them to monitor the failure rates of components across a fleet and eventually have enough data to predict when these components should be replaced and notify the customer to replace or service the parts before they actually fail, reducing downtime and cost.

Remote Vehicle Access: Monitoring vehicle items such as position, speed, tire pressure, oil pressure, engine temperature, RPM, etc., and creating a log of the use of a vehicle.

Seed and Chemical Usage: Suppliers, such as seed companies, distributors of fertilizers, herbicides and pesticides, and others can receive reports directly from machines with gateway modules reporting the quantities of each item used per acre, and can analyze this data for trends.

Other external applications may be suggested through the description of an example operational scenario, which will be done now through the description of FIGS. 18-24B. The remaining figures show example embodiments of applications or application interfaces as they might appear on a mobile computing device when used with the vehicle control and gateway module of the present invention. These images and the corresponding descriptions are not meant to be limiting in any way, but show only potential embodiments of application menus and screens that the use of the present invention would enable.

Figure 18:
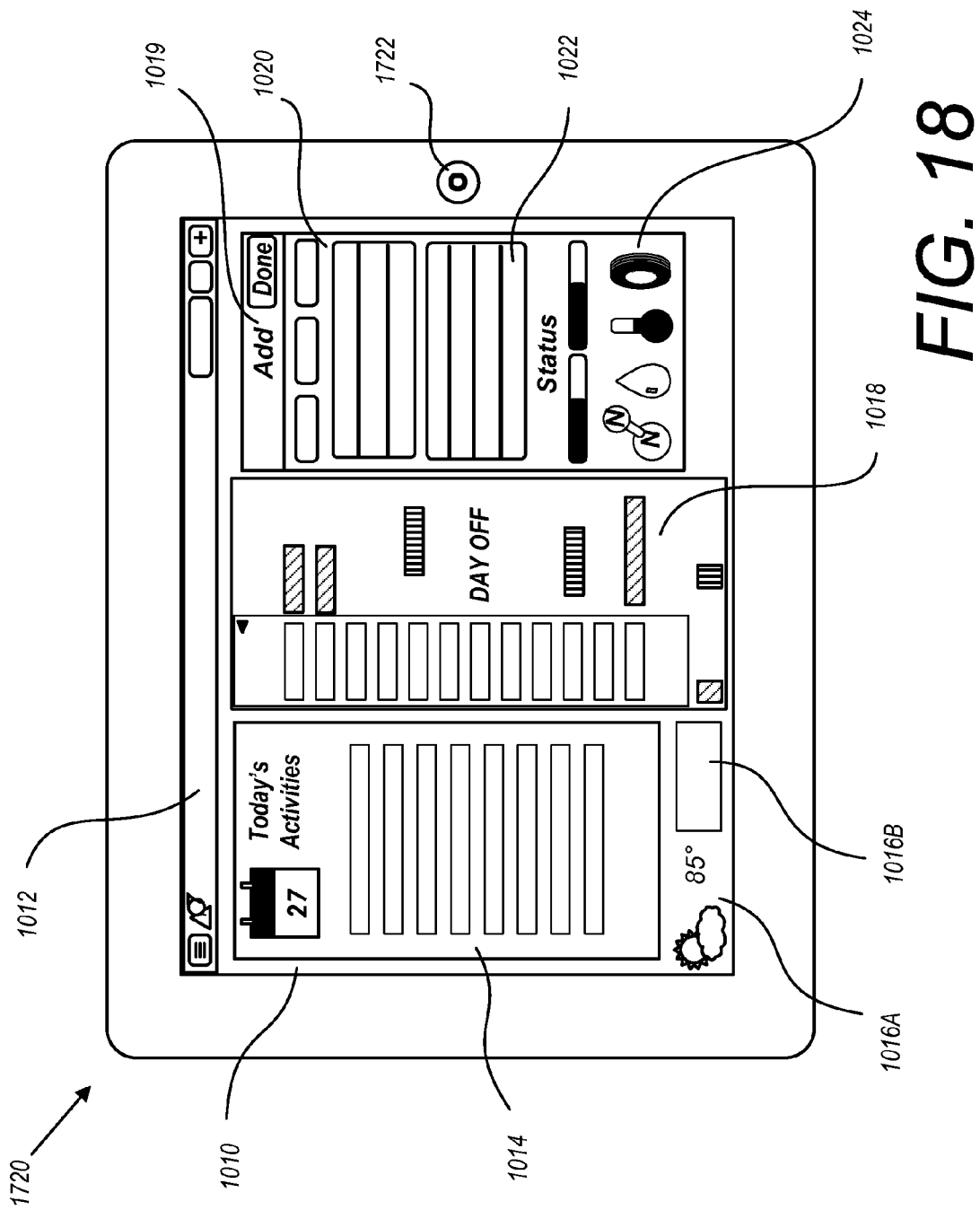
FIG. 18 is an example embodiment of an application interface for an operations scheduling tool for use with the vehicle control and gateway module of the present invention.

FIG. 18 is an example embodiment of an application interface for an operations scheduling tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. This operations scheduling tool embodiment would allow an operator to access information related to available workers, vehicle status, and project completion percentages. A list 1014 of scheduled activities for the day is displayed. This list of scheduled activities 1014 would display items that have been accessed from the cloud server 1730 as described in FIG. 17.

Similarly, the application could remotely access weather conditions and other information at 1016A, 1016B, and access a schedule 1018 of available workers to see who is available, who is currently working on a job, and who is on vacation or otherwise not available. An add menu 1019 allows the user to schedule new operations to the schedule. The add menu 1019 consists of an operations submenu 1020, a vehicle/implement submenu 1022, and an operational status submenu 1024. The operations submenu 1020 allows the user to enter information on the new operation being scheduled, such as type of seed, name and location of the field, and date and time of the operation. The vehicle/implement submenu 1022 allows the user to choose the vehicle and the implements to be used. The operator assigns the operation using the submenu 1022. The operational status submenu 1024 accesses information on the vehicle and/or implements through direct communications with the vehicle and implements (or indirectly through the cloud server) and displays it to the user, such that the user knows if maintenance is required before a task can be started, or if there are any existing issues with the vehicle or implement.

Figure 19:
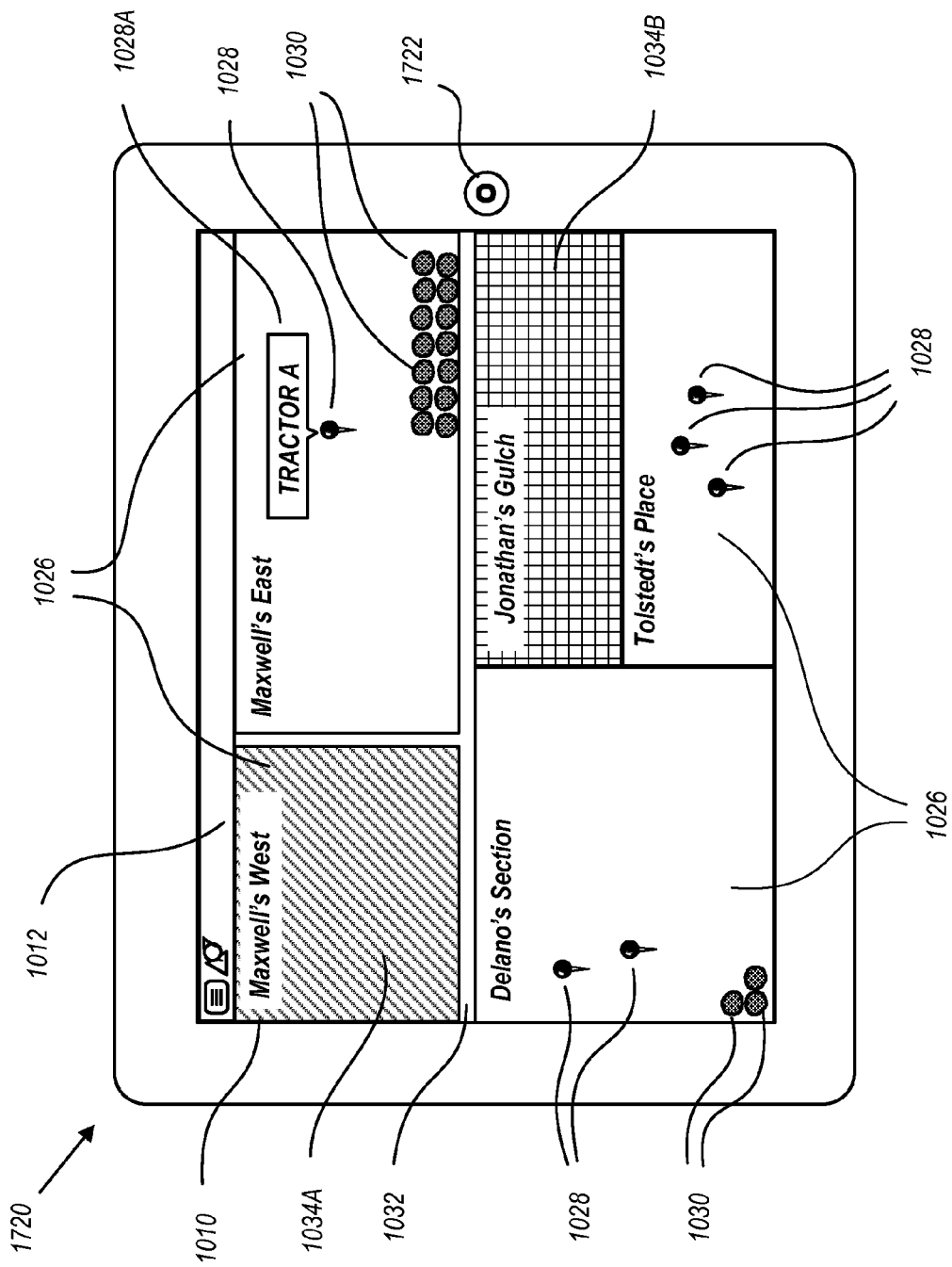
FIG. 19 is an example embodiment of an application interface for an operations map tool for use with the vehicle control and gateway module of the present invention.

FIG. 19 shows an exemplary embodiment of an application interface for an operations map tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is displayed as a graphical banner which helps describe the current window or information being shown in the display screen 1010. The display screen 1010 on the operations map tool will typically show a map or satellite image of an area containing farm land, buildings, roads, and other objects related to the operations of a farm. It should be noted at this point that, although the examples included in this patent specification primarily describe an agricultural operations scenario, the concepts captured in this specification could be applied equally well to other applications, such as the operation of a truck fleet, or maintenance operations at a large outdoor park.

The map or image displayed on the display screen 1010 may show one or more active fields 1026, where agricultural or other operations may be scheduled. These fields 1026 may be shaded in different textures or colors such as 1034A and 1034B, where a certain texture or color 1034A/1034B may indicate a status of an operation on that field 1026. For example, a field 1026 displayed with color 1034A may indicate that the operation scheduled for this particular field 1026 is completed, while a field 1026 displayed with color 1034B may indicate the operation scheduled in that field is currently underway or partially complete.

The image may also display real objects in or near the fields 1026, such as trees 1030 and roads 1032. Superimposed on top of the image are small location indicators 1028 which denote the location of actual vehicles or implements that are currently deployed in the fields 1026. By hovering over or clicking on one of these location indicators 1028, an information tag 1028A may be displayed, offering additional information on the vehicle or implement at that specific location.

Figure 20:
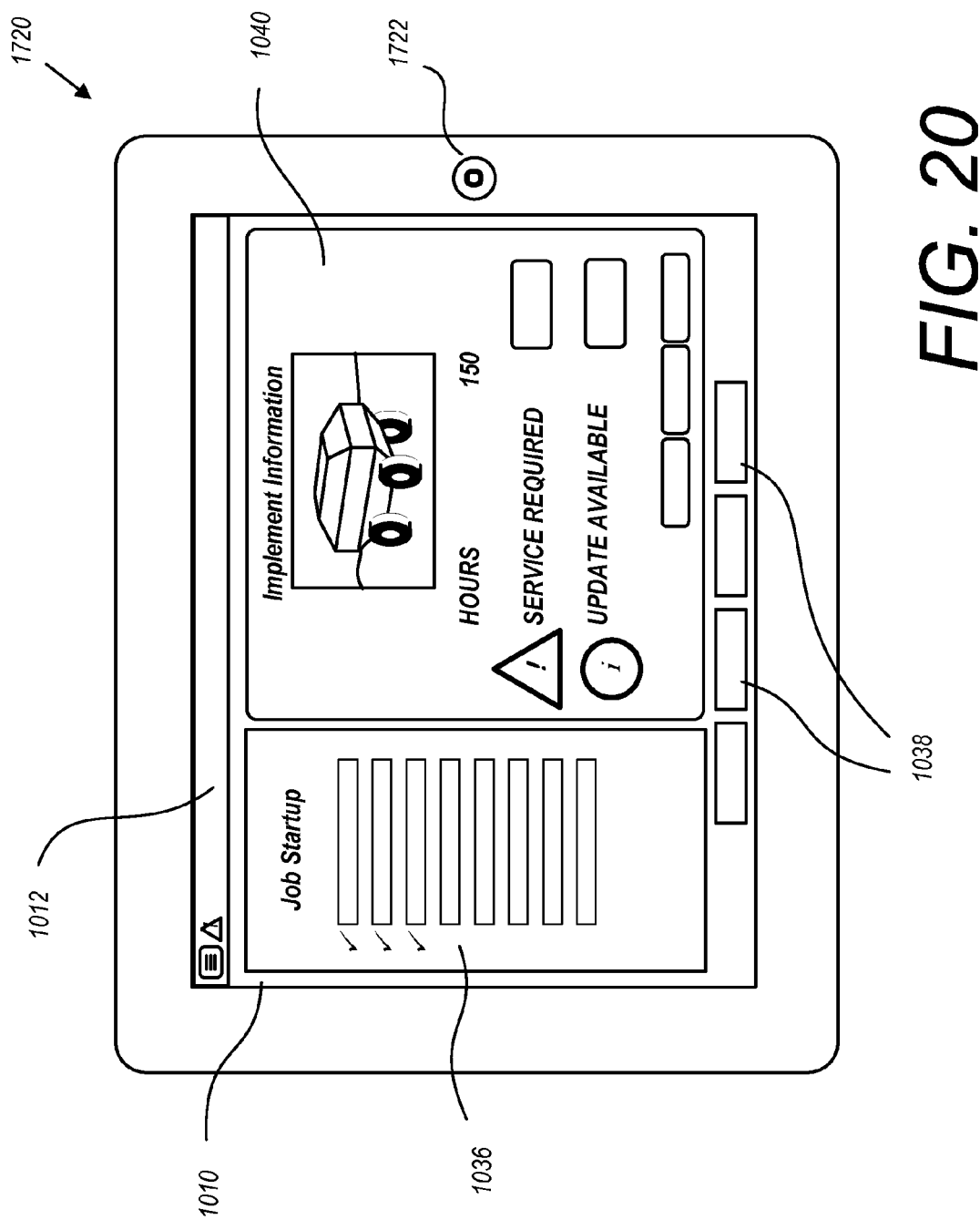
FIG. 20 is an example embodiment of an application interface for an implement information tool for use with the vehicle control and gateway module of the present invention.

FIG. 20 is an example embodiment of an application interface for an implement information tool for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. The display screen 1010 on the implement information tool may provide a job startup checklist 1036 to allow the user to step through a series of screens to set the vehicle for a specific operation. The display screen 1010 for the implement information tool may also provide an implement information window 1040 which provides status information obtained from a live connection to the implement (which could also be done with a vehicle). Virtual controls 1038 along the bottom of the screen allow a user to jump to other windows or applications quickly. These virtual controls 1038 can be displayed on any application to allow a means of jumping between application pages.

Figure 21:
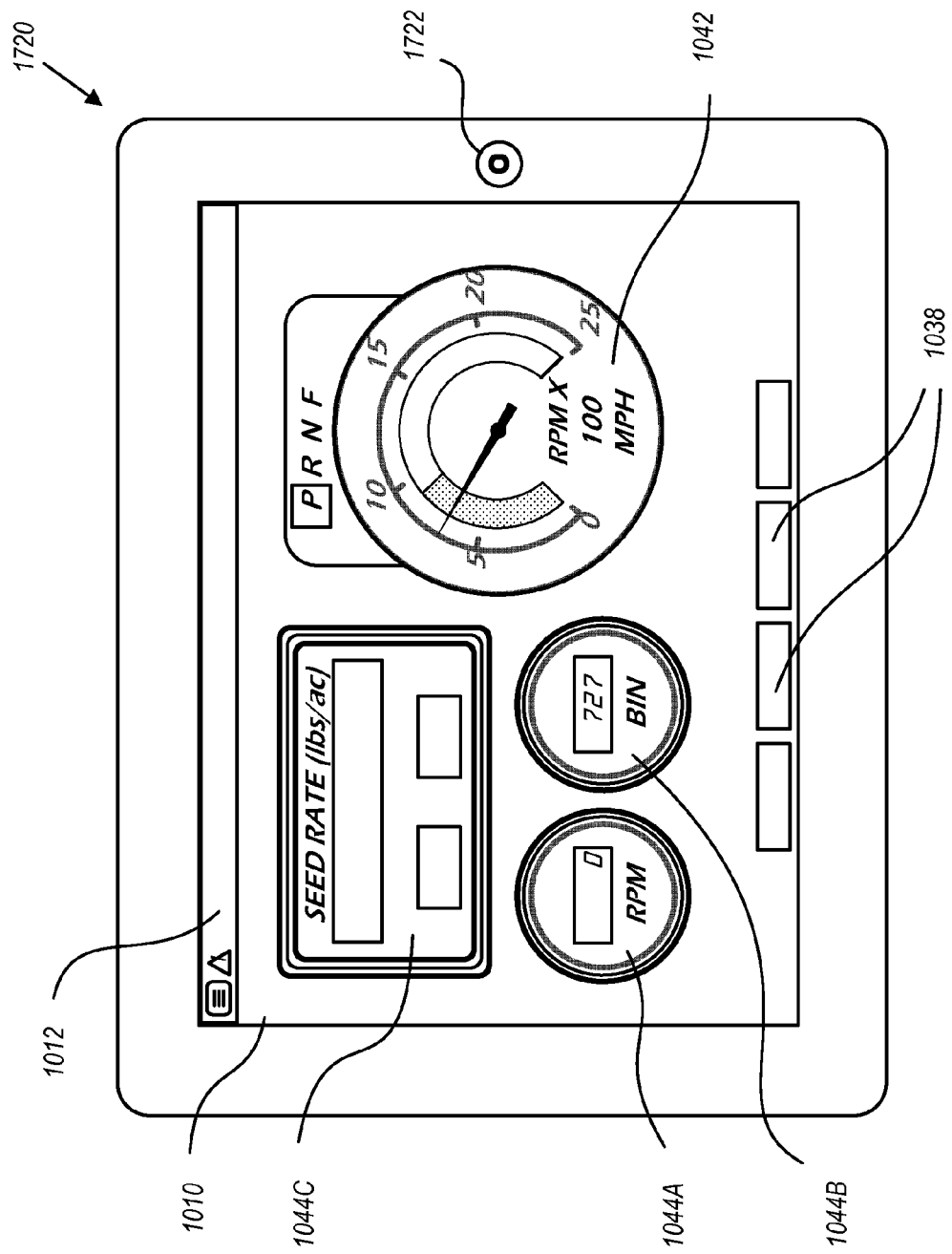
FIG. 21 is an example embodiment of an application interface for a virtual dashboard display for use with the vehicle control and gateway module of the present invention.

FIG. 21 is an example embodiment of an application interface for a virtual dashboard display for use with the vehicle control and gateway module of the present invention. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012, which is a displayed graphical banner which helps describe the current window or information being shown in the display screen 1010. The display screen 1010 on the virtual dashboard display can be used to display information received from the tractor, from the implement, or from an external application, either as standard protocol messages as described in FIG. 17 or through a wireless or wired interface available to the mobile device 1720. As it is a virtual display, the information received can be displayed in virtually any appropriate format, which may include a vehicle speedometer/tachometer 1042, or any of a number of possible gauge types, such as those shown in FIG. 21 at 1044A, 1044B, and 1044C. The application can allow an operator to define how their personal virtual dashboard will look by adding, deleting, and moving gauges, readouts, and controls to their liking. Virtual controls 1038 may be offered to allow the user to jump to another screen or application quickly.

Figure 22:
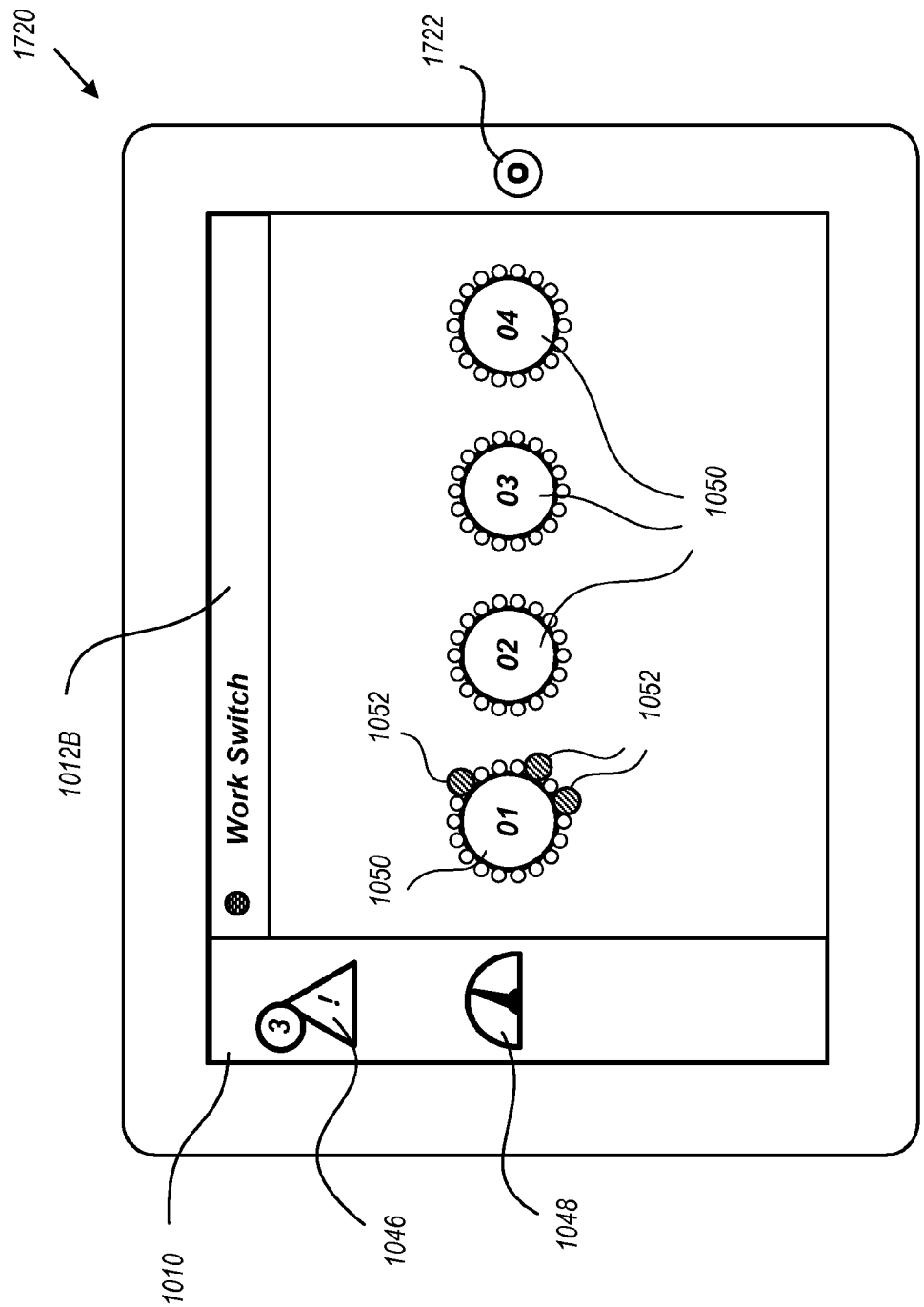
FIG. 22 is an example embodiment of an application interface for a blockage monitor tool for use with the vehicle control and gateway module of the present invention.

FIG. 22 is an example embodiment of an application interface for a blockage monitor. A mobile computing device 1720 offers a display screen 1010 which may be the primary interface to the user, displaying graphical and textual information and providing a touch screen input interface. The mobile computing device 1720 has a power switch 1722. The top of the display screen 1010 typically has an optional information bar 1012B (similar to information bar 1012 shown in FIGS. 18-21, but with different display and functional aspects presented on the screen shown in FIG. 22), which is a displayed graphical banner associated with the current window or information being shown in the display screen 1010. The display screen 1010 on the blockage monitor displays a warning icon 1046 when a blockage occurs (such as an air seeding machine blockage on an implement). The warning icon 1046 may indicate the number of seed tubes blocked and other conditions, and can display a number associated with the graphical warning image. In addition to the warning icon 1046, the display screen 1010 may offer icons which link to other tools which may help with the blockage situation, such as a meter roll tool 1048. In the main area of the display screen 1010, a graphical image representing the manifolds 1050 of an air seeder is displayed. Additional blockage indicators 1052 show which of the displayed tubes on the manifolds 1050 are currently showing blockages.

Figure 23:
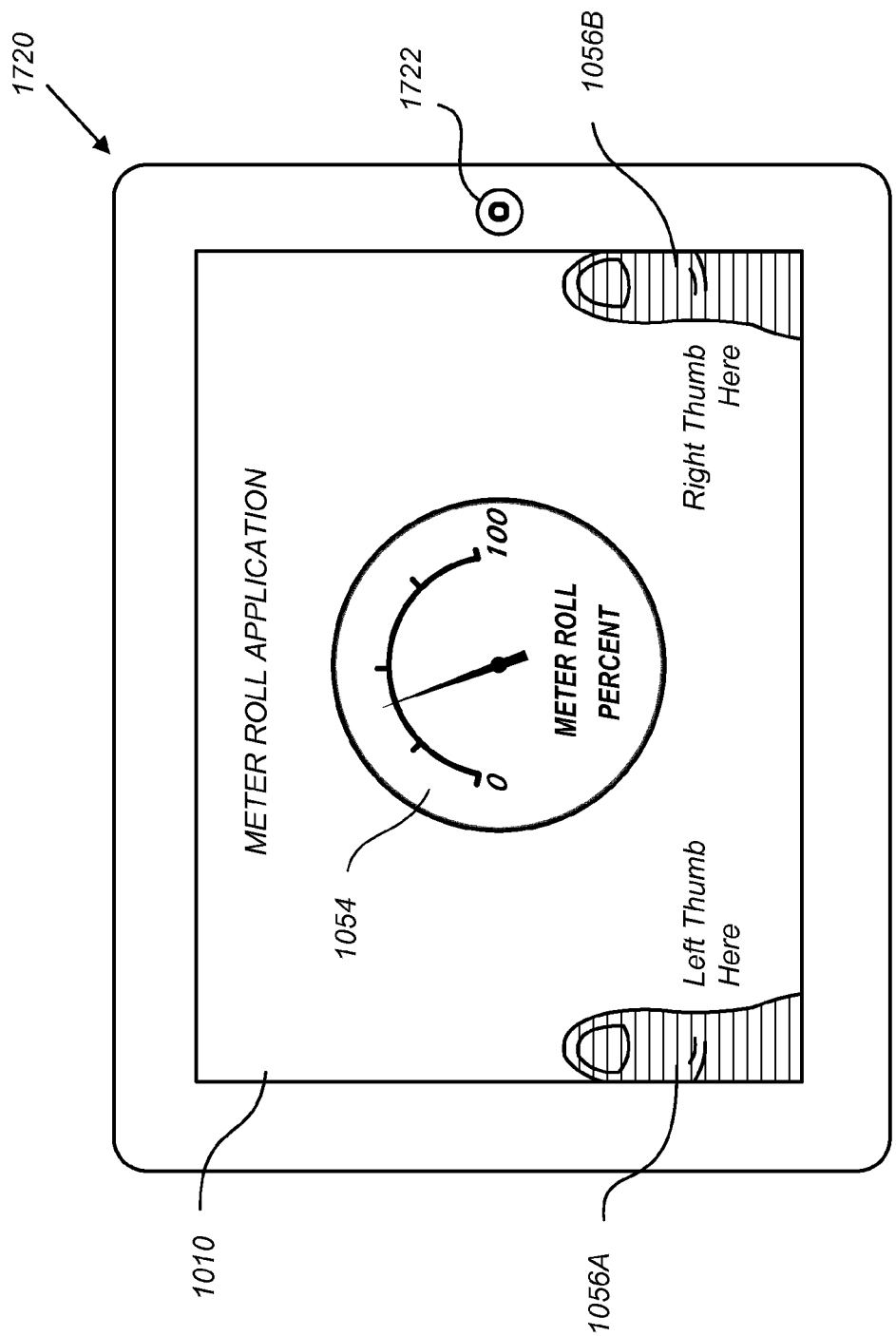
FIG. 23 is an example embodiment of an application interface for a meter roll application for use with the vehicle control and gateway module of the present invention, demonstrating the incorporation of an operator safety feature into the application.

When a blockage actually occurs on an air seeding machine using the current invention, the user can stop the vehicle, undock the mobile device 1720 from the vehicle cab, and carry it with them to the implement. The mobile device 1720 can then be used to execute diagnostic tests on the implement, access schematics of the implement or vehicle through the connection to the cloud server, make a request for a part or service to an online provider, or even have a live chat with someone who can assist in the repair. FIG. 23 shows one example of an application that can be used to test the functionality of the implement attached to the vehicle while standing next to the implement, holding the mobile device and using it to execute a diagnostic test on the implement.

FIG. 23 is an exemplary embodiment of an application interface for a meter roll application for use with the vehicle control and gateway module of the present invention, demonstrating the incorporation of an operator safety feature into the system. The application shown in FIG. 23, like those shown in the preceding figures, is one of many similar applications that can be executed using the mobile device to access the vehicle control and gateway module over a wireless connection.

A mobile computing device 1720 includes a display screen 1010 which may be the primary interface to the user, displaying graphical and textual information and providing a touch screen input interface. The mobile computing device 1720 has a power switch 1722. In this exemplary application, the operator can stand outside of an air cart (an implement consisting of a hopper which can drop seed and other material from the hopper down through a "meter roll" into an air stream for seeding or into an unloading auger), and can use the mobile computing device 1720 to calibrate the meter roll. The application on the display screen 1010 offers a meter roll gauge 1054 which shows the percent to which the meter roll has been engaged. It is typical in these systems that, in order to calibrate the meter roll, the meter must first be "primed", which means it must be full of seed or other material. The application shown in FIG. 23 provides an interface to the vehicle control and gateway module that allows the meter roll to be spun a few times to ensure that it is filled with seed. In the application shown in FIG. 23, the meter roll is engaged when the operator pushes the screen 1010 on the point marked 1056A and the point marked 1056B. By requiring the operator to engage opposite sides of the display screen 1010 to engage the meter roll, a safety feature is provided preventing the operator from accidentally engaging the meter roll. Operators are thus prevented from activating the meter roll while accessing the internal workings of the meter roll mechanism.

Figure 24A:
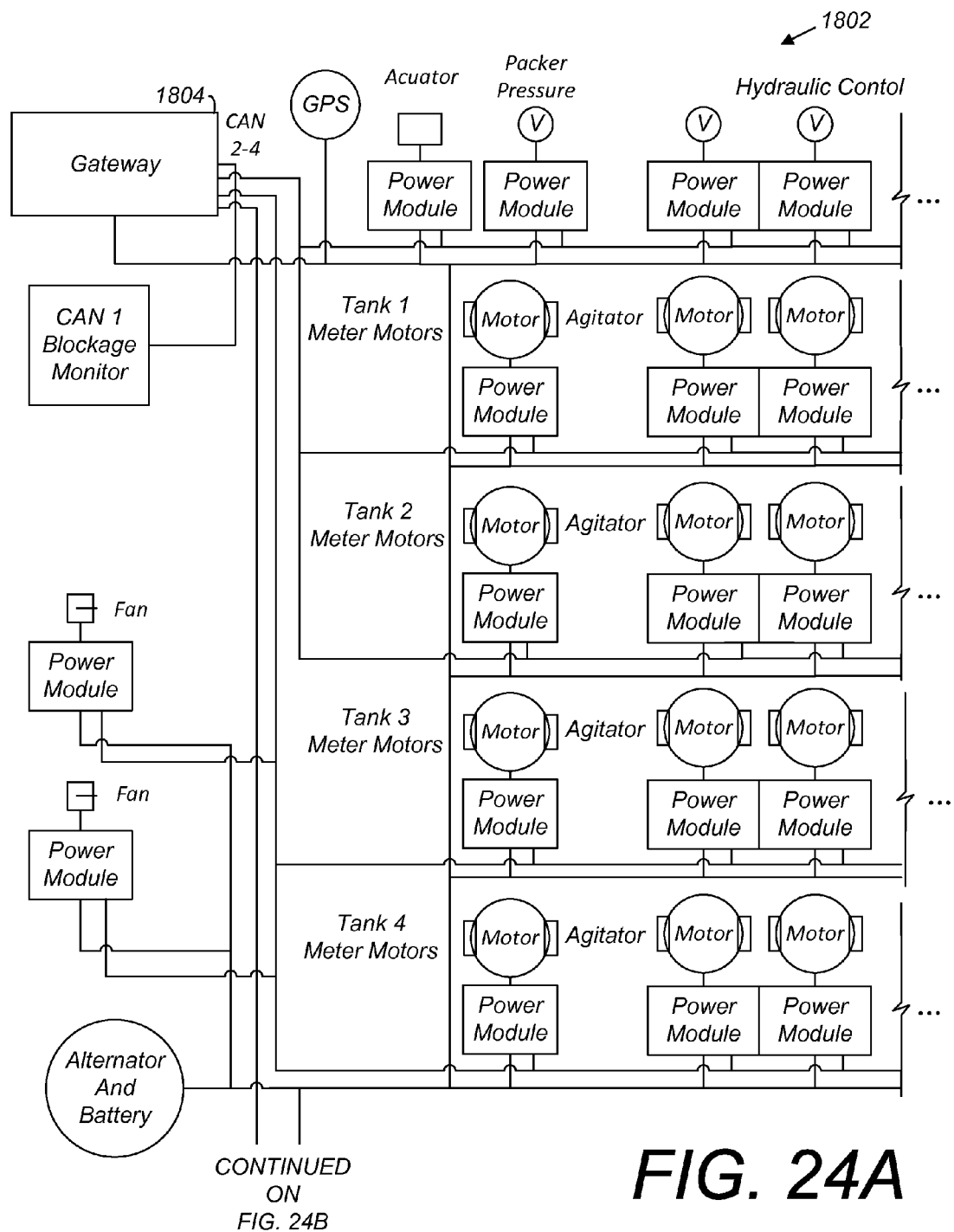
FIGS. 24A and 24B are a schematic diagram of an air seeder and liquid applicator control system embodying an alternative embodiment or aspect of the present invention.
Figure 24B:
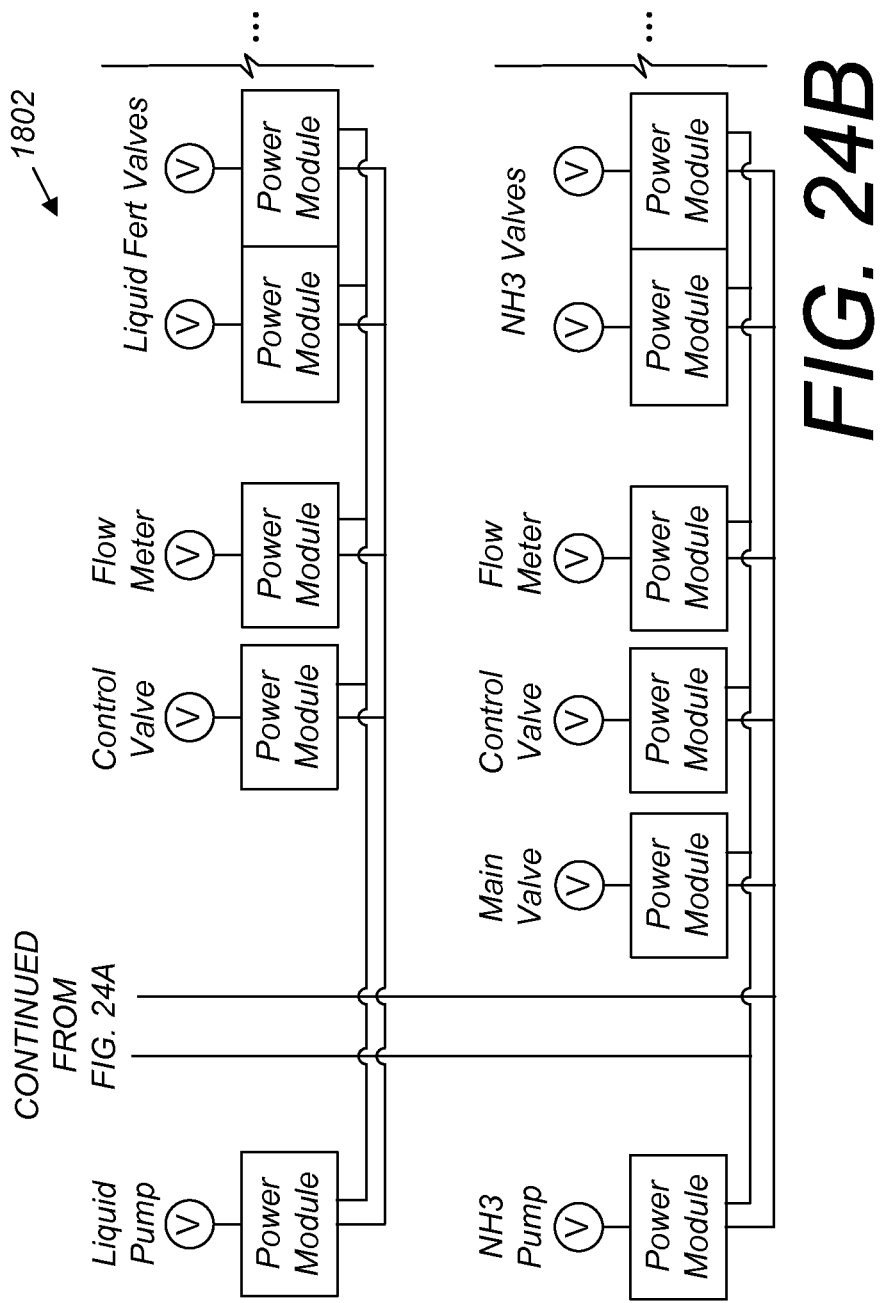

FIGS. 24A and 24B show a vehicle control system 1802 with a gateway module 1804 embodying another aspect of the present invention, which can be installed on a vehicle configured as a seeder, sprayer or other liquid dispensing equipment. The vehicle can be a self-propelled vehicle or a towed implement.

IV. Use Case Examples

Use Case 1: Implement/attachment with ECUs that have never been "paired" to a Gateway.
  Step 1: The operator initiates the pairing mode on the Gateway (Access Point) from the display terminal.
  Step 2: The Gateway changes its normal SSID (for example: GW_FF21, where FF21 is the serial number) to the specially coded SSID GW_FF21_XXXX_YYYYYY_############ where ############ is the security key of the network, XXXX is the implement/attachment manufacturer ID and YYYYYY is the implement/attachment serial number.
  Step 3: The Wi-Fi ECUs on the implement/attachment are actively looking for a Gateway to pair with (since they are un-paired) find the specially code SSID being broadcast and request to join the Gateway using the SSID and security key.
  Step 4: Once the Wi-Fi ECUs have joined the Gateway and gained network level access they send the Gateway messages requesting application level access.
  Step 5: The operator is notified that Wi-Fi ECUs would like to pair and they can accept or deny. The list of ECUs could be checked against what is known to be registered on a particular implement/attachment.
  Step 6: The operator accepts the pairing request.
  Step 7: The Gateway sends a notification to each ECU that its request for application level access has been granted.
  Step 8: The Wi-Fi ECU stores the "paired" SSID into its non-volatile memory.
  Step 9: The operator leaves pairing mode and returns to broadcasting its normal SSID.
  Step 10: The Wi-Fi ECU connects to the network broadcasting the stored "paired" SSID.
  Alternative Path:
  Step 6: The operator denies the pairing request.
  Step 7: The Gateway sends a notification to each ECU that its request for application level access has been denied.
  Step 8: The Wi-Fi ECU will not try to pair with the SSID again until power it is power cycled.

Use Case 2: Implement/attachment with ECUs that have been "paired" to a different Gateway.
  Step 1: The operator initiates the pairing mode on the Gateway from the display terminal.
  Step 2: The Gateway changes its normal SSID (for example: GW_FF21, where FF21 is the serial number) to the specially coded SSID GW_FF21_XXXX_YYYYYY_############ where ############ is the security key of the network, XXXX is the implement manufacturer ID and YYYYYY is the implement/attachment serial number.

Step 3: The Wi-Fi ECUs scan for available SSIDs.

Step 4: The Wi-Fi ECUs see the specially coded SSID being broadcast and request to join the AP using the SSID and security key.

Step 5: Once the Wi-Fi ECUs have joined the AP and gained network level access they send the gateway messages requesting application level access.

Step 6: The operator is notified that Wi-Fi ECUs would like to pair and they can accept or deny. The list of ECUs could be checked against what is known to be registered on a particular implement/attachment.

Step 7: The operator accepts the pairing request.

Step 8: The Gateway sends a notification to each ECU that its request for application level access has been granted.

Step 9: The Wi-Fi ECU stores the new "paired" SSID into its non-volatile memory.

Step 10: The operator leaves pairing mode and returns to broadcasting its normal SSID.

Step 11: The Wi-Fi ECU connects to the network broadcasting the stored "paired" SSID.

Alternative Path:

Step 7: The operator denies the pairing request.

Step 8: The Gateway sends a notification to each ECU that its request for application level access has been denied.

Step 9: The Wi-Fi ECU will not try to pair with the SSID again until power it is power cycled.

Step 10: The Wi-Fi ECU attempts to join the network with its previously stored SSID if it is being broadcast.

Use Case 3: Equipment wishes to use an implement/attachment that it is "paired" to.

Step 1: Gateway begins broadcasting its normal SSID.

Step 2: The Wi-Fi ECUs scan for available SSIDs.

Step 3: The Wi-Fi ECUs see the SSID of the Gateway they are paired to.

Step 4: The Wi-Fi ECUs request to join the SSID with the stored security key.

Step 5: The Gateway accepts the request.

Use Case 4: ECU needs to be re-registered (i.e. moved from one implement to another or installing a replacement).

Step 1: The operator installs the ECU onto the implement/attachment.

Step 2: The operator powers up the equipment and implement/attachment.

Step 3: The operator enters the implement/attachment manufacturer ID, implement/attachment serial and ECU serial number/network ID into the re-registration interface.

Step 4: The operator initiates re-registration mode for an ECU with serial number or network ID XXXX.

Step 5: The Gateway changes its normal SSID (for example: GW_FF21_, where FF21 is the serial number) to a the specially code SSID GW_FF21_XXXX_############ where ############ is the security key of the network and XXXX is the serial number or network ID of the ECU as shown on its label, enclosure etc.

Step 6: The Wi-Fi ECUs on the implement/attachment scan for available SSIDs.

Step 7: The Wi-Fi ECU with the serial number or network ID XXXX sees the special re-registration SSID and joins the AP. All other Wi-Fi ECUs ignore it.

Step 8: The Wi-Fi ECU sends a request to the Gateway for the manufacturing ID and serial number of the implement/attachment it is being registered on.

Step 9: The Gateway sends the manufacturer ID and serial number that the operator entered for re-registration mode. (This information could potentially be sent up to the cloud).

Step 10: The Wi-Fi ECU receives the manufacturer ID and serial number and stores them in non-volatile memory as well as the SSID of the Gateway for pairing.

Step 11: The operator powers off the implement and tractor.

V. Conclusion

The wireless connections to the vehicle, implement, cloud server, and other wireless devices and services enable the system described in the present invention to completely integrate operations with online schedule and status information, and provide access to appropriate parties through external application interfaces.

While the invention has been described with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to be secured by Letters Patent is:

1. A gateway system for controlling dynamic equipment, which system comprises:
    a wireless mobile device;
    an electronic equipment control module connected to said dynamic equipment and configured for controlling and monitoring one or more equipment functions;
    a wireless-to-serial node connected to said control module;
    said wireless-to-serial node including a wireless communications module;
    said mobile device being configured for communicating wirelessly with said wireless-to-serial node via said communications module;
    an interface between said wireless-to-serial node and said equipment control module;
    said wireless-to-serial node being configured for transmitting to and receiving from said mobile device information and commands related to said one or more equipment functions;
    a communications bus connected to said control module;
    said control module being configured for transmitting and receiving data on said communications bus;
    said communications module being configured for wirelessly transmitting data to and receiving data from said mobile device;
    said communications module being configured for translating data received on said communications bus into a wireless message protocol;

wherein said communications module includes a safety function configured for disabling one or more equipment functions under predefined conditions; and wherein said mobile device includes a pair of actuators which must be simultaneously engaged by an operator in order to enable said one or more equipment functions.

2. The gateway system according to claim 1, which includes:

said mobile device being handheld; and said communications module being adapted for transmitting text, data and images wirelessly to and receiving data wirelessly from said mobile device.

3. The gateway system according to claim 2 wherein said mobile device is adapted for sending control commands to the control module.

4. The gateway system according to claim 3 wherein said mobile device is adapted for receiving and displaying information from the vehicle system.

5. The gateway system according to claim 2, which includes:

said mobile device acting as a virtual terminal for the dynamic equipment.

6. The gateway system according to claim 2 wherein said equipment function comprises a meter roll.

7. The gateway system according to claim 1, which includes an interface adapted for interfacing with one of the group comprising: a third-party application; the Internet; equipment hardware; and cloud-based Internet capabilities.

8. The gateway system according to claim 7, which includes an interface adapted for receiving and transmitting messages.

9. The gateway system according to claim 1, which includes:

motor drive circuits connected to motor drives on said dynamic equipment.

10. The gateway system according to claim 1, which is adapted for communicating with one or more of the group comprising a cloud server, a virtual terminal, a cellular telecommunications network and another gateway system.

11. The gateway system according to claim 1, which includes:

said mobile device including a display adapted for representing the equipment function of said equipment.

12. The gateway system according to claim 11, which includes:

said display being adapted for displaying maps of fields wherein said equipment operates; and said display being adapted for displaying position indicators on said field maps.

13. The gateway system according to claim 1 wherein said mobile computing device includes a display screen and is adapted for displaying a job startup checklist and allowing a user to step through a series of screens associated with preparing the equipment for a specific operation.

14. The gateway system according to claim 13, which includes:

said display screen including a banner depicting equipment condition information.

15. The gateway system according to claim 14 wherein said equipment comprises a pneumatic seeder and said gateway module is adapted for detecting a flow blockage monitor and displaying a seed flow blockage status indicator.

16. The gateway system according to claim 1, which includes:

said equipment comprising a tractor towing an agricultural implement;

said agricultural equipment including multiple reservoirs for material to be applied to a field; and said gateway system being adapted for selectively controlling the application of said material to said field.

17. The gateway system according to claim 16 wherein said material application is based on GNSS-defined positions of said equipment.

18. The gateway system according to claim 16 which includes:

multiple components each associated with a respective crop row and said field; and said control module selectively controlling said components.

19. The gateway system according to claim 18 wherein said equipment includes one or more of material dispensing control valves, flow meters, material level indicators, load cells and tank pressure indicators.

20. A gateway system for controlling dynamic equipment, which system comprises:

a wireless mobile device;

an electronic equipment control module connected to said dynamic equipment and configured for controlling and monitoring one or more equipment functions;

a wireless-to-serial node connected to said control module;

said wireless-to-serial node including a wireless communications module;

said mobile device being configured for communicating wirelessly with said wireless-to-serial node via said communications module;

an interface between said wireless-to-serial node and said equipment control module;

said wireless-to-serial node being configured for transmitting to and receiving from said mobile device information and commands related to said one or more equipment functions;

wherein said mobile device includes a display screen;

wherein said dynamic equipment comprises a pneumatic seeder including a particulate flow blockage monitor having acoustic particulate flow sensors connected to said wireless-to-serial node;

said particulate flow blockage monitor being configured for detecting a particulate flow blockage; and said wireless-to-serial node being configured for transmitting a particulate flow blockage status indicator to said mobile device display screen.

21. The gateway system according to claim 20, which includes:

a communications bus connected to said control module; and said control module being adapted for transmitting and receiving data on the communications bus.

22. The gateway system according to claim 21, which includes:

serial communications ports connected to said processor and to said communications bus for receiving and transmitting messages from and to said processor.

23. The gateway system according to claim 22, which includes a Global Navigation Satellite System (GNSS) receiver connected to said processor and adapted for providing GNSS positioning signals to said processor and said processor being adapted for computing a position of said GNSS receiver defined by said GNSS signals.

24. The gateway system according to claim 20, which includes an application interface for an operations scheduling tool adapted for providing an operator with access to information related to one or more of the group comprising: available workers, vehicle status, project completion status, field conditions, weather conditions and field-applied material.

* * * * *